(12) United States Patent
Yamaguchi et al.

(10) Patent No.: US 10,551,821 B2
(45) Date of Patent: Feb. 4, 2020

(54) ROBOT, ROBOT CONTROL APPARATUS AND ROBOT SYSTEM

(71) Applicant: Seiko Epson Corporation, Tokyo (JP)

(72) Inventors: Yukihiro Yamaguchi, Matsumoto (JP); Taro Ishige, Matsumoto (JP); Atsushi Harada, Matsumoto (JP)

(73) Assignee: Seiko Epson Corporation (JP)

( * ) Notice: Subject to any disclaimer, the term of this patent is extended or adjusted under 35 U.S.C. 154(b) by 254 days.

(21) Appl. No.: 15/637,094

(22) Filed: Jun. 29, 2017

(65) Prior Publication Data
US 2018/0004188 A1   Jan. 4, 2018

(30) Foreign Application Priority Data

Jun. 30, 2016   (JP) ................. 2016-130233
Jun. 30, 2016   (JP) ................. 2016-130876
Jun. 30, 2016   (JP) ................. 2016-130883

(51) Int. Cl.
| | |
|---|---|
| G05B 19/00 | (2006.01) |
| G05B 19/408 | (2006.01) |
| B25J 9/10 | (2006.01) |
| B25J 9/16 | (2006.01) |
| B25J 13/02 | (2006.01) |
| B25J 13/00 | (2006.01) |
| G06F 19/00 | (2018.01) |

(52) U.S. Cl.
CPC ............ *G05B 19/4086* (2013.01); *B25J 9/10* (2013.01); *B25J 9/16* (2013.01); *B25J 13/02* (2013.01); *B25J 13/00* (2013.01); *G05B 2219/40* (2013.01); *G06F 19/00* (2013.01)

(58) Field of Classification Search
CPC ....... B25J 13/02; B25J 9/16; B25J 9/10; B25J 13/00; B25J 9/1692; B25J 9/009; B25J 9/1694; B25J 9/1697; Y10S 901/05; G01B 2210/58; G01B 21/042; G05B 19/4086; G05B 2219/40; G06F 19/00
USPC ........ 700/193, 170, 245, 254, 279; 318/572; 901/5, 8
See application file for complete search history.

(56) References Cited

U.S. PATENT DOCUMENTS

| | | | |
|---|---|---|---|
| 6,349,245 B1 * | 2/2002 | Finlay | ........... B25J 9/1697 700/245 |
| 7,196,721 B2 | 3/2007 | Uchiyama | |
| 2011/0029131 A1 * | 2/2011 | Ban | ........... B25J 9/1697 700/254 |
| 2016/0151915 A1 * | 6/2016 | Nishi | ........... B25J 9/1692 700/247 |

(Continued)

FOREIGN PATENT DOCUMENTS

| | | |
|---|---|---|
| JP | 08-085083 A | 4/1996 |
| JP | 08-216074 A | 8/1996 |
| JP | 2003-244521 A | 8/2003 |

(Continued)

*Primary Examiner* — Dalena Tran
(74) *Attorney, Agent, or Firm* — Harness, Dickey & Pierce, P.L.C.

(57) ABSTRACT

A robot includes a movable part, and the movable part performs an action based on a position of a first marker obtained using first position and attitude of the movable part when a first image containing the first marker is captured by an imaging unit provided in the movable part and second position and attitude of the movable part when a second image containing the first marker is captured by the imaging unit.

9 Claims, 39 Drawing Sheets

(56) References Cited

U.S. PATENT DOCUMENTS

2016/0288333 A1 10/2016 Yamaguchi et al.
2017/0151671 A1 6/2017 Ishige et al.

FOREIGN PATENT DOCUMENTS

| JP | 2016-097474 A | 5/2016 |
| JP | 2016-187846 A | 11/2016 |
| JP | 2017-100240 A | 6/2017 |

\* cited by examiner

| MARKER ID | X-COORDINATE | Y-COORDINATE |
|---|---|---|
| MK1 | 10 | 10 |
| MK2 | -10 | 10 |
| MK3 | -10 | 0 |
| MK4 | 0 | -10 |
| MK5 | 10 | -10 |

| MARKER CANDIDATE ID | X-COORDINATE | Y-COORDINATE |
|---|---|---|
| DP1 | 347 | 336 |
| DP2 | 284 | 100 |
| DP3 | 241 | 175 |
| DP4 | 272 | 293 |
| DP5 | 198 | 250 |
| DP6 | 434 | 186 |

FIG.28

| MARKER CANDIDATE ID | XY-COORDINATES BEFORE HOMOGRAPHY TRANSFORM | XY-COORDINATES AFTER HOMOGRAPHY TRANSFORM |
|---|---|---|
| DP1 | (347, 336) | (10, 10) |
| DP4 | (272, 293) | (-10, 10) |
| DP3 | (241, 175) | (-10, 0) |
| DP2 | (284, 100) | (0, -10) |
| DP6 | (434, 186) | (10, -10) |

FIG.29

| MARKER CANDIDATE ID | XY-COORDINATES BEFORE HOMOGRAPHY TRANSFORM | XY-COORDINATES AFTER HOMOGRAPHY TRANSFORM |
|---|---|---|
| DP6 | (434, 186) | (10, 10) |
| DP1 | (347, 336) | (-10, 10) |
| DP4 | (272, 293) | (-10, 0) |
| DP3 | (241, 175) | (0, -10) |
| DP2 | (284, 100) | (10, -10) |

FIG.30

| MARKER CANDIDATE ID PAIR | DISTANCE BETWEEN MARKER CANDIDATES |
|---|---|
| DP1-DP4 | 86.4523 |
| DP4-DP3 | 122.0041 |
| DP3-DP2 | 86.4523 |
| DP2-DP6 | 172.9046 |
| DP6-DP1 | 173.4042 |

ROBOT, ROBOT CONTROL APPARATUS AND ROBOT SYSTEM

BACKGROUND

1. Technical Field

The present invention relates to a robot, a robot control apparatus, and a robot system.

2. Related Art

Research and development of methods for teaching actions of robots to robot control apparatuses that operate the robots are carried out.

A direct teaching apparatus that allows a robot to be manually operated and a robot control apparatus to store positions and attitudes thereof is known (see Patent Document 1 (JP-A-08-216074)).

Further, research and development of technologies for imaging objects using imaging units and allowing robots to perform predetermined jobs based on the captured images are carried out. In the technologies, a calibration of correlating coordinates in a robot coordinate system as a coordinate system of a robot and coordinates in an imaging unit coordinate system as a coordinate system of an imaging unit may be performed. In the calibration, for example, a pattern for calibration is imaged by the imaging unit and coordinates in the imaging unit coordinate system and coordinates in the robot coordinate system are correlated based on the pattern contained in the captured image.

In this regard, a pattern for calibration having three or more first markers arranged in a line and a second marker provided in a position orthogonal to the line is known (see Patent Document 2 (JP-A-2003-244521)).

Further, in related art, before processing of a work using a tool attached to an arm, processing of setting offset of the tool with respect to the arm is performed. Patent Document 3 (JP-A-8-85083) discloses a method of deriving offset of a tool with respect to an arm based on results of execution of an operation of positioning the tool attached to the arm at a reference point in a real space at a plurality of times in different arm attitudes.

According to the technology described in Patent Document 1, a position of a reference point is taught by an operator operating an arm of the robot so that a tool grasped by the robot may be in contact with the reference point. However, it is not easy to correctly operate the arm while visually specifying the states in which the tool is barely in contact with the reference point. That is, in the technology described in Patent Document 1, it may be difficult to correctly teach the position of the reference point.

According to the technology described in Patent Document 2, the pattern for calibration may cause false detection of the second marker. As a result, it may be impossible for an apparatus that detects a position indicated by a geometric position relationship between the first markers and the second marker to accurately detect the position.

According to the technology described in Patent Document 3, it is necessary for the operator to teach the position of the reference point by operating the arm so that the tool may be in contact with the reference point. However, it is not easy to correctly operate the arm while visually specifying the states in which the tool is barely in contact with the reference point. That is, in the technology described in Patent Document 3, it may be difficult to correctly teach the position of the reference point. Further, if the offset of the tool is set while the position of the reference point is correctly taught, the time taken for the setting may be longer. The larger the number of robots to be set, the longer the required time.

SUMMARY

An aspect of the invention is directed to a robot including a movable part, wherein the movable part performs an action based on a position of a first marker obtained using first position and attitude of the movable part when a first image containing the first marker is captured by an imaging unit provided in the movable part and second position and attitude of the movable part when a second image containing the first marker is captured by the imaging unit.

According to this configuration, in the robot, the movable part performs the action based on the position of the first marker obtained using the first position and attitude of the movable part when the first image containing the first marker is captured by the imaging unit provided in the movable part and the second position and attitude of the movable part when the second image containing the first marker is captured by the imaging unit. Thereby, the robot may accurately perform a job including the action based on the position of the first marker without operation of the movable part by an operator.

In another aspect of the invention, the robot may be configured such that distances between the imaging unit and the first marker are the same between the first position and attitude and the second position and attitude.

According to this configuration, in the robot, the distances between the imaging unit and the first marker are the same between the first position and attitude and the second position and attitude. Thereby, the robot may accurately perform a job including the action based on the position of the first marker based on the first position and attitude and the second position and attitude in which the distances between the imaging unit and the first marker are the same.

In another aspect of the invention, the robot may be configured such that distances between the imaging unit and a control point of the movable part are the same between the first position and attitude and the second position and attitude.

According to this configuration, in the robot, the distances between the imaging unit and the control point of the movable part are the same between the first position and attitude and the second position and attitude. Thereby, the robot may accurately perform a job including the action based on the position of the first marker based on the first position and attitude and the second position and attitude in which the distances between the imaging unit and the control point of the movable part are the same.

In another aspect of the invention, the robot may be configured such that the position and the attitude of the movable part change to the second position and attitude obtained using a third image captured by the imaging unit when changing from the first position and attitude to third position and attitude.

According to this configuration, in the robot, the position and the attitude of the movable part change to the second position and attitude obtained using the third image captured by the imaging unit when changing from the first position and attitude to the third position and attitude. Thereby, the robot may accurately perform a job including the action based on the position of the first marker based on the first position and attitude and the second position and attitude obtained using the third image.

In another aspect of the invention, the robot may be configured such that a position of the first marker in the second image is a position corresponding to a position of the first marker in the first image.

According to this configuration, in the robot, the action is performed based on the position of the first marker obtained using the first position and attitude and the second position and attitude in which the position of the first marker in the second image coincides with the position corresponding to the position of the first marker in the first image of the positions in the second image. Thereby, the robot may accurately perform a job including the action based on the position of the first marker based on the first position and attitude and the second position and attitude in which the position of the first marker in the second image coincides with the position corresponding to the position of the first marker in the first image of the positions in the second image.

In another aspect of the invention, the robot may be configured such that the position of the first marker in the first image is a center position in the first image, and the position of the first marker in the second image is a center position in the second image corresponding to that center position.

According to this configuration, in the robot, the action is performed based on the position of the first marker obtained using the first position and attitude in which the position of the first marker in the first image coincides with the center position in the first image and the second position and attitude in which the position of the first marker in the second image coincides with the center position in the second image. Thereby, the robot may accurately perform a job including the action based on the position of the first marker based on the first position and attitude in which the position of the first marker in the first image coincides with the center position in the first image and the second position and attitude in which the position of the first marker in the second image coincides with the center position in the second image.

In another aspect of the invention, the robot may be configured such that an optical axis on which the first image is captured by the imaging unit in the first position and attitude and an optical axis on which the second image is captured by the imaging unit in the second position and attitude are parallel.

According to this configuration, in the robot, the optical axis on which the first image is captured by the imaging unit in the first position and attitude and the optical axis on which the second image is captured by the imaging unit in the second position and attitude are parallel. Thereby, the robot may accurately perform a job including the action based on the position of the first marker based on the first position and attitude and the second position and attitude in which the optical axis of the imaging unit is parallel to the optical axis on which the first image is captured by the imaging unit in the first position and attitude.

In another aspect of the invention, the robot may be configured such that an optical axis on which the first image is captured by the imaging unit in the first position and attitude and an optical axis on which the second image is captured by the imaging unit in the second position and attitude are non-parallel.

According to this configuration, in the robot, the optical axis on which the first image is captured by the imaging unit in the first position and attitude and the optical axis on which the second image is captured by the imaging unit in the second position and attitude are non-parallel. Thereby, the robot may accurately perform a job including the action based on the position of the first marker based on the first position and attitude and the second position and attitude in which the optical axis of the imaging unit is non-parallel to the optical axis on which the first image is captured by the imaging unit in the first position and attitude.

In another aspect of the invention, the robot may be configured such that the movable part performs an action based on a position of a second marker obtained using the position of the first marker, the first position and attitude, and fourth position and attitude of the movable part when a fourth image containing the second marker is captured by the imaging unit.

According to this configuration, in the robot, the movable part performs the action based on the position of the second marker obtained using the position of the first marker, the first position and attitude, and the fourth position and attitude of the movable part when the fourth image containing the second marker is captured by the imaging unit. Thereby, the robot may accurately perform a job including the action based on the position of the second marker based on the position of the first marker, the first position and attitude, and the fourth position and attitude of the movable part when the fourth image containing the second marker is captured by the imaging unit.

In another aspect of the invention, the robot may be configured such that distances between a plane containing the first marker and the second marker and a control point of the movable part are the same between the first position and attitude and the fourth position and attitude.

According to this configuration, in the robot, the distances between the plane containing the first marker and the second marker and the control point of the movable part are the same between the first position and attitude and the fourth position and attitude. Thereby, the robot may accurately perform a job including the action based on the position of the second marker based on the first position and attitude and the fourth position and attitude in which the distances between the plane containing the first marker and the second marker and the control point of the movable part are the same.

An aspect of the invention is directed to a robot control apparatus that controls the robot described above.

According to this configuration, in the robot control apparatus, the robot is allowed to perform the action based on the position of the first marker obtained using the first position and attitude of the movable part when the first image containing the first marker is captured by the imaging unit provided in the movable part and the second position and attitude of the movable part when the second image containing the first marker is captured by the imaging unit. Thereby, the robot control apparatus may allow the robot to accurately perform a job including the action based on the position of the first marker without operation of the movable part by an operator.

An aspect of the invention is directed to a robot system including the robot described above and the robot control apparatus described above.

According to this configuration, in the robot system, the robot is allowed to perform the action based on the position of the first marker obtained using the first position and attitude of the movable part when the first image containing the first marker is captured by the imaging unit provided in the movable part and the second position and attitude of the movable part when the second image containing the first marker is captured by the imaging unit. Thereby, the robot system may allow the robot to accurately perform a job including the action based on the position of the first marker without operation of the movable part by an operator.

As described above, in the robot, the movable part performs the action based on the position of the first marker obtained using the first position and attitude of the movable part when the first image containing the first marker is captured by the imaging unit provided in the movable part and the second position and attitude of the movable part when the second image containing the first marker is captured by the imaging unit. Thereby, the robot may accurately perform a job including the action based on the position of the first marker without operation of the movable part by an operator.

In the robot control apparatus, the robot is allowed to perform the action based on the position of the first marker obtained using the first position and attitude of the movable part when the first image containing the first marker is captured by the imaging unit provided in the movable part and the second position and attitude of the movable part when the second image containing the first marker is captured by the imaging unit. Thereby, the robot control apparatus may allow the robot to accurately perform a job including the action based on the position of the first marker without operation of the movable part by an operator.

In the robot system, the robot is allowed to perform the action based on the position of the first marker obtained using the first position and attitude of the movable part when the first image containing the first marker is captured by the imaging unit provided in the movable part and the second position and attitude of the movable part when the second image containing the first marker is captured by the imaging unit. Thereby, the robot system may allow the robot to accurately perform a job including the action based on the position of the first marker without operation of the movable part by an operator.

An aspect of the invention is directed to a calibration board including four or more markers and the respective four or more markers are located at vertices of a convex hull without rotational symmetry.

According to this configuration, in the calibration board, the respective four or more markers are located at the vertices of the convex hull without rotational symmetry. Thereby, the calibration board may enable accurate detection of positions according to the four or more markers.

In another aspect of the invention, the calibration board may be configured such that the respective four or more markers are figure center markers.

According to this configuration, in the calibration board, the respective four or more markers are the figure center markers. Thereby, the calibration board may enable accurate detection of positions according to the four or more figure center markers.

In another aspect of the invention, the calibration board may be configured such that the respective figure center markers have figures in which three or more figure centers overlap.

According to this configuration, in the calibration board, the respective figure center markers have figures in which three or more figure centers overlap. Thereby, the calibration board may enable detection of the four or more figure center markers having figures in which three or more figure centers overlap from images without errors.

In another aspect of the invention, the calibration board may be configured such that a length of aside containing a first marker in the convex hull is longer than lengths of the other sides in the convex hull.

According to this configuration, in the calibration board, the length of the side containing the first marker in the convex hull is longer than the lengths of the other sides in the convex hull. Thereby, the calibration board may enable efficient detection of the positions according to the four or more markers with reference to the first marker.

In another aspect of the invention, the calibration board may be configured such that an origin is provided inside of the convex hull.

According to this configuration, in the calibration board, the origin is provided inside of the convex hull. Thereby, the calibration board may indicate the positions according to the four or more markers more precisely using the origin.

In another aspect of the invention, the calibration board may be configured such that a first reference portion and a second reference portion are provided outside of the convex hull and a straight line passing through the origin and the first reference portion and a straight line passing through the origin and the second reference portion are orthogonal.

According to this configuration, in the calibration board, the straight line passing through the origin and the first reference portion and the straight line passing through the origin and the second reference portion are orthogonal. Thereby, the calibration board may indicate an attitude of the calibration board more precisely using the first reference portion and the second reference portion.

In another aspect of the invention, the calibration board may be configured such that the number of markers is five.

According to this configuration, in the calibration board, the number of markers is five. Thereby, the calibration board may enable accurate detection of positions according to the five markers.

An aspect of the invention is directed to a robot including a movable part, wherein the movable part acts based on an image formed by imaging of a pattern of four or more markers respectively located at vertices of a convex hull by an imaging unit.

According to this configuration, the robot acts based on the image formed by imaging of the pattern of the four or more markers respectively located at the vertices of the convex hull by the imaging unit. Thereby, the robot may accurately perform a predetermined job based on the position according to the four or more markers detected from the image captured by the imaging unit.

In another aspect of the invention, the robot may be configured such that a calibration between a coordinate system of the robot and a coordinate system of the imaging unit is performed based on the image formed by imaging of the pattern by the imaging unit.

According to this configuration, in the robot, the calibration between the coordinate system of the robot and the coordinate system of the imaging unit is performed based on the image formed by imaging of the pattern of the four or more markers respectively located at the vertices of the convex hull by the imaging unit. Thereby, the robot may accurately calculate a position in the coordinate system of the robot according to the position in the coordinate system of the imaging unit.

In another aspect of the invention, the robot may be configured such that the respective four or more markers are figure center markers.

According to this configuration, the robot acts based on the image formed by imaging of the pattern of the four or more markers respectively located at the vertices of the convex hull by the imaging unit. Thereby, the robot may accurately perform a predetermined job based on the positions according to the four or more figure center markers detected from the image captured by the imaging unit.

In another aspect of the invention, the robot may be configured such that the respective figure center markers have figures in which three or more figure centers overlap.

According to this configuration, the robot acts based on the image formed by imaging of the pattern of the figure center markers having the figures in which three or more figure centers overlap. Thereby, the robot may accurately perform a predetermined job based on the positions according to the four or more figure center markers having the figures in which three or more figure centers overlap detected from the image captured by the imaging unit.

In another aspect of the invention, the robot may be configured such that a length of a side containing a first marker in the convex hull is longer than lengths of the other sides in the convex hull.

According to this configuration, the robot acts based on the image formed by imaging of the pattern of the four or more markers having the length of the side containing the first marker in the convex hull longer than the lengths of the other sides in the convex hull. Thereby, the robot may efficiently detect the positions according to the four or more markers from the image captured by the imaging unit with reference to the first marker, and may accurately perform a predetermined job based on the detected positions.

In another aspect of the invention, the robot may be configured such that an origin is provided inside of the convex hull.

According to this configuration, the robot acts based on the image formed by imaging of the pattern of the four or more markers located at the vertices of the convex hull and including the origin inside of the convex hull by the imaging unit. Thereby, the robot may accurately perform a predetermined job based on the position indicated by the origin provided inside of the convex hull and detected from the image captured by the imaging unit.

In another aspect of the invention, the robot may be configured such that a first reference portion and a second reference portion are provided outside of the convex hull and a straight line passing through the origin and the first reference portion and a straight line passing through the origin and the second reference portion are orthogonal.

According to this configuration, the robot acts based on the image formed by imaging of the pattern of the four or more markers located at the vertices of the convex hull having the first reference portion and the second reference portion outside by the imaging unit. Thereby, the robot may accurately detect an attitude of the calibration board and accurately perform a predetermined job based on the detected attitude.

In another aspect of the invention, the robot may be configured such that the number of markers is five.

According to this configuration, the robot acts based on the image formed by imaging of the pattern of the five markers respectively located at vertices of a convex hull. Thereby, the robot may accurately perform a predetermined job based on the position according to the five markers detected from the image captured by the imaging unit.

An aspect of the invention is directed to a detection method of detecting a predetermined number of candidates that match a reference pattern of the predetermined number (four or more) of markers respectively located at vertices of a convex hull without rotational symmetry from the candidates of the markers contained in an image captured by an imaging unit.

According to this configuration, the detection method detects the predetermined number of candidates that match the reference pattern of the predetermined number (four or more) of markers respectively located at vertices of the convex hull without rotational symmetry from the candidates of the markers contained in the image captured by the imaging unit. Thereby, the detection method may enable the accurate detection of the position according to the four or more markers.

In another aspect of the invention, the detection method may be configured such that the predetermined number of candidates is detected based on matching between a result of homography transform of a first pattern of the predetermined number of candidates selected from the candidates of the markers contained in the image captured by the imaging unit and the reference pattern.

According to this configuration, the detection method detects the predetermined number of candidates based on matching between the result of homography transform of the first pattern of the predetermined number of candidates selected from the candidates of the markers contained in the image captured by the imaging unit and the reference pattern. Thereby, even when a wrong marker is included in the candidates of the marker contained in the image, the detection method may enable correct detection of the pattern of the four or more markers.

In another aspect of the invention, the detection method may be configured such that the matching is expressed by a difference between the result of homography transform and the reference pattern.

According to this configuration, in the detection method, the matching with the reference pattern is expressed by the difference between the result of homography transform of the first pattern and the reference pattern. Thereby, even when a wrong marker is included in the candidates of the marker contained in the image, the detection method may enable correct detection of the pattern of the four or more markers based on the matching expressed by the difference between the result of homography transform of the first pattern and the reference pattern.

As described above, in the calibration board, the the respective four or more markers are located at the vertices of the convex hull without rotational symmetry. Thereby, the calibration board may enable accurate detection of positions according to the four or more markers.

The robot acts based on the image formed by imaging of the pattern of the four or more markers respectively located at the vertices of the convex hull by the imaging unit. Thereby, the robot may accurately perform a predetermined job based on the positions according to the four or more markers detected from the image captured by the imaging unit.

The detection method detects the predetermined number of candidates based on matching between the result of homography transform of the first pattern of the predetermined number of candidates selected from the candidates of the markers contained in the image captured by the imaging unit and the reference pattern. Thereby, even when a wrong marker is included in the candidates of the marker contained in the image, the detection method may enable correct detection of the pattern of the four or more markers.

An aspect of the invention is directed to a robot including an arm, wherein, in a second state to which a predetermined part of a tool attached to the arm is moved from a first state in which the predetermined part can be imaged, the arm rotates the tool about a rotation axis passing through the predetermined part in parallel to an optical axis of the imaging unit, moves the predetermined part to a third state in the same position as the position in the first state while keeping an attitude change due to the rotation, and is controlled using offset of the predetermined part with respect to the arm set based on images captured by the imaging unit in the first state and the third state.

According to this configuration, in the robot, the offset of the predetermined part with respect to the arm is set based on the images captured by the imaging unit in the first state and the third state. Thereby, the robot may reduce human errors and variations by an operator than those in setting of the offset of the tool while teaching the position of the reference point by operation of the arm by an operator.

In another aspect of the invention, the robot may be configured such that, when an obstacle exists in the first state, the arm moves the tool from the first state to a second state without the obstacle.

According to this configuration, the robot rotates the tool about the rotation axis passing through the predetermined part in parallel to the optical axis of the imaging unit. Thereby, the robot may rotate the tool about the rotation axis passing through the predetermined part in parallel to the optical axis of the imaging unit while avoiding a collision with an obstacle, and therefore, even when the obstacle exists around the predetermined part of the tool, may accurately calculate offset.

An aspect of the invention is directed to a control apparatus that controls the robot described above.

According to this configuration, the control apparatus sets the offset of the predetermined part with respect to the arm in the robot based on the images captured by the imaging unit in the first state and the third state. Thereby, the control apparatus may set the offset more accurately than in the case where the operator operates the arm to set the offset of the tool in the robot while teaching the position of the reference point.

An aspect of the invention is directed to a robot system including the robot described above and the control apparatus described above.

According to this configuration, in the robot system, the control apparatus sets the offset of the predetermined part with respect to the arm in the robot based on the images captured by the imaging unit in the first state and the third state. Thereby, in the robot system, the control apparatus may set the offset more accurately than in the case where the operator operates the arm to set the offset of the tool in the robot while teaching the position of the reference point.

As described above, in the robot, the offset of the predetermined part with respect to the arm is set based on the images captured by the imaging unit in the first state and the third state. Thereby, the robot may reduce human errors and variations by an operator than those in setting of the offset of the tool while teaching the position of the reference point by operation of the arm by the operator.

The control apparatus sets the offset of the predetermined part with respect to the arm in the robot based on the images captured by the imaging unit in the first state and the third state. Thereby, the control apparatus may set the offset more accurately than in the case where the operator operates the arm to set the offset of the tool in the robot while teaching the position of the reference point.

In the robot system, the control apparatus sets the offset of the predetermined part with respect to the arm in the robot based on the images captured by the imaging unit in the first state and the third state. Thereby, in the robot system, the control apparatus may set the offset more accurately and easily than in the case where the operator operates the arm to set the offset of the tool in the robot while teaching the position of the reference point.

BRIEF DESCRIPTION OF THE DRAWINGS

The invention will be described with reference to the accompanying drawings, wherein like numbers reference like elements.

FIG. 28 is a table showing examples of X-coordinates and Y-coordinates of respective marker candidates in an imaging unit coordinate system specified by a detection part.

FIG. 29 shows an example of coordinates in a two-dimensional coordinate system of respective marker candidates contained in a first combination after homography transform is performed at step S460.

FIG. 30 shows another example of coordinates in the two-dimensional coordinate system of the respective marker candidates contained in the first combination after homography transform is performed at step S460.

DESCRIPTION OF EXEMPLARY EMBODIMENTS

First Embodiment

As below, an embodiment of the invention will be explained with reference to the drawings.

Configuration of Robot System

First, a configuration of a robot system 1 will be explained.

Figure 1:
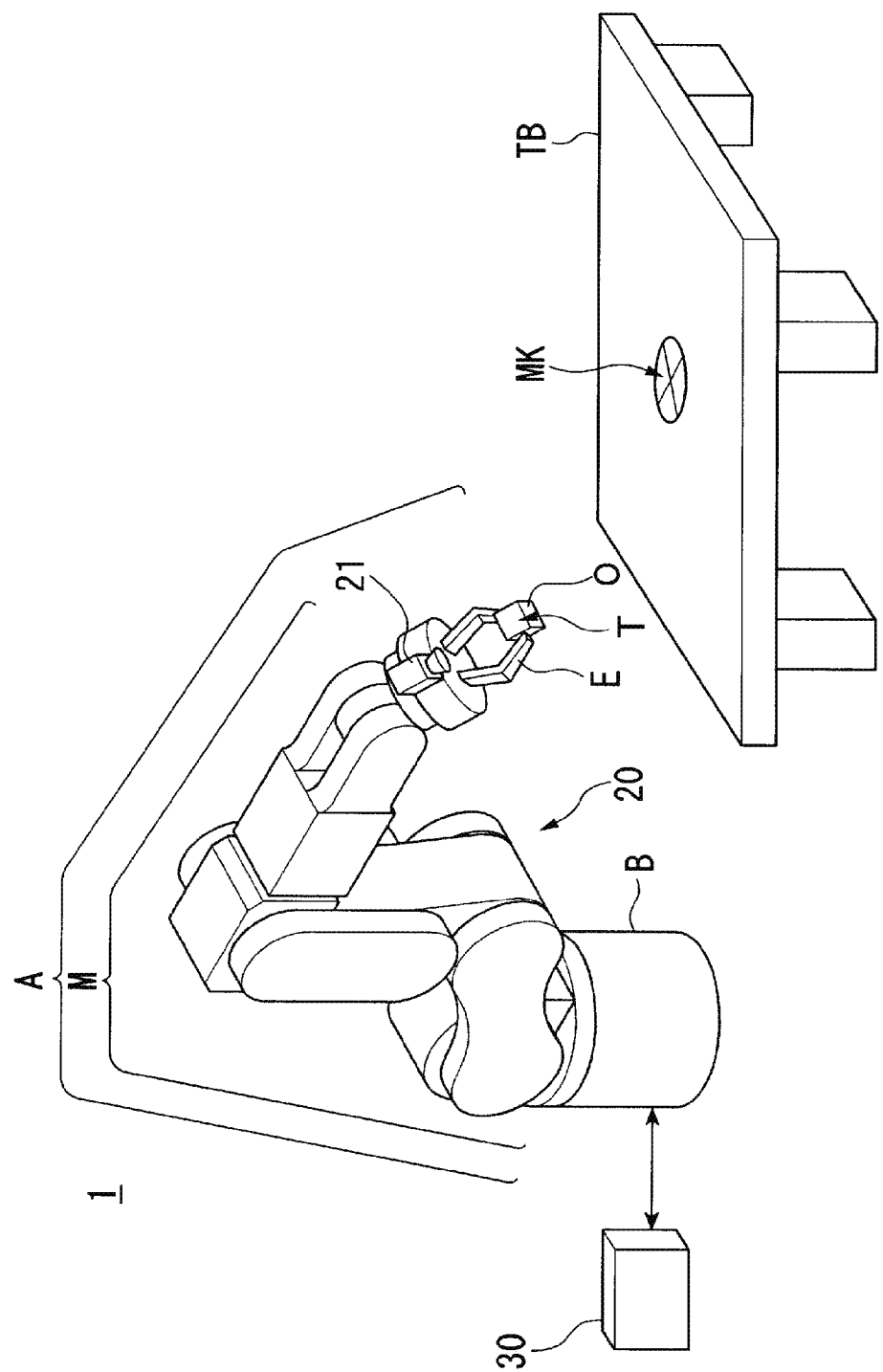
FIG. 1 shows an example of a configuration of a robot system according to the first embodiment.

FIG. 1 shows an example of the configuration of the robot system 1 according to the embodiment. The robot system 1 includes a robot 20 and a robot control apparatus 30.

The robot 20 is a single-arm robot including an arm A and a support B that supports the arm A. The single-arm robot is a robot having a single arm like the arm A in the example. Note that the robot 20 may be a multi-arm robot in place of the single-arm robot. The multi-arm robot is a robot having two or more arms (e.g. two or more arms A). Of the multi-arm robots, a robot having two arms is also called a dual-arm robot. That is, the robot 20 may be a dual-arm robot having two arms or a multi-arm robot having three or more arms (e.g. three or more arms A). Alternatively, the robot 20 may be another robot such as a scalar robot, Cartesian coordinate robot, or cylindrical robot. The Cartesian coordinate robot is e.g. a gantry robot.

The arm A includes an end effector E, a manipulator M, and an imaging unit 21. The arm A is an example of a movable part.

The end effector E is an end effector having a finger part that can grasp an object in the example. Note that the end effector E may be another end effector that can lift an object using suction by air, a magnetic force, a jig, or the like in place of the end effector having the finger part.

The end effector E is communicably connected to the robot control apparatus 30 by a cable. Thereby, the end effector E performs actions according to control signals acquired from the robot control apparatus 30. Wired communications via the cable are performed according to standards of e.g. Ethernet (registered trademark), USB (Universal Serial Bus), or the like. Alternatively, the end effector E may be adapted to be connected to the robot control apparatus 30 via wireless communications performed according to communication standards of Wi-Fi (registered trademark) or the like.

The manipulator M has six joints. Further, each of the six joints has an actuator (not shown). That is, the arm A having the manipulator M is a six-axis vertical articulated arm. The arm A performs actions at the degree of freedom of six axes by cooperative motion of the support B, the end effector E, the manipulator M, and the respective actuators of the six joints of the manipulator M. Note that the arm A may be adapted to act at the degree of freedom of five or less axes or act at the degree of freedom of seven or more axes.

The six actuators (of the joints) of the manipulator M are respectively communicably connected to the robot control apparatus 30 by cables. Thereby, the actuators operate the manipulator M based on the control signals acquired from the robot control apparatus 30. Wired communications via the cables are performed according to standards of e.g. Ethernet (registered trademark), USB, or the like. Alternatively, part or all of the six actuators of the manipulator M may be adapted to be connected to the robot control apparatus 30 via wireless communications performed according to communication standards of Wi-Fi (registered trademark) or the like.

The imaging unit 21 is a camera including e.g. a CCD (Charge Coupled Device), a CMOS (Complementary Metal Oxide Semiconductor), or the like as an imaging device that converts collected lights into electrical signals. The imaging unit 21 is provided in a part of the manipulator M1. Accordingly, the imaging unit 21 moves according to the movement of the arm A. That is, the range that can be imaged by the imaging unit 21 changes according to the movement of the arm A. The imaging unit 21 may be adapted to capture a still image of the range or a moving image of the range. As below, as an example, the case where the imaging unit 21 captures a still image of the range will be explained. A position on the captured image captured by the imaging unit 21 is expressed by X-axis and Y-axis coordinates in an imaging unit coordinate system CC. The imaging unit coordinate system CC is a three-dimensional local coordinate system associated with the captured image captured by the imaging unit 21.

As below, as an example, the case where the imaging unit 21 is provided in an arm member closest to the end effector E of five arm members of the manipulator M will be explained. The arm member refers to a member that connects between the joints of the manipulator M. Further, as below, the case where the optical axis of the imaging unit 21 is oriented in a direction along a rotation axis of the joint that rotates the end effector E of the six joints of the manipulator M from the joint toward the end effector E will be explained.

Further, the imaging unit 21 is communicably connected to the robot control apparatus 30 by a cable. Wired communications via the cable are performed according to standards of e.g. Ethernet (registered trademark), USB, or the like. Alternatively, the imaging unit 21 may be adapted to be connected to the robot control apparatus 30 via wireless communications performed according to communication standards of Wi-Fi (registered trademark) or the like. In FIG. 1, to avoid complication of the drawing, the cable connecting the imaging unit 21 and the robot control apparatus 30 is omitted.

The robot control apparatus 30 is a controller that controls (operates) the robot in the example. The robot control apparatus 30 allows the imaging unit 21 to image a range that can be imaged by the imaging unit 21. The robot control apparatus 30 acquires a captured image captured by the imaging unit 21 from the imaging unit 21. The robot control apparatus 30 allows the robot 20 to perform a predetermined job based on the acquired captured image.

Outline of Predetermined Job Performed by Robot

As below, an outline of a predetermined job performed by the robot 20 will be explained.

In the example shown in FIG. 1, a worktable TB is placed in a region in which the robot 20 can perform a job using the end effector E. The worktable TB is e.g. a table. Note that the worktable TB may be another object including a floor surface and a shelf in place of the table.

A first marker MK is provided on the top surface of the worktable TB. The first marker MK indicates a position associated with the first marker MK. The position is a position in a robot coordinate system RC. The first marker MK may be any marker that may indicate the position associated with the first marker MK. As below, as an example, the case where the position is a position of the center of the figure of the first marker MK will be explained. Further, as an example, the case where the position of the first marker MK is shown by the position indicated by the first marker MK. Note that, in the example shown in FIG. 1, the shape of the first marker MK is a circular shape, but may be another shape instead. Further, the position of the first marker MK is another position different from the position indicated by the first marker MK and associated with the first marker MK.

In the example, the robot 20 performs a job of mounting an object O grasped by the end effector E in advance on the position shown by the first marker MK of the positions on the top surface of the worktable TB as a predetermined job. Here, the object O is e.g. an industrial part or member including a plate, screw, or bolt to be assembled in a product. In FIG. 1, for simplification of the drawing, the object O is shown as an object having a rectangular parallelepiped shape. Note that, in place of the industrial part or member, the object O may be another object including a commodity or biological object. Further, the shape of the object O may be another shape in place of the rectangular parallelepiped shape.

Outline of Processing Performed by Robot Control Apparatus

As below, an outline of processing performed by the robot control apparatus 30 for allowing the robot 20 to perform the predetermined job will be explained.

In the robot control apparatus 30, coordinates indicating a predetermined position in the imaging unit coordinate system CC are stored in advance. The coordinates are X-axis and Y-axis coordinates in the imaging unit coordinate system CC. The position is a target position with which the position of the first marker MK is allowed to coincide on the captured image captured by the imaging unit 21. As below, for convenience of explanation, the position indicated by the coordinates on the captured image is referred to as "coincidence point". Further, as below, as an example, the case where the coincidence point is in a center position (position at the center) on the captured image will be explained. Note that the coincidence point may be in another position on the captured image instead.

The robot control apparatus 30 sets a control point T that moves with the end effector E in a position associated with the end effector E in advance. The position is a position in the robot coordinate system RC. The position associated with the end effector E in advance is e.g. a position of the center of gravity of the object O grasped by the end effector E. The control point T is e.g. a TCP (Tool Center Point). Note that the control point T may be another virtual point including a virtual point associated with a part of the arm A in place of the TCP. That is, the control point T may be set in a position of another part of the end effector E or set to some position associated with the manipulator M in place of the position associated with the end effector E.

The control point T is associated with control point position information as information representing the position of the control point T and control point attitude information as information representing the attitude of the control point T. The position is a position in the robot coordinate system RC. The attitude is an attitude in the robot coordinate system RC. Note that the control point T may be additionally associated with other information. When the robot control apparatus 30 designates (determines) the control point position information and the control point attitude information, the position and the attitude of the control point T are determined. The position and the attitude are a position and an attitude in the robot coordinate system RC. The robot control apparatus 30 designates the control point position information and the control point attitude information. The robot control apparatus 30 operates the arm A, and allows the position of the control point T to coincide with the position represented by the control point position information designated by the robot control apparatus 30 and the attitude of the control point T to coincide with the attitude represented by the control point attitude information designated by the robot control apparatus 30. Hereinafter, for convenience of explanation, the position represented by the control point position information designated by the robot control apparatus 30 is referred to as "target position" and the attitude represented by the control point attitude information designated by the robot control apparatus 30 is referred to as "target attitude". That is, the robot control apparatus 30 designates the control point position information and the control point attitude information, and thereby, operates the robot 20 to allow the position and the attitude of the control point T to coincide with the target position and the target attitude.

In the example, the position of the control point T is indicated by the position of the origin of a control point coordinate system TC in the robot coordinate system RC. Further, the attitude of the control point T is indicated by directions of the respective coordinate axes of the control point coordinate system TC in the robot coordinate system RC. The control point coordinate system TC is a three-dimensional local coordinate system associated with the control point T to move with the control point T.

The robot control apparatus 30 sets the control point T based on control point setting information input from a user in advance. The control point setting information is e.g. information representing relative position and attitude between the position and the attitude of the center of gravity of the end effector E and the position and the attitude of the control point T. Note that the control point setting information may be information representing relative position and attitude between some position and attitude associated with the end effector E and the position and the attitude of the control point T, may be information representing relative position and attitude between some position and attitude associated with the manipulator M and the position and the attitude of the control point T, or may be information representing relative position and attitude between some position and attitude associated with another part of the robot 20 and the position and the attitude of the control point T instead.

The robot control apparatus 30 moves the arm A and allows the position and the attitude of the arm A to coincide with waiting position and attitude X1. In the example, the position and the attitude of the arm A are represented by the position and the attitude of the control point T. That is, the robot control apparatus 30 moves the control point T and allows the position and the attitude of the control point T to coincide with the waiting position and attitude X1. The waiting position and attitude X1 are a position and an attitude in which the first marker MK can be imaged by the imaging unit 21 of the positions and the attitudes of the control point T. The robot control apparatus 30 allows the imaging unit 21 to image a range that can be imaged by the imaging unit 21 in a state in which the position and the attitude of the control point T and the waiting position and attitude X1 coincide. Then, the robot control apparatus 30 acquires the captured image captured by the imaging unit 21 from the imaging unit 21.

The robot control apparatus 30 calculates first position and attitude as the position and the attitude of the control point T when the coincidence point on the captured image and the position of the first marker MK contained in the captured image coincide based on the captured image acquired from the imaging unit 21. The robot control apparatus 30 moves the control point T based on the calculated first position and attitude and allows the position and the attitude of the control point T to coincide with the first position and attitude. Then, the robot control apparatus 30 allows the imaging unit 21 to image a range that can be imaged by the imaging unit 21 in a state in which the position and the attitude of the control point T and the first position and attitude coincide. Hereinafter, for convenience of explanation, the captured image captured by the imaging unit 21 when the position and the attitude of the control point T coincide with the first position and attitude is referred to as "first image". The robot control apparatus 30 acquires the first image captured by the imaging unit 21 from the imaging unit 21.

Further, the robot control apparatus 30 calculates second position and attitude different from the first position and attitude based on the first image acquired from the imaging unit 21. When the position and the attitude of the control point T coincide with the second position and attitude, the position of the first marker MK contained in the captured image and the coincidence point on the captured image coincide on the captured image captured by the imaging unit 21. That is, the second position and attitude are a position and an attitude different from the first position and attitude, in which the first marker MK contained in the captured image when the captured image is captured by the imaging unit 21 and the coincidence point on the captured image coincide. The robot control apparatus 30 moves the control point T based on the calculated second position and attitude and allows the position and the attitude of the control point T to coincide with the second position and attitude. Then, the robot control apparatus 30 allows the imaging unit 21 to image a range that can be imaged by the imaging unit 21 in a state in which the position and the attitude of the control point T is allowed to coincide with the second position and attitude. Hereinafter, for convenience of explanation, the captured image captured by the imaging unit 21 when the position and the attitude of the control point T coincide with the first position and attitude is referred to as "second image".

The robot control apparatus 30 allows the robot 20 to perform actions based on the position of the first marker MK obtained using the first position and attitude of the control point T when the first image containing the first marker MK is captured by the imaging unit 21 provided in the arm A and the second position and attitude of the control point T when the second image containing the first marker MK is captured by the imaging unit 21. The position is a position in the robot coordinate system RC. Thereby, the robot control apparatus 30 may allow the robot 20 to accurately perform a job including the actions based on the position of the first marker MK without operation of the arm A by an operator unlike direct teaching or online teaching. In other words, the robot control apparatus 30 may allow the robot 20 to accurately perform a job including the actions based on the position of the first marker MK without teaching of the position of the first marker MK by an operator. As below, processing of calculating the position of the first marker MK by the robot control apparatus 30 will be explained in detail.

Hardware Configuration of Robot Control Apparatus

As below, referring to FIG. 2, a hardware configuration of the robot control apparatus 30 will be explained.

Figure 2:
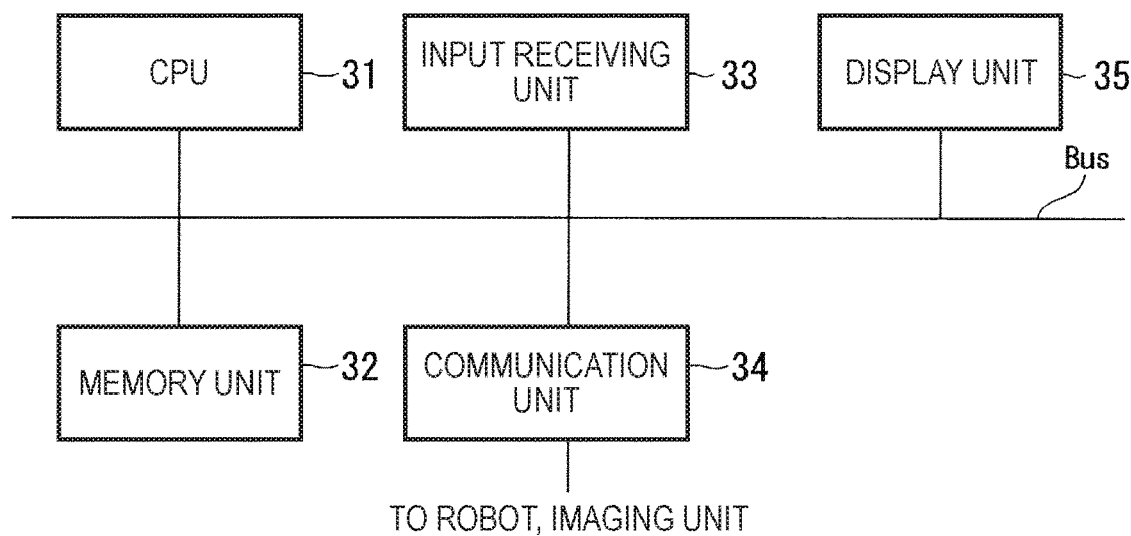
FIG. 2 shows an example of a hardware configuration of a robot control apparatus.

FIG. 2 shows an example of the hardware configuration of the robot control apparatus 30.

The robot control apparatus 30 includes e.g. a CPU (Central Processing Unit) 31, a memory unit 32, an input receiving unit 33, a communication unit 34, and a display unit 35. These component elements are communicably connected to one another via a bus Bus. Further, the robot control apparatus 30 communicates with the robot 20 via the communication unit 34.

The CPU 31 executes various programs stored in the memory unit 32.

The memory unit 32 includes e.g. an HDD (Hard Disk Drive), SSD (Solid State Drive), EEPROM (Electrically Erasable Programmable Read-Only Memory), ROM (Read-Only Memory), RAM (Random Access Memory), or the like. Note that the memory unit 32 may be an external memory device connected via a digital I/O port including USB or the like in place of the unit built in the robot control apparatus 30. The memory unit 32 stores e.g. various kinds of information to be processed by the robot control apparatus 30, programs including operation programs for operating the robot 20, various images, coordinates indicating the coincidence point in the above described imaging unit coordinate system CC, etc.

The input receiving unit 33 is e.g. a touch panel integrally formed with the display unit 35. Note that the input receiving unit 33 may be an input device including a keyboard, mouse, touch pad, etc.

The communication unit 34 includes e.g. a digital I/O port such as USB, Ethernet (registered trademark) port, etc.

The display unit 35 is e.g. a liquid crystal display panel or organic EL (ElectroLuminescence) display panel.

Functional Configuration of Robot Control Apparatus

As below, a functional configuration of the robot control apparatus 30 will be explained with reference to FIG. 3.

Figure 3:
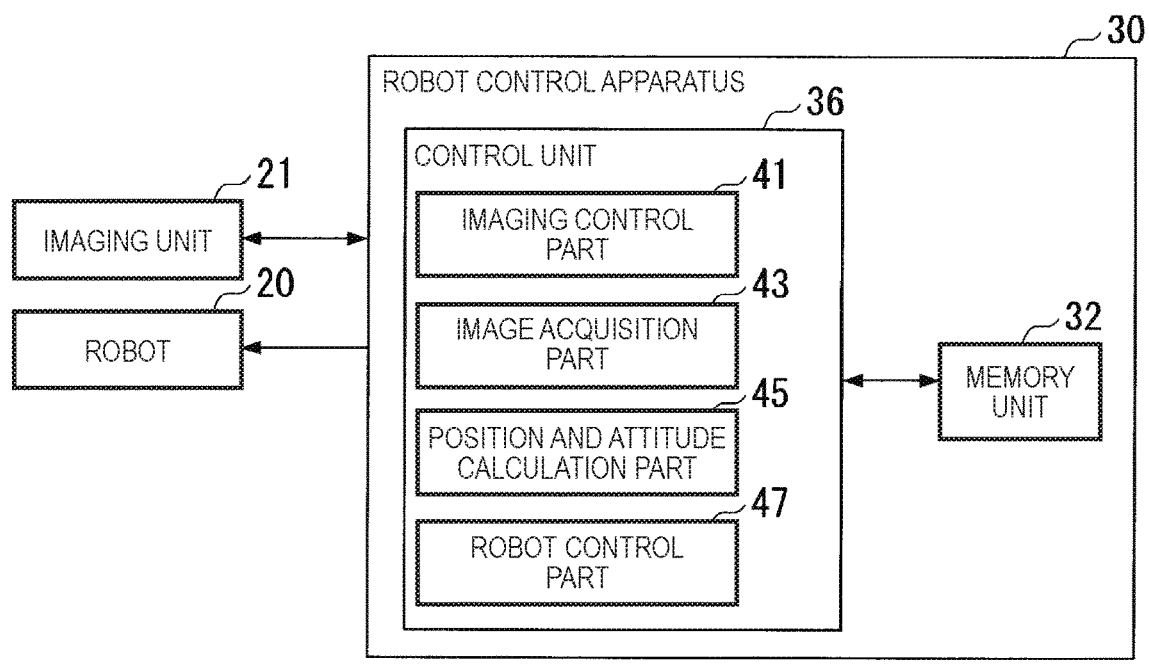
FIG. 3 shows an example of a functional configuration of the robot control apparatus.

FIG. 3 shows an example of the functional configuration of the robot control apparatus 30.

The robot control apparatus 30 includes the memory unit 32 and a control unit 36.

The control unit 36 controls the entire robot control apparatus 30. The control unit 36 includes an imaging control part 41, an image acquisition part 43, a position and attitude calculation part 45, and a robot control part 47. These functional parts of the control unit 36 are realized by e.g. the CPU 31 executing various programs stored in the memory unit 32. Further, part or all of the functional parts may be a hardware functional part such as an LSI (Large Scale Integration) or ASIC (Application Specific Integrated Circuit).

The imaging control part 41 allows the imaging unit 21 to image a range that can be imaged by the imaging unit 21.

The image acquisition part 43 acquires the captured image captured by the imaging unit 21 from the imaging unit 21.

The position and attitude calculation part 45 calculates the first position and attitude based on the captured image acquired by the image acquisition part 43. Further, the position and attitude calculation part 45 calculates the second position and attitude based on the captured image acquired by the image acquisition part 43. Furthermore, the position and attitude calculation part 45 calculates the position of the first marker MK based on the calculated first position and attitude and second position and attitude. The position is a position in the robot coordinate system RC.

The robot control part 47 allows the robot 20 to perform a predetermined job based on the position of the first marker MK calculated by the position and attitude calculation part 45. The position is a position in the robot coordinate system RC.

Processing Performed by Robot Control Apparatus

As below, referring to FIG. 4, processing performed by the robot control apparatus 30 will be explained.

Figure 4:
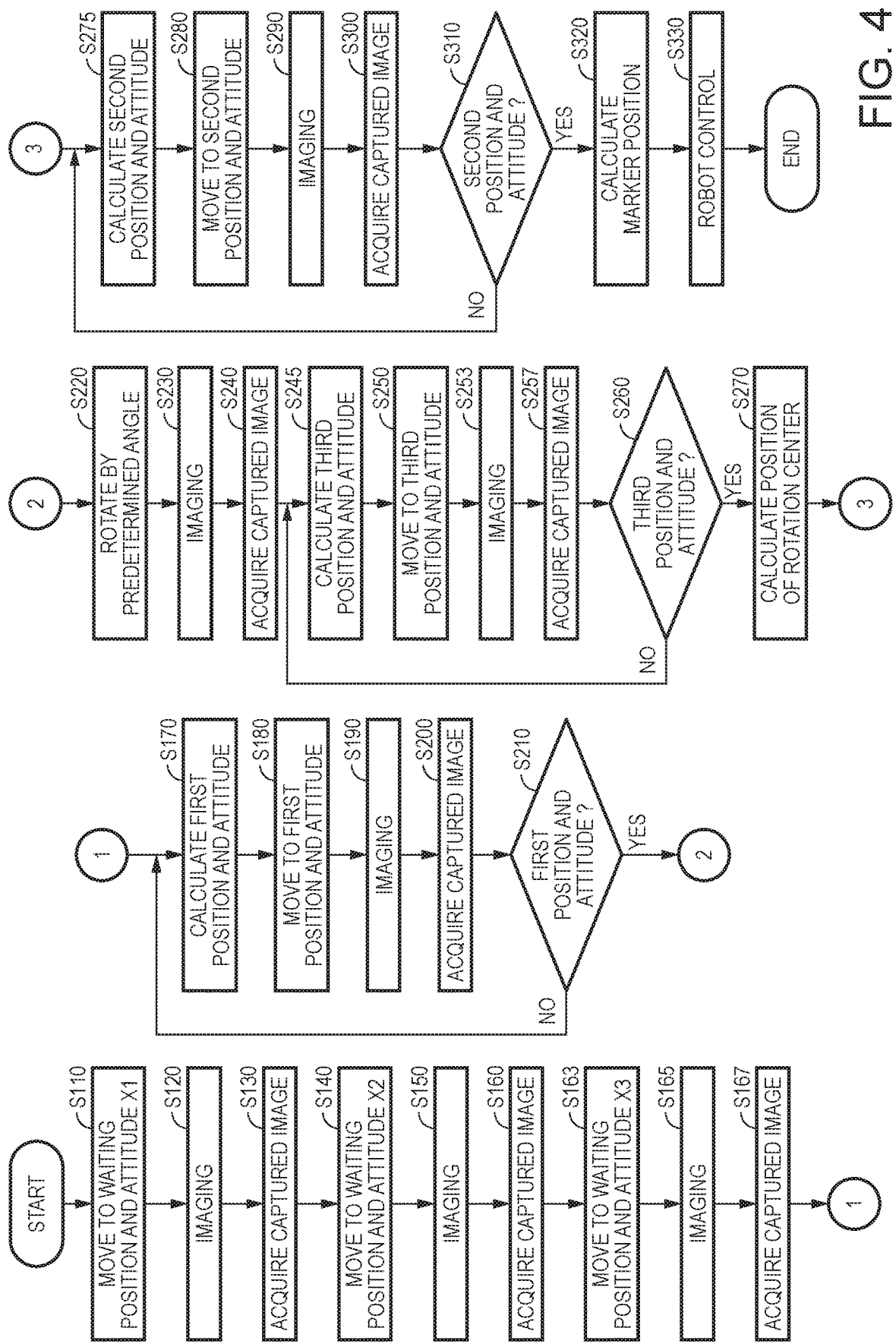
FIG. 4 is a flowchart showing an example of a flow of processing performed by the robot control apparatus.

FIG. 4 is a flowchart showing an example of a flow of the processing performed by the robot control apparatus 30. As below, as an example, the case where the XY plane in the robot coordinate system RC and the top surface of the worktable TB are parallel will be explained. Further, as below, the case where, when moving the control point T, the robot control part 47 does not change the distance between the control point T and the top surface in the direction along the Z-axis in the robot coordinate system RC will be explained. Furthermore, as below, the case where the relative position relationship between the position of the imaging unit 21 and the position of the control point T does not change in the robot 20 will be explained. Note that, in the robot system 1, the XY plane and the top surface are not necessarily in parallel.

The robot control part 47 moves the control point T and allows the position and the attitude of the control point T to coincide with the waiting position and attitude X1 (step S110). Here, the processing at step S110 is explained. The robot control part 47 reads waiting position and attitude information X1D representing the waiting position and attitude X1 stored in the memory unit 32 in advance from the memory unit 32. Then, the robot control part 47 moves the control point T based on the read waiting position and attitude information X1D and allows the position and the attitude of the control point T to coincide with the waiting position and attitude X1 represented by the waiting position and attitude information X1D. Note that the waiting position and attitude X1 may be any position and attitude in which the imaging unit 21 can image the range containing the first marker MK of the positions and the attitudes of the control point T.

Then, the imaging control part 41 allows the the imaging unit 21 to image the range that can be imaged by the imaging unit 21 (step S120). Then, the image acquisition part 43 acquires the captured image captured by the imaging unit 21 at step S120 as a zeroth image XP1 from the imaging unit 21 (step S130). Then, the robot control part 47 moves the control point T and allows the position and the attitude of the control point T to coincide with waiting position and attitude X2 (step S140). Specifically, the robot control part 47 allows the waiting position and attitude X2 as a position and an attitude obtained by translation from the waiting position and attitude X1 in the X-axis direction in the robot coordinate system RC by a predetermined amount and the position and the attitude of the control point T to coincide. The amount may be any amount by which the first marker MK remains within the range that can be imaged by the imaging unit 21. Then, the robot control part 47 allows the memory unit 32 to store waiting position and attitude information X2D representing the waiting position and attitude X2.

Then, the imaging control part 41 allows the imaging unit 21 to image the range that can be imaged by the imaging unit 21 (step S150). Then, the image acquisition part 43 acquires the captured image captured by the imaging unit 21 at step S150 as a zeroth image XP2-1 from the imaging unit 21 (step S160).

Then, the robot control part 47 moves the control point T and returns the position and the attitude of the control point T to the waiting position and attitude X1. Then, the moves the control point T and allows the position and the attitude of the control point T to coincide with waiting position and attitude X3 (step S163). Specifically, the robot control part 47 allows the waiting position and attitude X3 as a position and an attitude obtained by translation from the waiting position and attitude X1 in the Y-axis direction in the robot coordinate system RC by a predetermined amount and the position and the attitude of the control point T to coincide. The amount may be any amount by which the first marker MK remains within the range that can be imaged by the imaging unit 21. Then, the robot control part 47 allows the memory unit 32 to store waiting position and attitude information X3D representing the waiting position and attitude X3. Note that, at step S163, the robot control part 47 may be adapted not to return the position and the attitude of the control point T to the waiting position and attitude X1, but allow the position and the attitude of the control point T to coincide with the waiting position and attitude X3.

Then, the imaging control part 41 allows the imaging unit 21 to image the range that can be imaged by the imaging unit 21 (step S165). Then, the image acquisition part 43 acquires the captured image captured by the imaging unit 21 at step S165 as a zeroth image XP2-2 from the imaging unit 21 (step S167).

Then, the position and attitude calculation part 45 calculates the first position and attitude based on the zeroth image XP1 acquired by the image acquisition part 43 at step S130, the zeroth image XP2-1 acquired by the image acquisition part 43 at step S160, and the zeroth image XP2-2 acquired by the image acquisition part 43 at step S167 (step S170). Here, the processing at step S170 is explained.

The position and attitude calculation part 45 detects the first marker MK contained in the zeroth image XP1 based on the zeroth image XP1. The position and attitude calculation part 45 calculates a first detection position as a position of the first marker MK detected from the zeroth image XP1 in the imaging unit coordinate system CC. Further, the position and attitude calculation part 45 detects the first marker MK contained in the zeroth image XP2-1 based on the zeroth image XP2-1. The position and attitude calculation part 45 calculates a second detection position as a position of the first marker MK detected from the zeroth image XP2-1 in the imaging unit coordinate system CC. Furthermore, the position and attitude calculation part 45 detects the first marker MK contained in the zeroth image XP2-2 based on the zeroth image XP2-2. The position and attitude calculation part 45 calculates a third detection position as a position of the first marker MK detected from the zeroth image XP2-2 in the imaging unit coordinate system CC.

The position and attitude calculation part 45 calculates a displacement from the first detection position to the second detection position as a first displacement based on the calculated first detection position and second detection position. Further, the position and attitude calculation part 45 reads the waiting position and attitude information X1D and the waiting position and attitude information X2D from the memory unit 32. The position and attitude calculation part 45 calculates a displacement from the waiting position and attitude X1 represented by the read waiting position and attitude information X1D to the waiting position and attitude X2 represented by the read waiting position and attitude information X2D as a second displacement.

Further, the position and attitude calculation part 45 calculates a displacement from the first detection position to the third detection position as a third displacement based on the calculated first detection position and third detection position. Furthermore, the position and attitude calculation part 45 reads the waiting position and attitude information X1D and the waiting position and attitude information X3D from the memory unit 32. The position and attitude calculation part 45 calculates a displacement from the waiting position and attitude X1 represented by the read waiting position and attitude information X1D to the waiting position and attitude X3 represented by the read waiting position and attitude information X3D as a fourth displacement.

The position and attitude calculation part 45 calculates a coordinate transform matrix for transforming the displacement of the first marker MK in the imaging unit coordinate system CC into a displacement of the first marker MK in the robot coordinate system RC based on the calculated first displacement, second displacement, third displacement, and fourth displacement.

Further, the position and attitude calculation part 45 calculates a displacement from the position of the first marker MK contained in the zeroth image XP1 to a coincidence point in the zeroth image XP1 based on the zeroth image XP1. The position and attitude calculation part 45 transforms the calculated displacement into a displacement in the robot coordinate system RC based on the calculated coordinate transform matrix. Then, the position and attitude calculation part 45 calculates first position and attitude obtained by translation of the waiting position and attitude X1 by the amount of displacement based on the transformed displacement and the waiting position and attitude X1. That is, the first position and attitude are a position and an attitude in the robot coordinate system RC. When the position and the attitude of the control point T coincide with the first position and attitude, the position of the first marker MK contained in the captured image captured by the imaging unit 21 coincides with the coincidence point in the captured image. Note that the position and attitude calculation part 45 may be adapted to calculate, on the basis of at least one of the zeroth image XP2-1 and the zeroth image XP2-2, a displacement from the position of the first marker MK contained in the at least one to a coincidence point in the at least one. In this case, the position and attitude calculation part 45 transforms the calculated displacement into a displacement in the robot coordinate system RC based on the calculated coordinate transform matrix. Then, the position and attitude calculation part 45 calculates first position and attitude in the robot coordinate system RC based on the transformed displacement and the waiting position and attitude X2.

After the processing at step S170 is performed, the robot control part 47 moves the the control point T and allows the position and the attitude of the control point T to coincide with the first position and attitude calculated at step S170 (step S180). Here, referring to FIG. 5, the processing at step S180 is explained.

Figure 5:
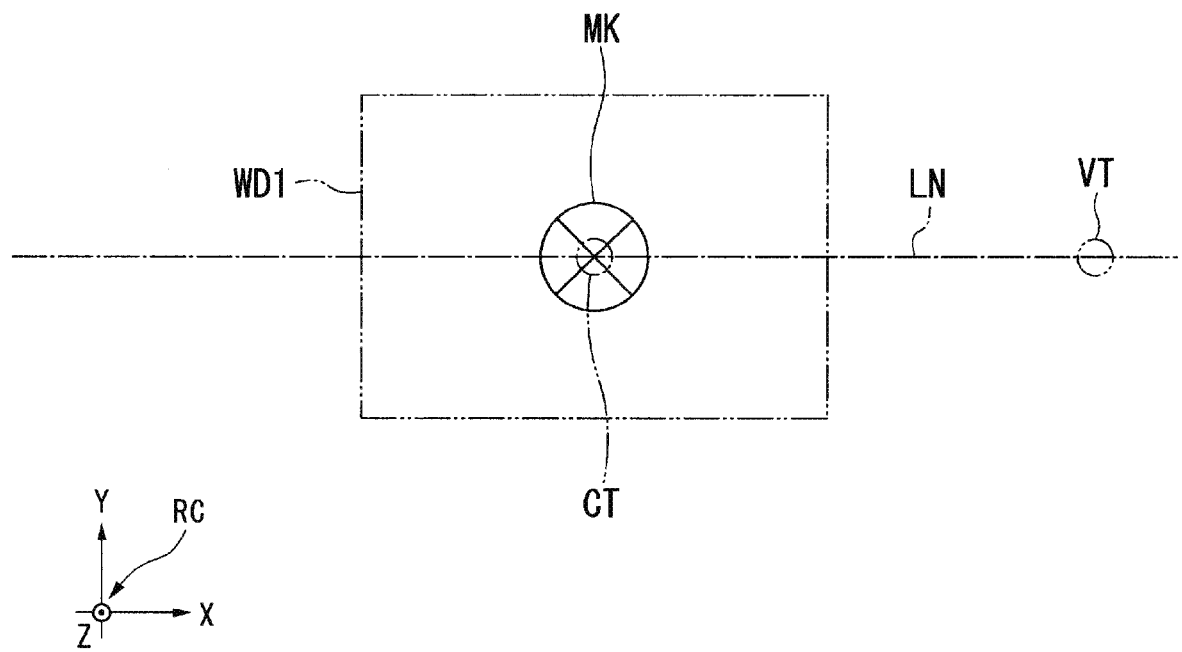
FIG. 5 schematically shows an example of a position relationship between a range imaged by an imaging unit and a position of a control point in a state in which the position and an attitude of the control point and first position and attitude coincide.

FIG. 5 schematically shows an example of a position relationship between the range imaged by the imaging unit 21 and the position of the control point T in the state in which the position and the attitude of the control point T and the first position and attitude coincide. A circle VT shown in FIG. 5 is a mark that virtually indicates the position of the control point T in the robot coordinate system RC. Further, a frame WD1 is a frame that indicates the range imaged by the imaging unit 21 in the robot coordinate system RC. Accordingly, the first marker MK is contained within the frame WD1. Furthermore, a circle CT is a mark indicating the position of the control point T when a coincidence point in a captured image obtained by imaging of the range indicated by the frame WD1 by the imaging unit 21 and the control point T coincide in the robot coordinate system RC. When the robot control part 47 allows the position and the attitude of the control point T to coincide with the first position and attitude at step S180, as shown in FIG. 5, the circle CT and the position of the first marker MK coincide within the frame WD1. Here, a line LN is a line passing through the circle CT and the circle VT and auxiliary line for clarification of the relative position relationship between the position of the coincidence point in the robot coordinate system RC and the position of the control point T in the robot coordinate system RC.

After the processing at step S180 is performed, the imaging control part 41 allows the imaging unit 21 to image the range that can be imaged by the imaging unit 21 (step S190). Then, the image acquisition part 43 acquires the captured image captured by the imaging unit 21 at step S190 as a first image from the imaging unit 21 (step S200). Then, the position and attitude calculation part 45 detects the first marker MK based on the first image acquired at step S200. The position and attitude calculation part 45 calculates a position of the detected first marker MK in the imaging unit coordinate system CC. The position and attitude calculation part 45 determines whether or not the calculated position and a coincidence point in the first image coincide, and thereby, determines whether or not the current position and attitude of the control point T and the first position and attitude coincide (step S210). This is performed because the position of the first marker MK in the imaging unit coordinate system CC and the coincidence point in the first image may not coincide due to an error of the above described coordinate transform matrix, an error caused by rigidity of the robot 20, or the like. If determining that the position of the first marker MK contained in the first image in the imaging unit coordinate system CC and the coincidence point in the first image do not coincide, the position and attitude calculation part 45 determines that the current position and attitude of the control point T do not coincide with the first position and attitude. On the other hand, if determining that the position of the first marker MK contained in the first image in the imaging unit coordinate system CC and the coincidence point in the first image coincide, the position and attitude calculation part 45 determines that the current position and attitude of the control point T coincide with the first position and attitude.

At step S210, if determining that the current position and attitude of the control point T do not coincide with the first position and attitude (that is, the position of the first marker MK contained in the first image in the imaging unit coordinate system CC and the coincidence point in the first image do not coincide) (step S210—No), the position and attitude calculation part 45 transitions to step S170 and calculates a displacement from the position of the first marker MK contained in the first image to the coincidence point in the first image based on the first image acquired at step S200. Then, the position and attitude calculation part 45 calculates first position and attitude based on the calculated displacement, the above described coordinate transform matrix, and the current position and attitude of the control point T. That is, in this case, the robot control apparatus 30 repeats the processing at steps S170 to S210, and thereby, may accurately allow the position and the attitude of the control point T to coincide with the first position and attitude. On the other hand, if the position and attitude calculation part 45 determines that the current position and attitude of the control point T coincide with the first position and attitude (that is, the position of the first marker MK contained in the first image in the imaging unit coordinate system CC and the coincidence point in the first image coincide) (step S210—YES), the robot control part 47 rotates the attitude of the control point T about the Z-axis in the robot coordinate system RC by a predetermined angle θ (step S220). The predetermined angle θ is e.g. 10°. Note that the predetermined angle θ may be an angle smaller than 10° or an angle larger than 10° in an angle range in which the first marker MK remains within the frame WD1. Here, referring to FIG. 6, the processing at step S220 is explained.

Figure 6:
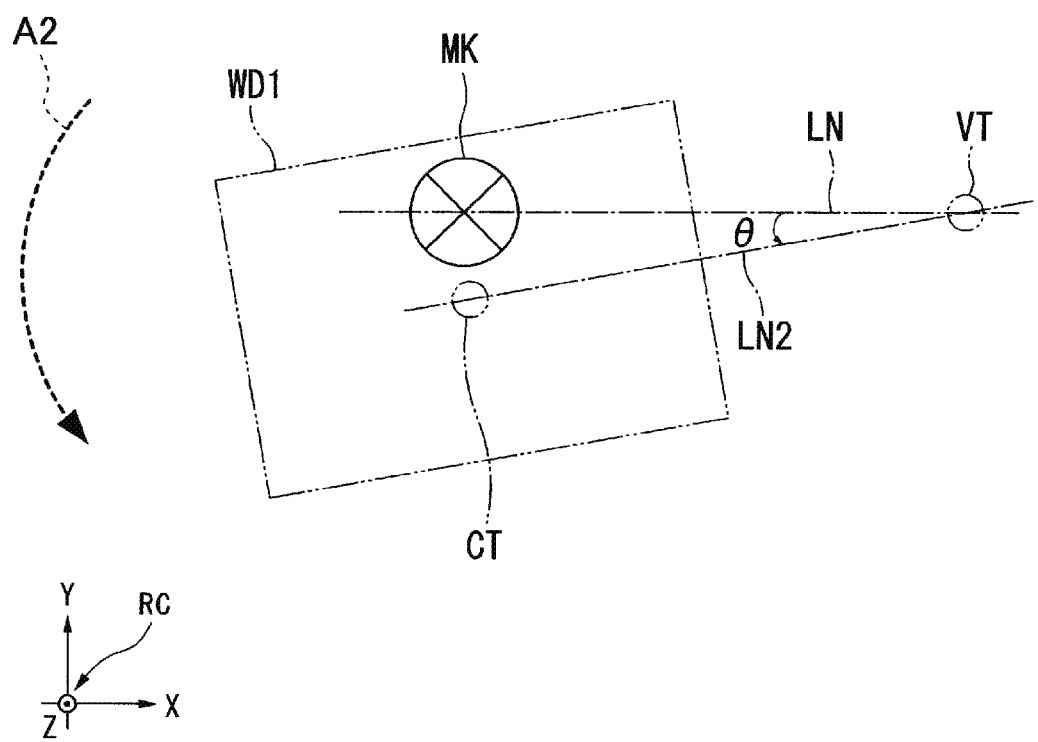
FIG. 6 schematically shows an example of the position relationship between the range imaged by the imaging unit and the position of the control point in a state in which the attitude of the control point is rotated by a predetermined angle from the state shown in FIG. 5.

FIG. 6 schematically shows an example of a position relationship between the range imaged by the imaging unit 21 and the position of the control point T in a state in which the attitude of the control point T is rotated by the predetermined angle θ from the state shown in FIG. 5. A line LN2 shown in FIG. 6 is a line passing through the circle CT and the circle VT in the state and auxiliary line for clarification of the relative position relationship between the position of the coincidence point in the captured image obtained by imaging of the range indicated by the frame WD1 by the imaging unit 21 in the robot coordinate system RC and the position of the control point T in the robot coordinate system RC. In the state, the frame WD1 shown in FIG. 6 is a frame when the frame WD1 shown in FIG. 5 is rotated by the predetermined angle θ in a direction shown by an arrow A2 about an axis passing through the circle VT along the Z-axis in the robot coordinate system RC as a rotation axis. In the state, the coincidence point no longer coincides with the position of the first marker MK as shown in FIG. 6.

After the processing at step S220 is performed, the imaging control part 41 allows the imaging unit 21 to image the range that can be imaged by the imaging unit 21 (step S230). Then, the image acquisition part 43 acquires the captured image captured by the imaging unit 21 as a zeroth image XP3 from the imaging unit 21 (step S240). Then, the position and attitude calculation part 45 calculates third position and attitude based on the zeroth image XP3 acquired by the image acquisition part 43 at step S240. Here, the processing at step S245 is explained.

The position and attitude calculation part 45 detects the first marker MK contained in the zeroth image XP3 based on the zeroth image XP3. The position and attitude calculation part 45 calculates a third detection position as a position of the first marker MK detected from the zeroth image XP3 in the imaging unit coordinate system CC. The position and attitude calculation part 45 calculates a displacement from a coincidence point in the zeroth image XP3 to the calculated third detection position in the imaging unit coordinate system CC. The position and attitude calculation part 45 transforms the calculated displacement into a displacement in the robot coordinate system RC based on the above described coordinate transform matrix. Then, the position and attitude calculation part 45 calculates third position and attitude obtained by translation of the current position and attitude (i.e. first position and attitude) of the control point T by the displacement based on the transformed displacement and the current position and attitude of the control point T. The third position and attitude are a position and an attitude in the robot coordinate system RC. That is, when the position and the attitude of the control point T coincide with the third position and attitude, the position of the first marker MK contained in the captured image captured by the imaging unit 21 coincides with the coincidence point in the captured image.

After the processing at step S245 is performed, the robot control part 47 moves the the control point T based on the third position and attitude calculated at step S245 and allows the position and the attitude of the control point T to coincide with the third position and attitude (step S250). Here, referring to FIG. 7, the processing at step S250 is explained.

Figure 7:
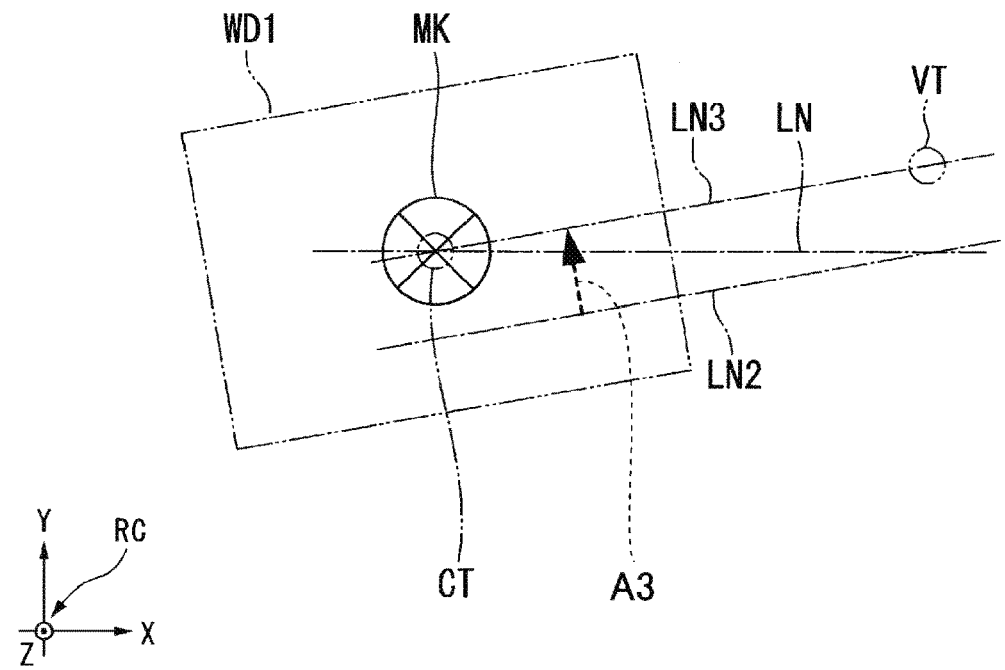
FIG. 7 schematically shows an example of the position relationship between the range imaged by the imaging unit and the position of the control point in a state in which the position of the control point is translated by an amount of displacement calculated at step S245 from the state shown in FIG. 6.

FIG. 7 schematically shows an example of a position relationship between the range imaged by the imaging unit 21 and a position of the control point T in a state in which the position of the control point T is translated by an amount of the displacement calculated at step S245 from the state shown in FIG. 6. A line LN3 shown in FIG. 7 is a line passing through the circle CT and the circle VT in the state and auxiliary line for clarification of the relative position relationship between the position of the coincidence point in the captured image obtained by imaging of the range indicated by the frame WD1 by the imaging unit 21 in the robot coordinate system RC and the position of the control point T in the robot coordinate system RC. In the state, the frame WD1 shown in FIG. 7 is a frame when the frame WD1 shown in FIG. 6 is rotated by the amount of displacement calculated at step S245. In FIG. 7, the displacement is shown by an arrow A3. In the state, the position and the attitude of the control point T coincide with the third position and attitude. That is, the coincidence point in the captured image obtained by imaging of the range indicated by the frame WD1 by the imaging unit 21 shown in FIG. 7 coincides with the position of the first marker MK contained in the captured image.

After the processing at step S250 is performed, the imaging control part 41 allows the imaging unit 21 to image the range that can be imaged by the imaging unit 21 (step S253). Then, the image acquisition part 43 acquires the captured image captured by the imaging unit 21 at step S253 as a zeroth image XP4 from the imaging unit 21 (step S257). Then, the position and attitude calculation part 45 detects the first marker MK based on the zeroth image XP4 acquired at step S257. The position and attitude calculation part 45 calculates a position of the detected first marker MK in the imaging unit coordinate system CC. The position and attitude calculation part 45 determines whether or not the calculated position and a coincidence point in the zeroth image XP4 coincide, and thereby, determines whether or not the current position and attitude of the control point T and the third position and attitude coincide (step S260). This is performed because the position of the first marker MK in the imaging unit coordinate system CC and the coincidence point in the zeroth image XP4 may not coincide due to an error of the above described coordinate transform matrix, an error caused by rigidity of the robot 20, or the like. If determining that the position of the first marker MK contained in the zeroth image XP4 in the imaging unit coordinate system CC and the coincidence point in the zeroth image XP4 do not coincide, the position and attitude calculation part 45 determines that the current position and attitude of the control point T do not coincide with the third position and attitude. On the other hand, if determining that the position of the first marker MK contained in the zeroth image XP4 in the imaging unit coordinate system CC and the coincidence point in the zeroth image XP4 coincide, the position and attitude calculation part 45 determines that the current position and attitude of the control point T coincide with the third position and attitude.

At step S260, if determining that the current position and attitude of the control point T do not coincide with the third position and attitude (that is, the position of the first marker MK contained in the zeroth image XP4 in the imaging unit coordinate system CC and the coincidence point in the zeroth image XP4 do not coincide) (step S260—No), the position and attitude calculation part 45 transitions to step S245 and calculates a displacement from the position of the first marker MK contained in the zeroth image XP4 to the coincidence point in the zeroth image XP4 based on the zeroth image XP4 acquired at step S257. Then, the position and attitude calculation part 45 calculates third position and attitude based on the calculated displacement, the above described coordinate transform matrix, and the current position and attitude of the control point T. That is, in this case, the robot control apparatus 30 repeats the processing at steps S245 to S260, and thereby, may accurately allow the position and the attitude of the control point T to coincide with the third position and attitude. On the other hand, if determining that the current position and attitude of the control point T coincide with the third position and attitude (that is, the position of the first marker MK contained in the zeroth image XP4 in the imaging unit coordinate system CC and the coincidence point in the zeroth image XP4 coincide) (step S260—YES), the position and attitude calculation part 45 calculates a position of a rotation center based on the third position and attitude and the predetermined angle θ (step S270). The position of the rotation center refers to a position of the center of the rotation of the control point T when the robot control part 47 allows the position and the attitude of the control point T to coincide with the second position and attitude at step S280. The position is a position in the robot coordinate system RC. Here, the processing at step S270 is explained.

Here, for convenience of explanation, the state in which the position and the attitude of the control point T coincide with the first position and attitude is referred to as "first state", and the state in which the position and the attitude of the control point T coincide with the third position and attitude is referred to as "third state". In comparison between the first state and the third state, the third state is the same state as a state in which the control point T in the first state is rotated by the predetermined angle θ about a virtual axis passing through the first marker MK and rotation axis parallel to the Z-axis in the robot coordinate system RC. Further, a radius r in the rotation is a distance between the position of the first marker MK in the robot coordinate system RC and the position of the control point T in the robot coordinate system RC. Using this, the position and attitude calculation part 45 derives a first equation that expresses an X-coordinate and a Y-coordinate indicating the position of the control point T in the first position and attitude in the robot coordinate system RC with an X-coordinate and a Y-coordinate indicating the position of the first marker MK in the robot coordinate system RC, the radius r, and the predetermined angle θ. Further, the position and attitude calculation part 45 derives a third equation that expresses an X-coordinate and a Y-coordinate indicating the position of the control point T in the third position and attitude in the robot coordinate system RC with the X-coordinate and the Y-coordinate indicating the position of the first marker MK in the robot coordinate system RC, the radius r, and the predetermined angle θ. The position and attitude calculation part 45 solves simultaneous equations of the derived first equation and third equation, and calculates the X-coordinate and the Y-coordinate indicating the position of the first marker MK in the robot coordinate system RC as the position of the above described rotation center.

After the processing at step S270 is performed, the position and attitude calculation part 45 calculates second position and attitude based on the position of the rotation center calculated at step S270 and the first position and attitude (step S275). The second position and attitude refer to a state in which the position and the attitude of the control point T is rotated about an axis passing through the position of the rotation center along the Z-axis in the robot coordinate system RC counterclockwise (or clockwise) by a third predetermined angle from the above described first state. Here, the counterclockwise rotation is a counterclockwise rotation as seen from the positive direction of the Z-axis in the negative direction of the Z-axis. The third predetermined angle is 180° in the example. Note that the third predetermined angle may be an angle smaller than 180° or an angle larger than 180° instead. Here, the processing at step S275 is explained.

The position and attitude calculation part 45 calculates a distance from the first position and attitude to the position of the rotation center based on the position of the rotation center calculated at step S270 and the first position and attitude. The position and attitude calculation part 45 calculates the position and the attitude of the control point T in the state in which the control point T is rotated with the calculated distance as a radius about the axis passing through the position of the rotation center along the Z-axis in the robot coordinate system RC counterclockwise (or clockwise) by the third predetermined angle as the second position and attitude. Here, the counterclockwise rotation is a counterclockwise rotation as seen from the positive direction of the Z-axis in the negative direction of the Z-axis.

After the processing at step S275 is performed, the robot control part 47 moves the the control point T based on the second position and attitude calculated at step S275 and allows the position and the attitude of the control point T to coincide with the second position and attitude (step S280). Here, referring to FIG. 8, the processing at step S280 is explained.

Figure 8:
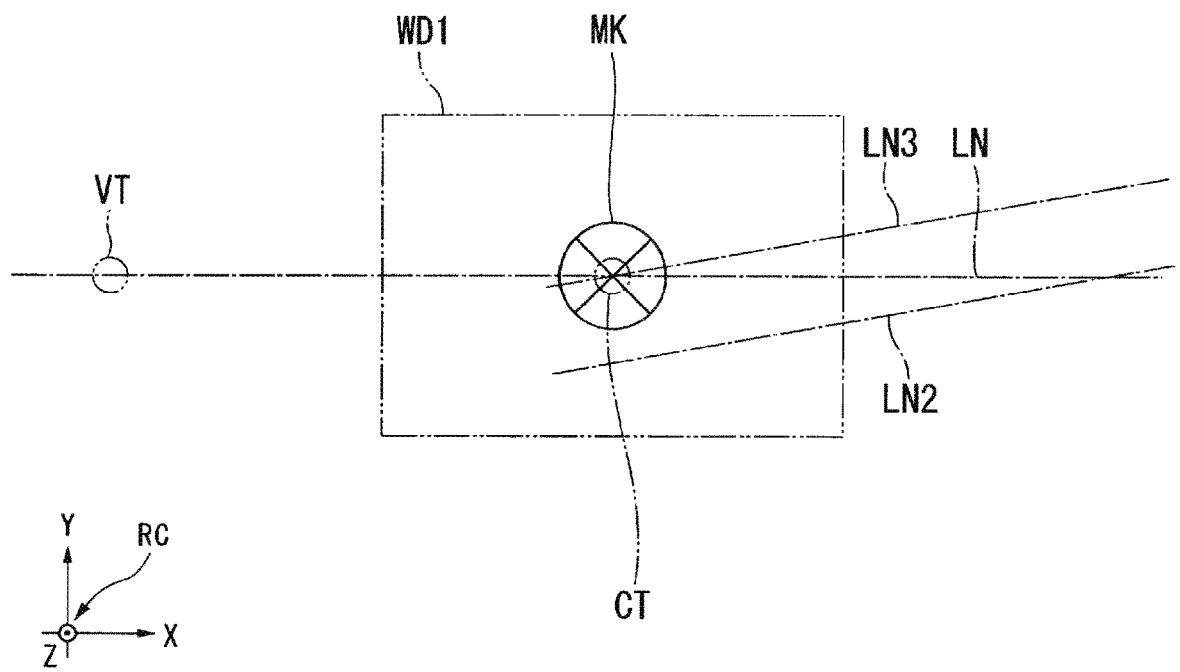
FIG. 8 schematically shows an example of the position relationship between the range imaged by the imaging unit and the position of the control point in a state in which second position and attitude calculated at step S275 and the position and the attitude of the control point are allowed to coincide from the state shown in FIG. 7.

FIG. 8 schematically shows an example of a position relationship between the range imaged by the imaging unit 21 and a position of the control point T in a state in which the second position and attitude calculated at step S275 and the position and the attitude of the control point are allowed to coincide from the state shown in FIG. 7. In the state, the frame WD1 shown in FIG. 8 is a frame when the frame WD1 shown in FIG. 5 is rotated about an axis passing through the coincidence point in the captured image captured by imaging of the range indicated by the frame WD1 along the Z-axis in the robot coordinate system RC as a rotation axis counterclockwise by 180°. In the state, the position and the attitude of the control point T coincide with the second position and attitude. That is, the coincidence point in the captured image obtained by imaging of the range indicated by the frame WD1 by the imaging unit 21 shown in FIG. 8 coincides with the position of the first marker MK contained in the captured image.

After the processing at step S280 is performed, the imaging control part 41 allows the imaging unit 21 to image the range that can be imaged by the imaging unit 21 (step S290). Then, the image acquisition part 43 acquires the captured image captured by the imaging unit 21 at step S290 as a second image from the imaging unit 21 (step S300). Then, the position and attitude calculation part 45 detects the first marker MK based on the second image acquired at step S300. The position and attitude calculation part 45 determines whether or not the calculated position and a coincidence point in the second image coincide, and thereby, determines whether or not the current position and attitude of the control point T and the second position and attitude coincide (step S310). This is performed because the position of the first marker MK in the imaging unit coordinate system CC and the coincidence point in the second image may not coincide due to an error of the above described coordinate transform matrix, an error caused by rigidity of the robot 20, or the like. If determining that the position of the first marker MK contained in the second image in the imaging unit coordinate system CC and the coincidence point in the second image do not coincide, the position and attitude calculation part 45 determines that the current position and attitude of the control point T do not coincide with the second position and attitude. On the other hand, if determining that the position of the first marker MK contained in the second image in the imaging unit coordinate system CC and the coincidence point in the second image coincide, the position and attitude calculation part 45 determines that the current position and attitude of the control point T coincide with the second position and attitude.

At step S310, if determining that the current position and attitude of the control point T do not coincide with the second position and attitude (that is, the position of the first marker MK contained in the second image in the imaging unit coordinate system CC and the coincidence point in the second image do not coincide) (step S310—No), the position and attitude calculation part 45 transitions to step S275 and calculates a displacement from the position of the first marker MK contained in the second image to the coincidence point in the second image based on the second image acquired at step S300. Then, the position and attitude calculation part 45 calculates second position and attitude based on the calculated displacement, the above described coordinate transform matrix, and the current position and attitude of the control point T. That is, in this case, the robot control apparatus 30 repeats the processing at steps S275 to S310, and thereby, may accurately allow the position and the attitude of the control point T to coincide with the second position and attitude. On the other hand, if determining that the current position and attitude of the control point T coincide with the second position and attitude (that is, the position of the first marker MK contained in the second image in the imaging unit coordinate system CC and the coincidence point in the second image coincide) (step S310—YES), the position and attitude calculation part 45 calculates a position of the first marker MK in the robot coordinate system RC based on the first position and attitude and the second position and attitude (step S320). Here, referring to FIGS. 9 to 11, the processing at step S320 is explained.

Figure 9:
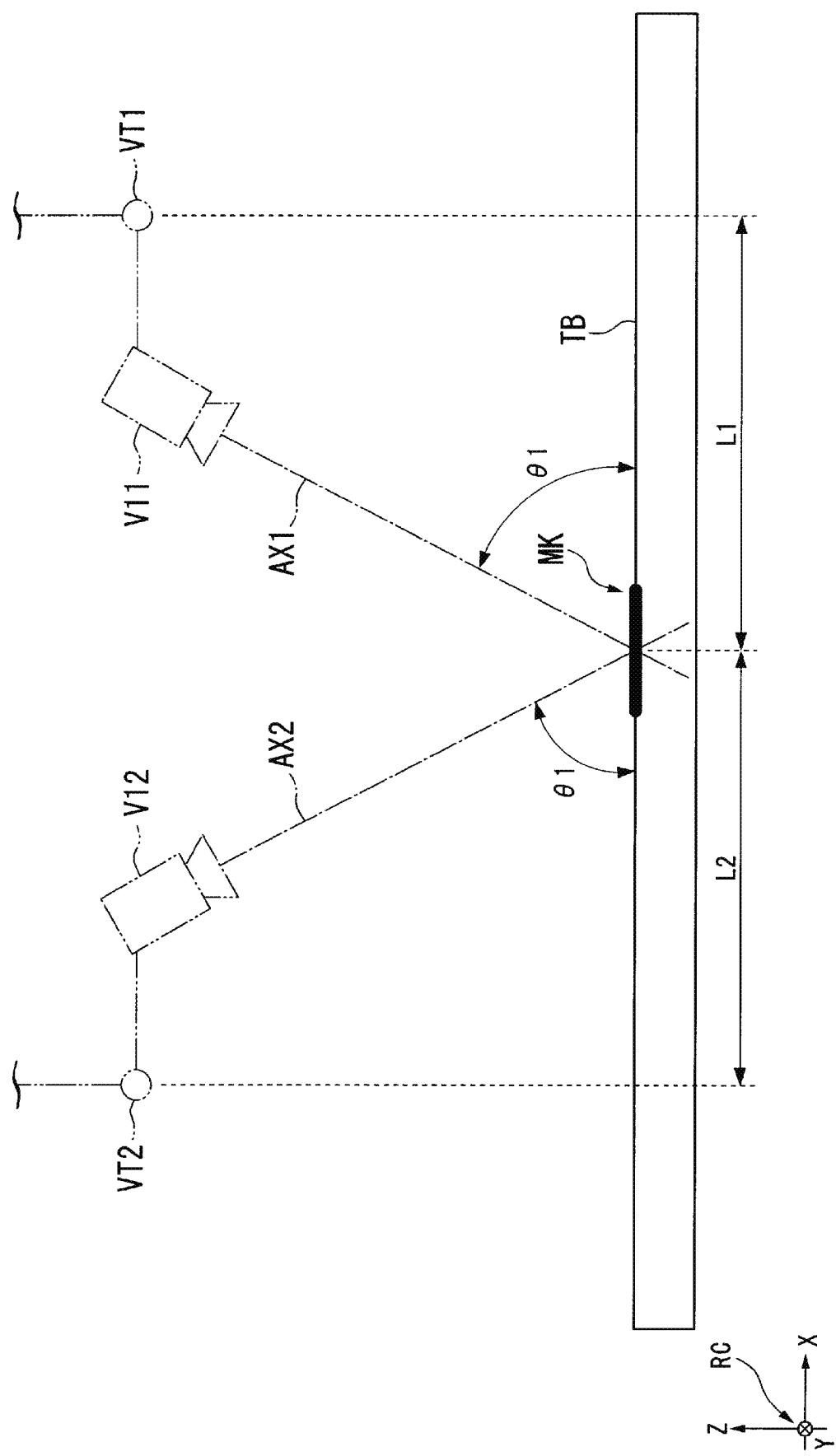
FIG. 9 shows an example of a position relationship between the positions of the control point in the respective first position and attitude and second position and attitude and a position of a first marker.

FIG. 9 shows an example of a position relationship between the positions of the control point T in the respective first position and attitude and second position and attitude and the position of the first marker MK. A circle VT1 shown in FIG. 9 virtually shows the position of the control point T when the position and the attitude of the control point T coincide with the first position and attitude. Further, a circle VT2 virtually shows the position of the control point T when the position and the attitude of the control point T coincide with the second position and attitude. As below, as an example, the case where a line connecting the position of the control point T when coinciding with the first position and attitude and the position of the control point T when coinciding with the second position and attitude is parallel to the X-axis in the robot coordinate system RC and orthogonal to the Y-axis in the robot coordinate system RC will be explained. Note that the line is not necessarily parallel to the X-axis or orthogonal to the Y-axis. However, the line is parallel to the XY plane in the robot coordinate system RC. This is because, in the example, when moving the control point T, the robot control part 47 does not change the distance between the control point T and the top surface of the worktable TB in the direction along the Z-axis in the robot coordinate system RC. Here, the robot control part 47 may be adapted, when the position of the control point T in the Z-axis direction in the first position and attitude and the position of the control point T in the Z-axis direction in the second position and attitude are the same, to change the position of the control point T in the Z-axis direction while the position and the attitude of the control point T changes from the first position and attitude to the second position and attitude.

An imaging unit V11 shown in FIG. 9 shows the position of the imaging unit 21 when the position and the attitude of the control point T coincide with the first position and attitude. A line AX1 shows the optical axis of the imaging unit 21. In the example, as shown in FIG. 9, the line AX1 is inclined at an angle $\theta 1$ with respect to the top surface of the worktable TB. Further, the line AX1 is a line passing through the position of the first marker MK. The line AX1 in the example is a line passing through the center of figure of the first marker MK.

An imaging unit V12 shown in FIG. 9 shows the position of the imaging unit 21 when the position and the attitude of the control point T coincide with the second position and attitude. A line AX2 shows the optical axis of the imaging unit 21. In the example, as shown in FIG. 9, the line AX2 is inclined at the angle $\theta 1$ with respect to the top surface of the worktable TB. Further, the line AX2 is not parallel to the line AX1. This is because the second position and attitude are a position and an attitude obtained by rotation of the first position and attitude about an axis passing through the position of the first marker MK on the XY plane in the robot coordinate system RC and parallel to the Z-axis in the robot coordinate system RC as a rotation axis. Further, this is because, in the example, the relative position relationship between the position of the control point T and the position of the imaging unit 21 does not change, that is, the distance between the imaging unit 21 and the control point T is the same between the first position and attitude and the second position and attitude. On this account, the line AX2 is a line passing through the position of the first marker MK. In other words, the line AX2 in the example is a line passing through the center of figure of the first marker MK. Further, on this account, the distance between the imaging unit 21 and the first marker MK is the same between the first position and attitude and the second position and attitude.

As described above, the second position and attitude are the position and the attitude obtained by rotation of the first position and attitude about the axis passing through the position of the first marker MK on the XY plane in the robot coordinate system RC and parallel to the Z-axis in the robot coordinate system RC as the rotation axis. This shows that a distance L1 between a position obtained by projection of the position of the circle VT1 on the top surface of the worktable TB and the position of the first marker MK and a distance L2 between a position obtained by projection of the position of the circle VT2 on the top surface of the worktable TB and the position of the first marker MK are equal. That is, the position of the first marker MK on the XY plane in the robot coordinate system RC is a position at the midpoint between the position of the circle VT1 on the XY plane and the position of the circle VT2 on the XY plane as shown in FIG. 10.

Figure 10:
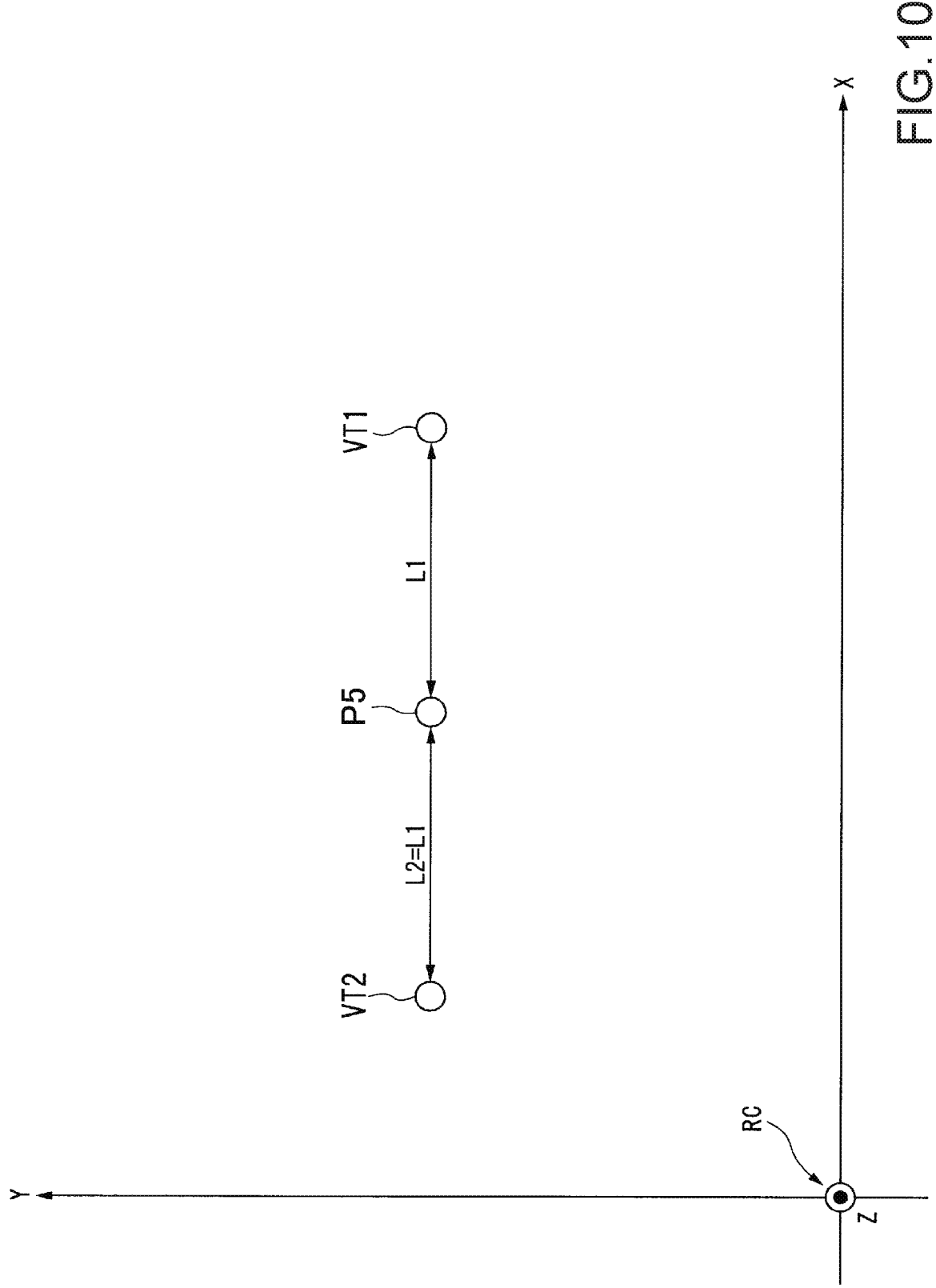
FIG. 10 shows an example of the position relationship shown in FIG. 9 as seen from a positive direction of a Z-axis in a negative direction of the Z-axis in a robot coordinate system.

FIG. 10 shows an example of the position relationship shown in FIG. 9 as seen from the positive direction of the Z-axis in the negative direction of the Z-axis in the robot coordinate system RC. In FIG. 10, a circle P5 shows the position of the midpoint and position of the first marker MK.

Using the position relationships shown in FIGS. 9 and 10, the position and attitude calculation part 45 calculates the position of the midpoint between the position of the control point T when the position and the attitude of the control point T coincide with the first position and attitude and the position of the control point T when the position and the attitude of the control point T coincide with the second position and attitude as the position of the first marker MK based on the first position and attitude and the second position and attitude.

Figure 11:
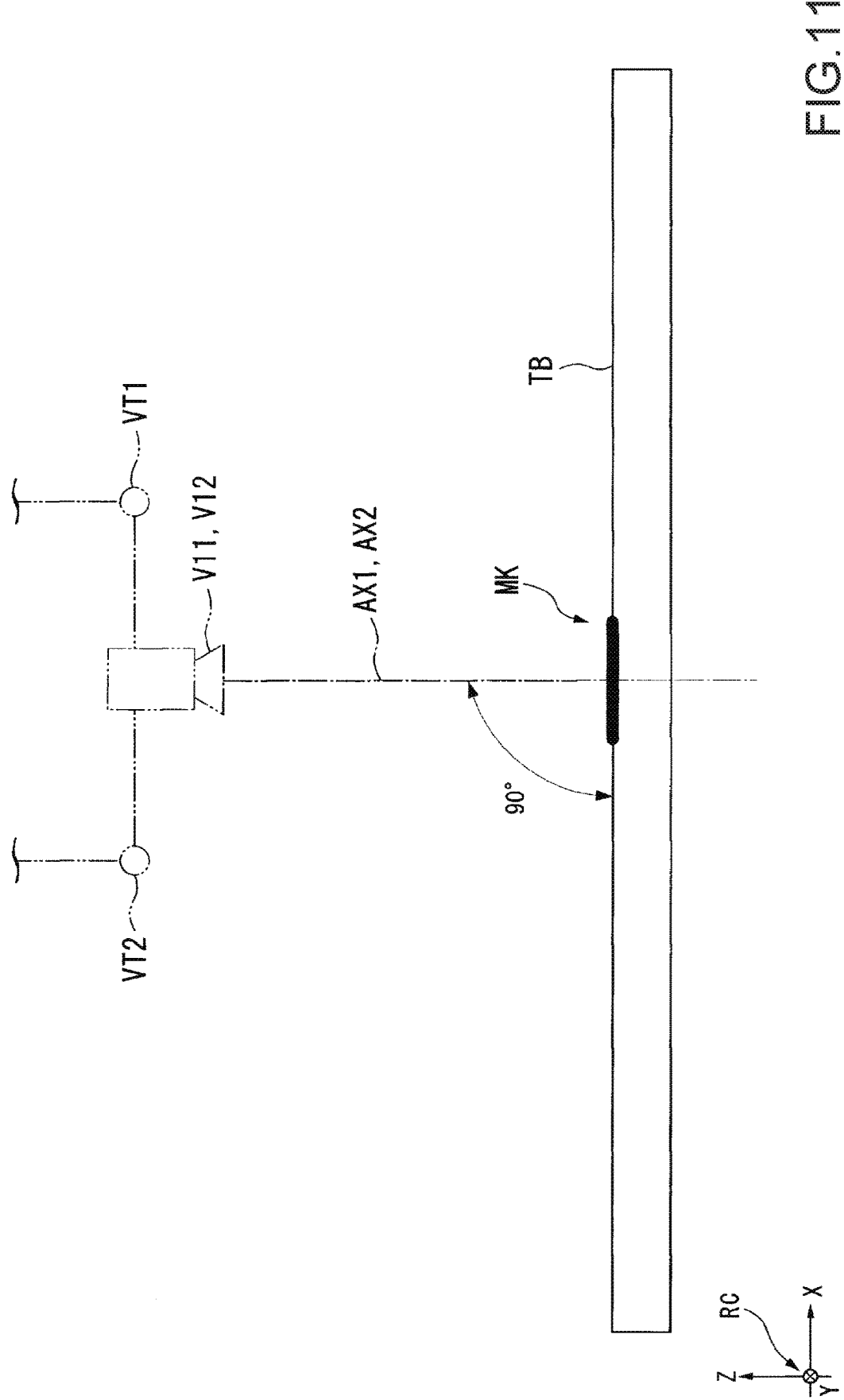
FIG. 11 shows another example of the position relationship between the positions of the control point in the respective first position and attitude and second position and attitude and the position of the first marker.

Note that the optical axis of the imaging unit 21 when the position and the attitude of the control point T coincide with the first position and attitude may be orthogonal to the top surface of the worktable TB as shown in FIG. 11. In this case, the optical axis of the imaging unit 21 when the position and the attitude of the control point T coincide with the second position and attitude is also orthogonal to the top surface of the worktable TB. In this case, the line AX2 is parallel to the line AX1.

FIG. 11 shows another example of the position relationship between the positions of the control point T in the respective first position and attitude and second position and attitude and the position of the first marker MK. In the example shown in FIG. 11, the line AX1 and the line AX2 are orthogonal to the top surface of the worktable TB.

After the processing at step S320 is performed, the robot control part 47 allows the robot 20 to perform the predetermined job based on the position of the first marker MK calculated at step S320 (step S330), and ends the processing.

In this manner, the robot control apparatus 30 allows the robot 20 to perform actions based on the first marker MK obtained using the first position and attitude of the control point T when the first image containing the first marker MK is captured by the imaging unit 21 provided in the arm A of the robot 20 and the second position and attitude of the control point T when the second image containing the first marker MK is captured by the imaging unit 21. Thereby, the robot control apparatus 30 may allow the robot 20 to accurately perform the job including the actions based on the first marker MK without operation of the arm A by the operator.

Note that, at step S320, the position and attitude calculation part 45 may be adapted to calculate the position of the first marker MK using simultaneous equations based on the first position and attitude and the second position and attitude. Specifically, the position and attitude calculation part 45 derives a first equation that expresses an X-coordinate and a Y-coordinate indicating the position of the control point T in the robot coordinate system RC in the first position and attitude with an X-coordinate and a Y-coordinate indicating the position of the first marker MK in the robot coordinate system RC, the radius r, and the predetermined angle $\theta$. Further, the position and attitude calculation part 45 derives a second equation that expresses an X-coordinate and a Y-coordinate indicating the position of the control point T in the robot coordinate system RC in the second position and attitude with an X-coordinate and a Y-coordinate indicating the position of the first marker MK in the robot coordinate system RC, the radius r, and the predetermined angle θ. The position and attitude calculation part 45 solves simultaneous equations of the derived first equation and second equation, and calculates the X-coordinate and the Y-coordinate indicating the position of the first marker MK in the robot coordinate system RC as the position of the above described rotation center. Note that it is desirable that the robot control apparatus 30 performs the processing at step S320 because the amount of calculation of the robot control apparatus 30 is smaller in the calculation method by the processing at step S320 than that of the method.

The position of the first marker MK contained in the first image when the position of the first marker MK contained in the first image coincides with a coincidence point in the first image is an example of the position of the first marker MK in the first image. Further, the position of the first marker MK contained in the second image when the position of the first marker MK contained in the second image coincides with a coincidence point in the second image is an example of the position of the first marker MK in the second image and example of a position corresponding to the position of the first marker in the first image.

Detection Accuracy of Position of First Marker by Robot Control Apparatus

As below, referring to FIGS. 12 to 14, detection (calculation) accuracy of the position of the first marker MK by the robot control apparatus 30 will be explained.

When the robot control apparatus 30 detects (calculates) the position of the first marker MK at a plurality of times by the processing of the flowchart shown in FIG. 4, the position varies at each time of the detection due to detection errors. The degree of variations of the position due to detection errors changes depending on an angle φ between the line connecting the position of the control point T and the position of the first marker MK in the robot coordinate system RC when the position and the attitude of the control point T coincide with the first position and attitude and the line connecting the position of the control point T and the position of the first marker MK in the robot coordinate system RC when the position and the attitude of the control point T coincide with the second position and attitude. Specifically, the degree is smaller as the angle φ is larger in a range of 0°<φ≤180°. The degree may be expressed, when the robot control apparatus 30 detects (calculates) the position of the first marker MK at a plurality of times by the processing of the flowchart shown in FIG. 4, for example, by lengths of error bars on a graph in which the respective positions are plotted.

Figure 12:
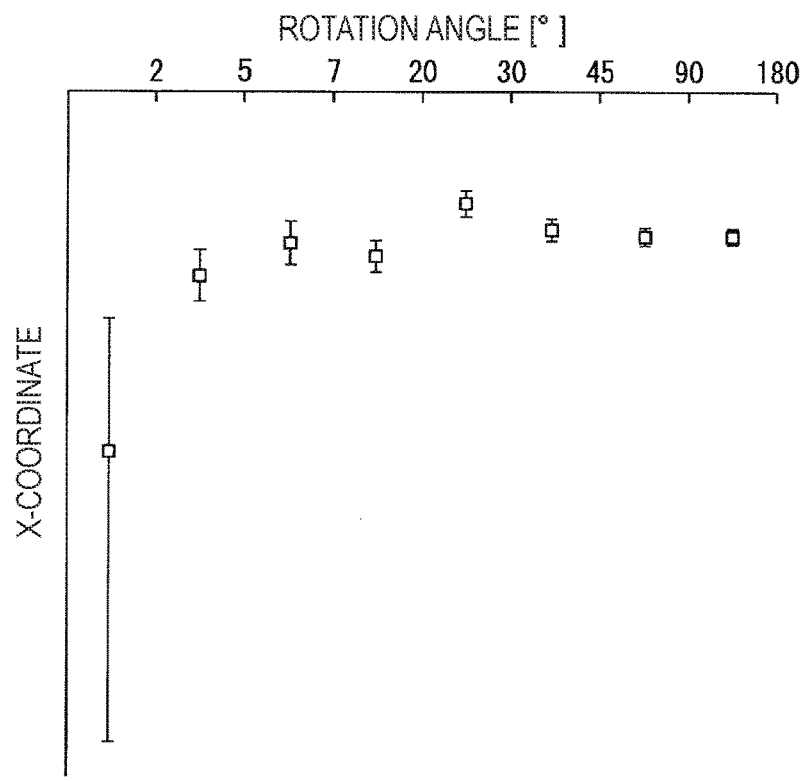
FIG. 12 is a graph for exemplification of detection errors of a position of the first marker in an X-axis direction in the robot coordinate system.

FIG. 12 is a graph for exemplification of detection errors of the position of the first marker MK in the X-axis direction in the robot coordinate system RC. The horizontal axis of the graph shown in FIG. 12 indicates the angle φ. The vertical axis of the graph indicates the position in the X-axis direction in the robot coordinate system RC. Further, in the graph, the positions of the first marker MK in the X-axis direction in the robot coordinate system RC when respective angles of 2°, 5°, 7°, 20°, 30°, 45°, 90°, 180° are selected as the angle φ are plotted with error bars. As shown in FIG. 12, the error bars are smaller as the angle φ is larger.

Figure 13:
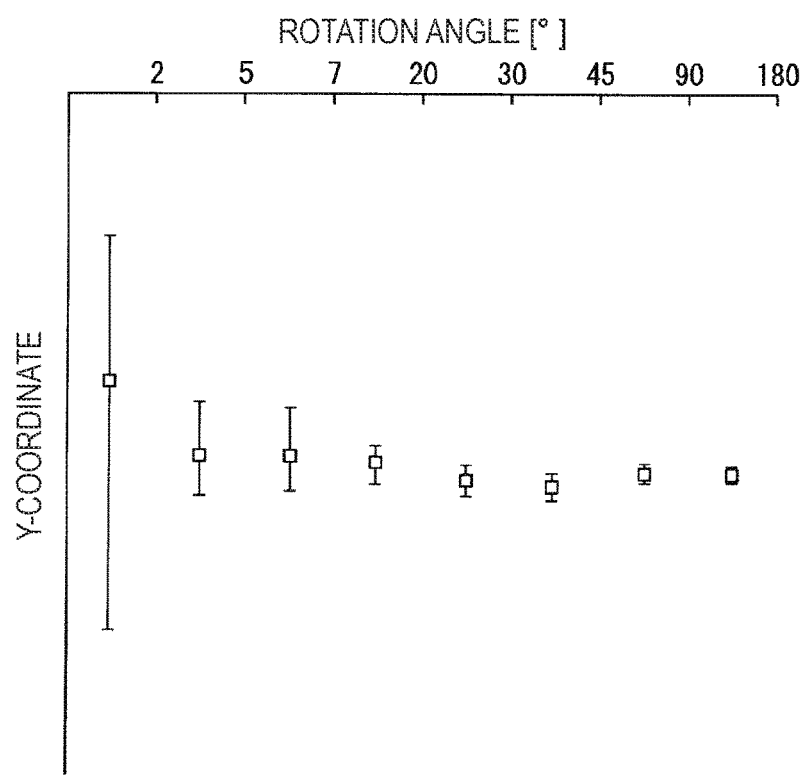
FIG. 13 is a graph for exemplification of detection errors of the position of the first marker in a Y-axis direction in the robot coordinate system.

FIG. 13 is a graph for exemplification of detection errors of the position of the first marker MK in the Y-axis direction in the robot coordinate system RC. The horizontal axis of the graph shown in FIG. 13 indicates the angle φ. The vertical axis of the graph indicates the position in the Y-axis direction in the robot coordinate system RC. Further, in the graph, the positions of the first marker MK in the Y-axis direction in the robot coordinate system RC when respective angles of 2°, 5°, 7°, 20°, 30°, 45°, 90°, 180° are selected as the angle φ are plotted with error bars. As shown in FIG. 13, the error bars are smaller as the angle φ is larger.

Figure 14:
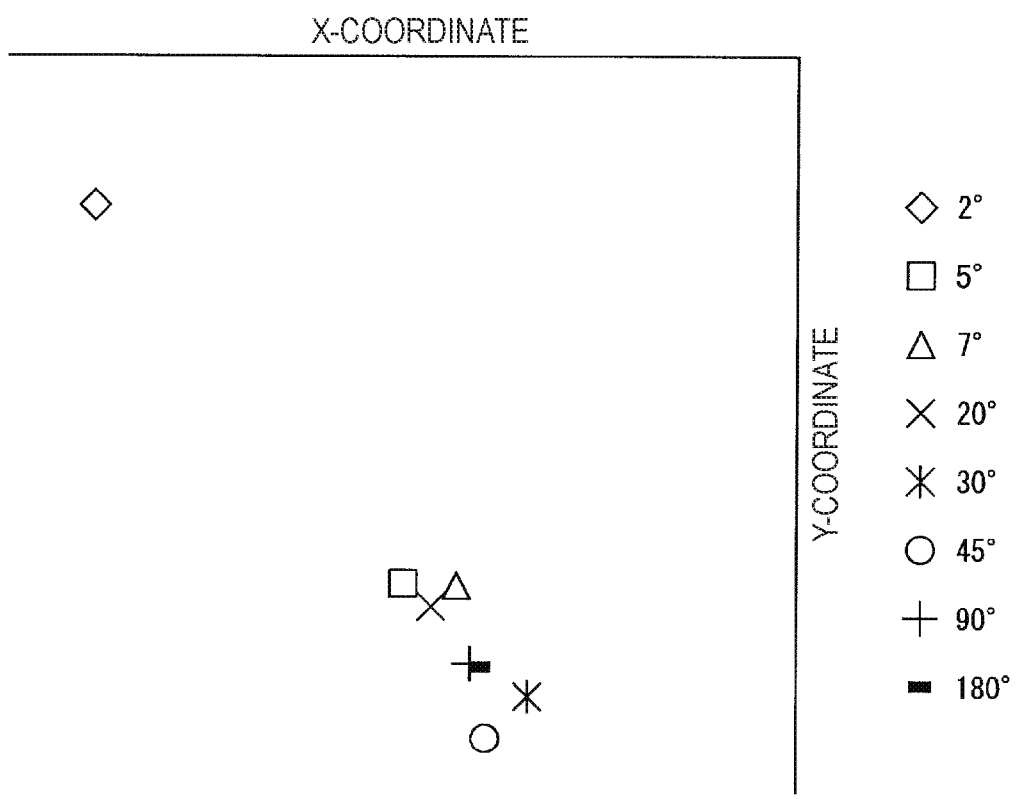
FIG. 14 is a graph showing variations of the position of the first marker detected by the processing of the flowchart shown in FIG. 4 with respect to each angle on an XY plane in the robot coordinate system.

FIG. 14 is a graph showing variations of the position of the first marker MK detected by the processing of the flowchart shown in FIG. 4 with respect to each angle φ on the XY plane in the robot coordinate system RC. The horizontal axis of the graph indicates the position in the X-axis direction in the robot coordinate system RC. The vertical axis of the graph indicates the position in the Y-axis direction in the robot coordinate system RC. As shown in FIG. 14, the variations of the position of the first marker MK detected by the processing of the flowchart shown in FIG. 4 with respect to each angle φ and variations of the first marker MK on the XY plane in the robot coordinate system RC are smaller as the angle φ is larger.

Modified Example 1 of Embodiment

As below, referring to FIG. 15, Modified Example 1 of the embodiment will be explained.

The robot control apparatus 30 may be adapted, after calculating the position of the first marker MK at step S320 shown in FIG. 4, to store relative position information representing the relative position between the current position of the control point T (i.e., the position of the control point T when the position and the attitude of the control point T coincide with the second position and attitude) and the position of the first marker MK in the memory unit 32. In this case, the robot control apparatus 30 may detect (calculate) another marker provided in a different position from that of the first marker MK and second marker MK2 as a marker provided on the top surface of the worktable TB based on the relative position information.

Figure 15:
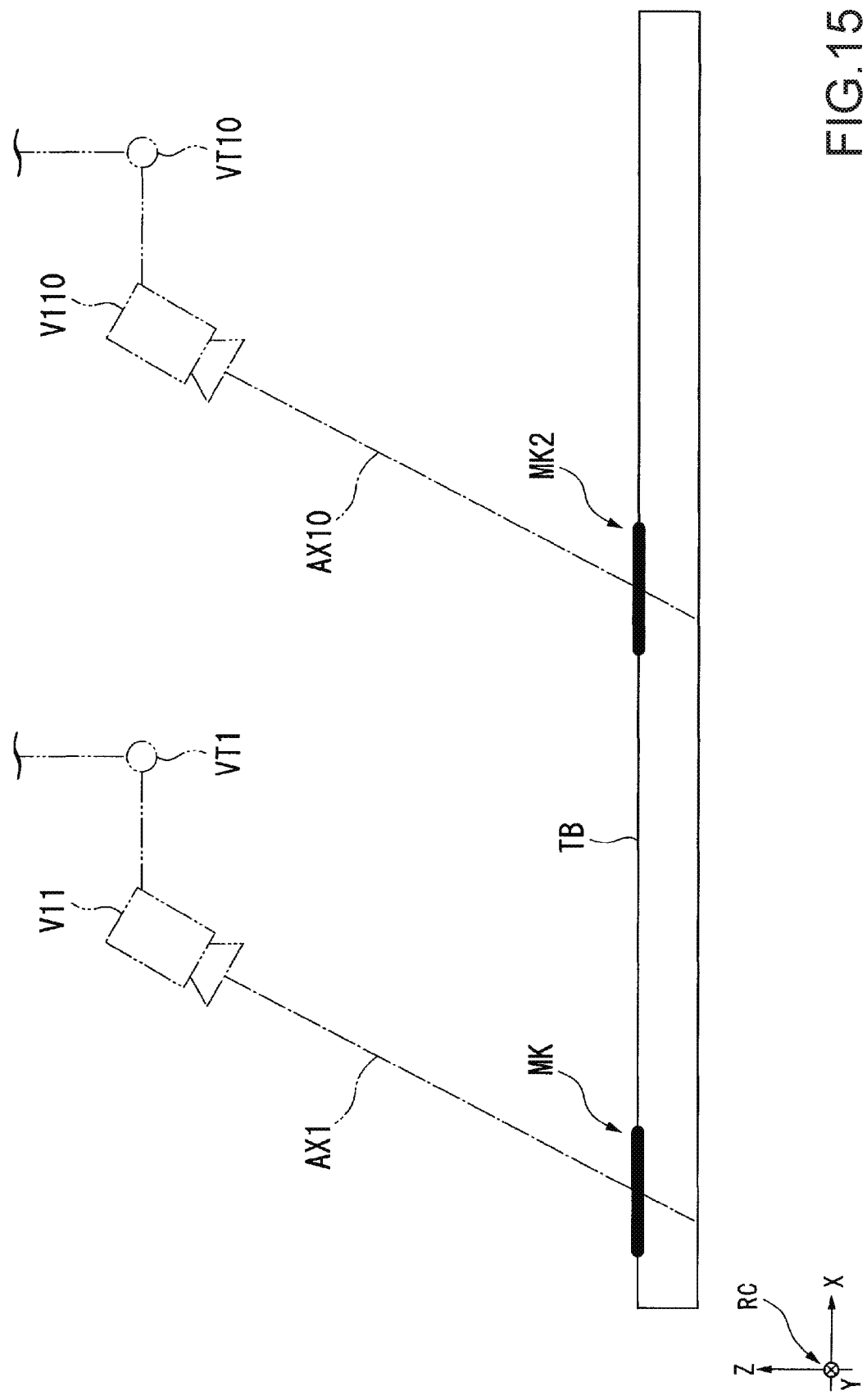
FIG. 15 shows an example of a position relationship between the positions of the control point in the respective first position and attitude and fourth position and attitude and the position of the first marker.

Specifically, as shown in FIG. 15, the robot control apparatus 30 moves the position of the control point T with the attitude of the control point T held from the state in which the position and the attitude of the control point T coincide with the second position and attitude, and allows the position and the attitude of the control point T to coincide with fourth position and attitude.

FIG. 15 shows an example of a position relationship between the positions of the control point T in the respective first position and attitude and fourth position and attitude and the position of the first marker MK. A circle VT10 shown in FIG. 15 virtually shows the position of the control point T when the position and the attitude of the control point T coincide with the fourth position and attitude. Further, an imaging unit V110 shown in FIG. 15 shows the position of the imaging unit 21 when the position and the attitude of the control point T coincide with the fourth position and attitude. A line AX10 shows the optical axis of the imaging unit 21. As below, as an example, the case where a line connecting the position of the control point T when coinciding with the first position and attitude and the position of the control point T when coinciding with the fourth position and attitude is parallel to the X-axis in the robot coordinate system RC and orthogonal to the Y-axis in the robot coordinate system RC will be explained. That is, the distances between the plane containing the first marker MK and the second marker MK2 (in the example, the top surface of the worktable TB) and the control point T are the same between the first position and attitude and the fourth position and attitude. Note that the line is not necessarily parallel to the X-axis or orthogonal to the Y-axis. However, the line is parallel to the XY plane in the robot coordinate system RC. This is because, in the example, when moving the control point T, the robot control part 47 does not change the distance between the control point T and the top surface of the worktable TB in the direction along the Z-axis in the robot coordinate system RC. Here, the robot control part 47 may be adapted, when the position of the control point T in the Z-axis direction in the first position and attitude and the position of the control point T in the Z-axis direction in the fourth position and attitude are the same, to change the position of the control point T in the Z-axis direction while the position and the attitude of the control point T changes from the first position and attitude to the fourth position and attitude.

The fourth position and attitude are a position and an attitude different from the first position and attitude, in which, when a captured image is captured by the imaging unit 21, the second marker MK2 contained in the captured image and a coincidence point on the captured image coincide. Further, the position of the control point T in the Z-axis direction in the robot coordinate system RC when the position and the attitude of the control point T coincide with the fourth position and attitude is the same as the position of the control point T in the Z-axis direction in the robot coordinate system RC when the position and the attitude of the control point T coincide with the first position and attitude.

For example, the robot control apparatus 30 moves the position of the control point T from the position of the control point T when the position and the attitude of the control point T coincide with the second position and attitude with the attitude of the control point T held to a position stored in the memory unit 32 in advance. The position is a position in which the second marker MK2 is contained in the range that can be imaged by the imaging unit 21. Then, the control apparatus 30 allows the imaging unit 21 to image the range that can be imaged by the imaging unit 21. The robot control apparatus 30 acquires the captured images captured by the imaging unit 21 as a fourth image from the imaging unit 21. The robot control apparatus 30 calculates a displacement from the position of the second marker MK2 contained in the fourth image to a coincidence point in the fourth image based on the acquired fourth image. The robot control apparatus 30 calculates the fourth position and attitude based on the calculated displacement, the above described coordinate transform matrix, and the current position and attitude of the control point T. Here, the attitude of the control point T when the position and the attitude of the control point T coincide with the fourth position and attitude should be the same attitude as the attitude of the control point T when the position and the attitude of the control point T coincide with the second position and attitude. The robot control apparatus 30 moves the control point T and allows the position and the attitude of the control point T to coincide with the fourth position and attitude based on the calculated fourth position and attitude. Further, the robot control apparatus 30 reads the relative position information stored in the memory unit 32. The robot control apparatus 30 calculates the position of the second marker MK2 based on the read relative position information and the fourth position and attitude. That is, when detecting two or more markers, the robot control apparatus 30 may omit at least part of the processing of the flowchart shown in FIG. 4 using the method. As a result, the robot control apparatus 30 may shorten the time taken for the detection of the position of the second marker MK2.

Modified Example 2 of Embodiment

As below, Modified Example 2 of the embodiment will be explained. The robot control apparatus 30 may be adapted so that information representing relative position and attitude between the position and the attitude of the control point T and a position and an attitude of a coincidence point in the range that can be imaged by the imaging unit 21 may be stored in the memory unit 32 in advance. In this case, the robot control apparatus 30 allows the position and the attitude of the control point T to coincide with the first position and attitude in the processing at step S180 shown in FIG. 4, and then, calculates the position of the first marker MK based on the first position and attitude and the information stored in the memory unit 32 in advance. Thereby, the robot control apparatus 30 may shorten the time taken for the detection of the position of the first marker MK.

As described above, in the robot 20, a movable part (in the example, the arm A) performs actions based on the position of a first marker (in the example, the first marker MK) obtained using first position and attitude of the movable part when a first image containing the first marker is captured by an imaging unit (in the example, the imaging unit 21) provided in the movable part and second position and attitude of the movable part when a second image containing the first marker is captured by the imaging unit. Thereby, the robot 20 may accurately perform a job including the actions based on the position of the first marker without operation of the arm A by an operator.

In the robot 20, the distances between the imaging unit and the first marker are the same between the first position and attitude of the movable part and the second position and attitude of the movable part. Thereby, the robot 20 may accurately perform a job including the actions based on the position of the first marker based on the first position and attitude and the second position and attitude having the same distance between the imaging unit and the first marker.

In the robot 20, the distances between the imaging unit and the control point of the movable part are the same between the first position and attitude and the second position and attitude. Thereby, the robot 20 may accurately perform a job including the actions based on the position of the first marker based on the first position and attitude and the second position and attitude having the same distance between the imaging unit and the control point of the movable part.

In the robot 20, the position and the attitude of the movable part change to the second position and attitude obtained using a third image captured by the imaging unit when changing from the first position and attitude to the third position and attitude. Thereby, the robot 20 may accurately perform a job including the actions based on the position of the first marker based on the first position and attitude and the second position and attitude obtained using the third image.

In the robot 20, actions are performed based on the position of the first marker obtained using the first position and attitude and the second position and attitude in which the position of the first marker in the second image coincides with a position corresponding to the position of the first marker in the first image of the positions in the second image. Thereby, the robot 20 may accurately perform a job including the actions based on the position of the first marker based on the first position and attitude and the second position and attitude in which the position of the first marker in the second image coincides with the position corresponding to the position of the first marker in the first image of the positions in the second image.

In the robot 20, actions are performed based on the position of the first marker obtained using the first position and attitude in which the position of the first marker in the first image coincides with a center position in the first image and the second position and attitude in which the position of the first marker in the second image coincides with a center position in the second image. Thereby, the robot 20 may accurately perform a job including the actions based on the position of the first marker based on the first position and attitude in which the position of the first marker in the first image coincides with the center position in the first image and the second position and attitude in which the position of the first marker in the second image coincides with the center position in the second image.

In the robot 20, an optical axis (in the example, the optical axis indicated by the line AX1) on which the first image is captured by the imaging unit in the first position and attitude and an optical axis (in the example, the optical axis indicated by the line AX2) on which the second image is captured by the imaging unit in the second position and attitude are parallel. Thereby, the robot 20 may accurately perform a job including the actions based on the position of the first marker based on the first position and attitude and the second position and attitude in which the optical axis of the imaging unit is parallel to the optical axis on which the first image is captured by the imaging unit in the first position and attitude.

In the robot 20, the optical axis on which the first image is captured by the imaging unit in the first position and attitude and the optical axis on which the second image is captured by the imaging unit in the second position and attitude are non-parallel. Thereby, the robot 20 may accurately perform a job including the actions based on the position of the first marker based on the first position and attitude and the second position and attitude in which the optical axis of the imaging unit is not parallel to the optical axis on which the first image is captured by the imaging unit in the first position and attitude.

In the robot 20, the movable part performs actions based on a position of a second marker obtained using the position of the first marker, the first position and attitude, and fourth position and attitude of the movable part when a fourth image containing the second marker is captured by the imaging unit. Thereby, the robot 20 may accurately perform a job including the actions based on the position of the second marker based on the position of the first marker, the first position and attitude, and the fourth position and attitude of the movable part when the fourth image containing the second marker is captured by the imaging unit.

In the robot 20, the distances between a plane containing the first marker and the second marker and the control point of the movable part are the same between the first position and attitude and the fourth position and attitude. Thereby, the robot 20 may accurately perform a job including the actions based on the position of the second marker based on the first position and attitude and the fourth position and attitude having the same distance between the plane containing the first marker and the second marker and the control point of the movable part.

Second Embodiment

As below, an embodiment of the invention will be explained with reference to the drawings. The same component elements as those of the first embodiment will have the same signs and their explanation will be omitted or simplified.

Configuration of Robot System

First, a configuration of a robot system 4 will be explained.

Figure 16:
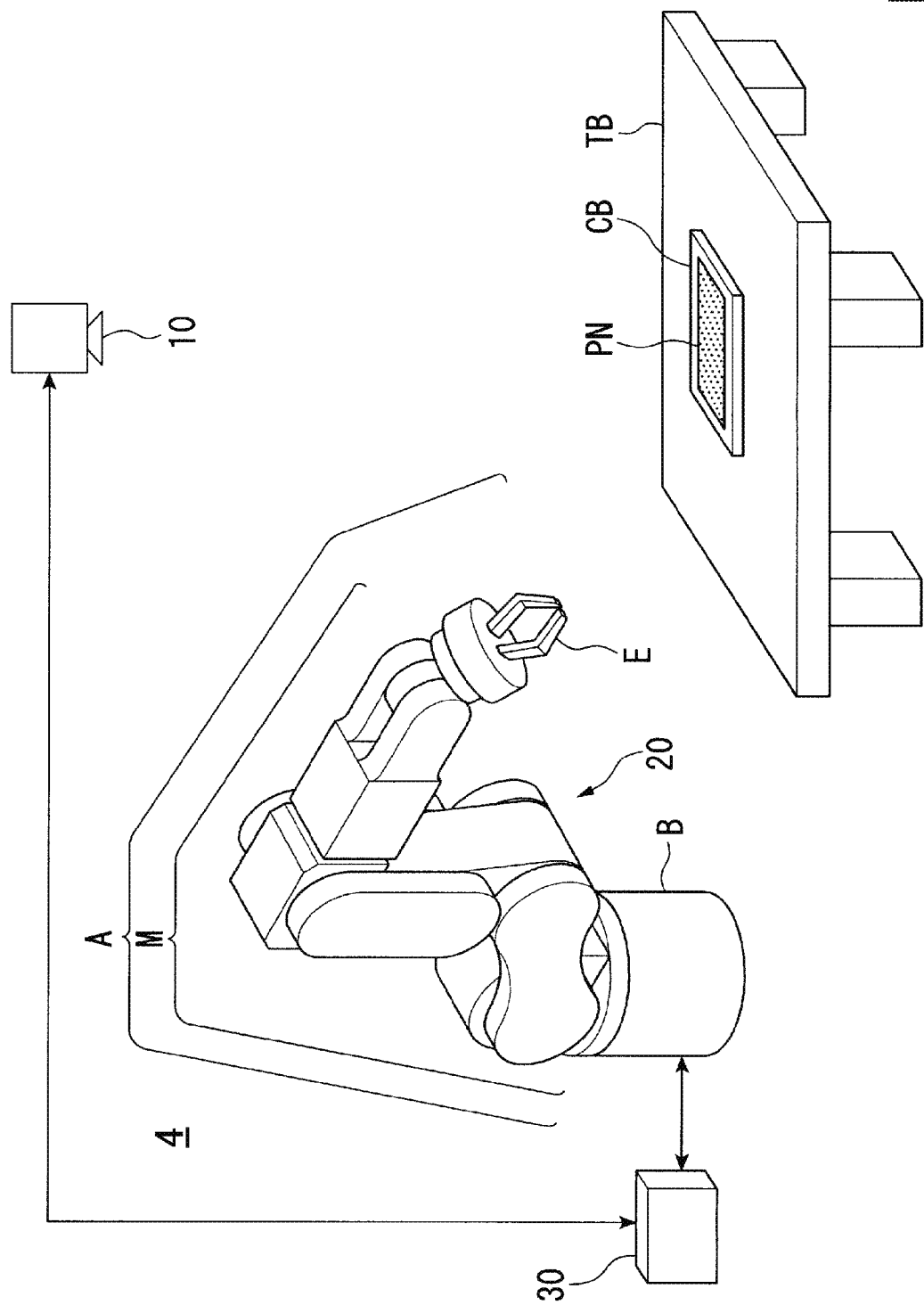
FIG. 16 shows an example of a configuration of a robot system according to the second embodiment.

FIG. 16 shows an example of the configuration of the robot system 4 according to the embodiment. The robot system 4 includes an imaging unit 10, a robot 20, and a robot control apparatus 30.

The imaging unit 10 is a camera including e.g. a CCD, a CMOS, or the like as an imaging device that converts collected lights into electrical signals. The imaging unit 10 is placed in a position in which a range containing a calibration board CB mounted on the top surface of a worktable TB can be imaged.

The worktable TB is e.g. a platform such as a table. Note that the worktable TB may be another platform as long as the calibration board CB can be mounted thereon in place of the table. The calibration board CB is used for a calibration of correlating an imaging unit coordinate system CC and a robot coordinate system RC. More specifically, in the calibration, a correlation between coordinates in the imaging unit coordinate system CC and coordinates in the robot coordinate system RC is performed. The imaging unit coordinate system CC is a coordinate system indicating a position on a captured image captured by the imaging unit 10. The robot coordinate system RC is a coordinate system as reference when the robot control apparatus 30 moves the TCP of the robot 20 to the robot 20. The shape of the calibration board CB shown in FIG. 16 is a plate-like shape, but may be another shape including a cubic shape, rectangular parallelepiped shape, triangular prism shape, triangular pyramid shape, cylindrical shape, and conical shape. The calibration board CB will be described later.

The imaging unit 10 is communicably connected to the robot control apparatus 30 by a cable. Wired communications via the cable are performed according to standards of e.g. Ethernet (registered trademark), USB, or the like. Alternatively, the imaging unit 10 may be adapted to be connected to the robot control apparatus 30 via wireless communications performed according to communication standards of Wi-Fi (registered trademark) or the like.

The robot control apparatus 30 allows the imaging unit 10 to image the range containing the above described calibration board CB. Then, the robot control apparatus 30 acquires a captured image captured by the imaging unit 10 from the imaging unit 10. The robot control apparatus 30 performs a calibration of correlating the imaging unit coordinate system CC and the robot coordinate system RC based on the captured image. Specifically, the robot control apparatus 30 performs a calibration of correlating the robot coordinate system RC and a calibration board coordinate system indicating a posit ion on the calibration board CB based on the captured image. Here, in the case where the calibration of correlating the calibration board coordinate system and the robot coordinate system RC has been performed on the robot control apparatus 30 in advance, the robot control apparatus 30 may perform the calibration of correlating the imaging unit coordinate system CC and the robot coordinate system RC based on the two calibration results. A method of performing the calibration of correlating the calibration board coordinate system and the robot coordinate system RC on the robot control apparatus 30 may be an existing method including a method containing a touch-up operation like direct teaching or a new method to be developed. As below, as an example, the case where the calibration of correlating the calibration board coordinate system and the robot coordinate system RC has been performed on the robot control apparatus 30 in advance will be explained. After the calibration of correlating the imaging unit coordinate system CC and the robot coordinate system RC is performed, the robot control apparatus 30 allows the robot 20 to perform a predetermined job based on the captured image captured by the imaging unit 10.

Configuration of Calibration Board

As below, the calibration board CB will be explained. In the calibration board CB, a pattern PN of four or more markers is provided. That is, the pattern PN contains these four or more markers. In the pattern PN, the respective four or more markers are located at vertices of a convex hull. The convex hull refers to the minimum convex polygon containing all given points. Thereby, all combinations of three markers that can be selected from the four or more markers forming the pattern PN are not aligned in straight lines. Further, in the example, in the pattern PN, the first marker as one marker of the four or more markers has a different feature from the other markers. Specifically, the length of the side containing the first marker of the four or more markers forming the pattern PN is longer than the lengths of the other sides in the convex hull having the vertices at which the respective four or more markers are located. Note that the four or more markers contained in the pattern PN may not include the first marker having the feature. However, when the four or more markers contained in the pattern PN includes the first marker, the calibration board CB may be detected in a shorter time than that when the four or more markers contained in the pattern PN do not include the first marker.

As below, as an example, the case where the pattern PN containing five markers of markers MK1 to MK5 will be explained. The five is an example of a predetermined number. Further, as below, the case where the marker MK1 is the first marker will be explained. Furthermore, as below, the case where all of the markers MK1 to MK5 have the same shape to one another and have the same size to one another will be explained. Note that, in place of the marker MK1, the first marker may be one of the markers MK2 to MK5. Alternatively, part or all of the markers MK1 to MK5 have different shapes from one another and have different sizes from one another.

Figure 17:
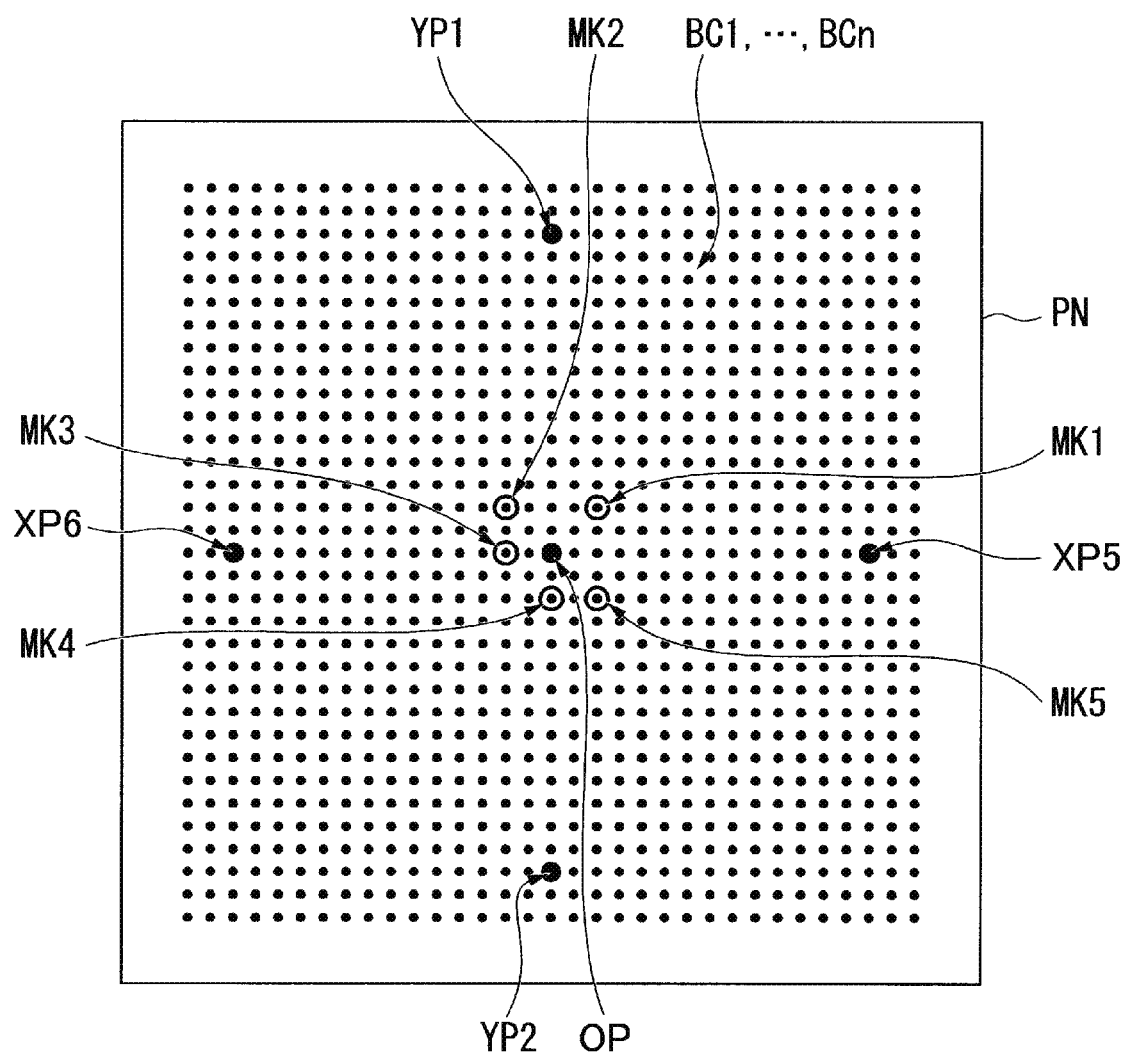
FIG. 17 shows an example of a pattern.

FIG. 17 shows an example of the pattern PN. As shown in FIG. 17, the pattern PN contains the markers MK1 to MK5. In the example, the respective markers MK1 to MK5 are figure center markers. Note that part or all of the markers MK1 to MK5 may be other markers in place of the figure center markers.

Here, the center of figure of the figure center marker is explained.

Figure 18:
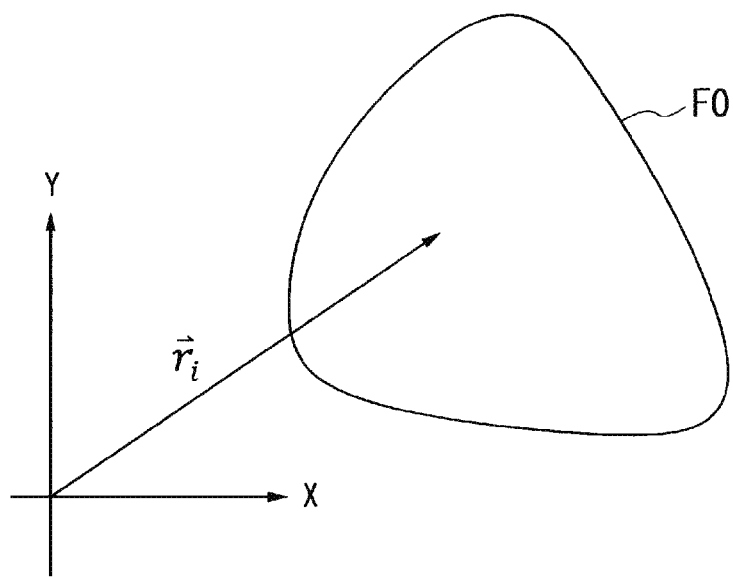
FIG. 18 is a diagram for explanation of the center of a figure.

FIG. 18 is a diagram for explanation of the center of figure. FIG. 18 shows a figure F0 having a contour formed by a curved line, a two-dimensional coordinate system for indicating positions of respective points forming the figure F0, and a vector r_i indicating the positions of the respective points. Here, in FIG. 18, the vector r is shown with an arrow on r. Further, in FIG. 18, "i" after "_" of the vector r_i is expressed by a subscript index i. The index i is a label for distinguishing the respective points (e.g. pixels) forming the figure F0. In FIG. 18, an arrow extending from the origin of the two-dimensional coordinate system to the figure F0 is an arrow indicating the size and the direction of the vector r_i.

The center of figure is the center of a figure in a manner. Only one center of figure is uniquely determined for each figure. The position of the center of figure of the figure F0 shown in FIG. 18 is expressed by a vector c defined by the following expression (1) using the vector r_i.

$$\vec{c} = \frac{\sum \vec{r}_i}{N} \quad (1)$$

In the expression (1), the vector c is expressed with an arrow on c. Further, N is the number of points forming the figure F0 and an integer equal to or larger than one. That is, the position of the center of figure of the figure F0 shown in FIG. 18 is expressed by a vector obtained by division of the sum of the vectors showing the positions of the respective points forming the figure F0 by the number of the respective points (an average of the N vectors). Note that, in FIG. 18, the center of figure is explained using the two-dimensional figure F0, the two-dimensional coordinate system, and the two-dimensional vectors, however, the position of the center of figure is expressed by the vector c defined by the above expression (1) for a three- or higher-dimensional figure.

The figure center marker is a marker formed by a combination of three or more figures. That is, the respective centers of figure of the three or more figures forming the figure center marker fall (are contained) within a predetermined range. For example, in a figure center marker formed by a combination of a figure A0, a figure B0, and a figure C0, a center of figure A1 of the figure A0, a center of figure B1 of the figure B0, and a center of figure C1 of the figure C0 fall (are contained) within a predetermined range. The predetermined range is e.g. a circular range having a radius of about several pixels, however, may be a circular range having a radius of one pixel or less, a circular range having a radius of more than several pixels, or a range having another shape than the circular shape such as a rectangular shape.

Next, the figure center marker will be explained by taking the marker MK1 of the markers MK1 to MK5 shown in FIG. 17 as an example.

Figure 19:
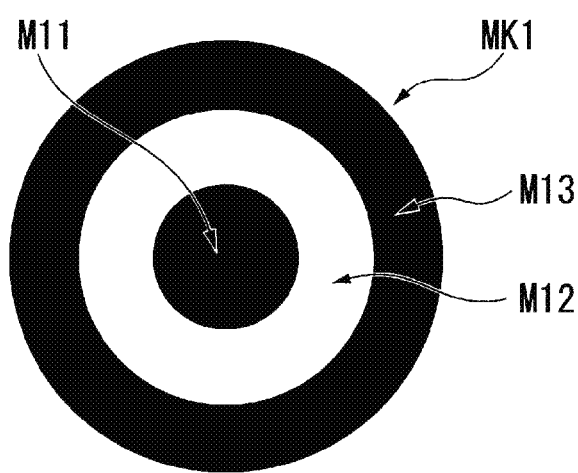
FIG. 19 shows a marker shown in FIG. 17.

FIG. 19 shows the marker MK1 shown in FIG. 17. As shown in FIG. 19, the marker MK1 is formed by three or more figures. Specifically, the respective three or more figures forming the marker MK1 are detected as partial areas in only white or black in a binarized image. That is, the marker MK1 is formed by three figures of a figure M11 shown by a black partial area having a circular contour, a figure M12 shown by a white partial area having a ring-shaped contour, and a figure M13 shown by a black partial area having a ring-shaped contour. Further, the marker MK1 is formed so that the respective centers of figure of the figure M11, the figure M12, and the figure M13 may fall within a predetermined range. Accordingly, the marker MK1 formed by the combination of the figure M11, the figure M12, and the figure M13 is a figure center marker. Note that the respective contours of the figures M11 to M13 in the marker MK1 form concentric circles and the centers of figure are located at the centers of the concentric circles. The combination of three or more figures forming the figure center marker may be a combination that does not form concentric circles. However, even in this case, the respective centers of figure of the three or more figures forming the figure center marker fall within a predetermined range. In the case where the respective markers MK1 to MK5 are figure center markers, it is less likely that three centers of figure incidentally fall within a predetermined range, and thereby, the calibration board CB may suppress false detection of the respective markers MK1 to MK5 and accurately detect the respective markers MK1 to MK5.

Figure 20:
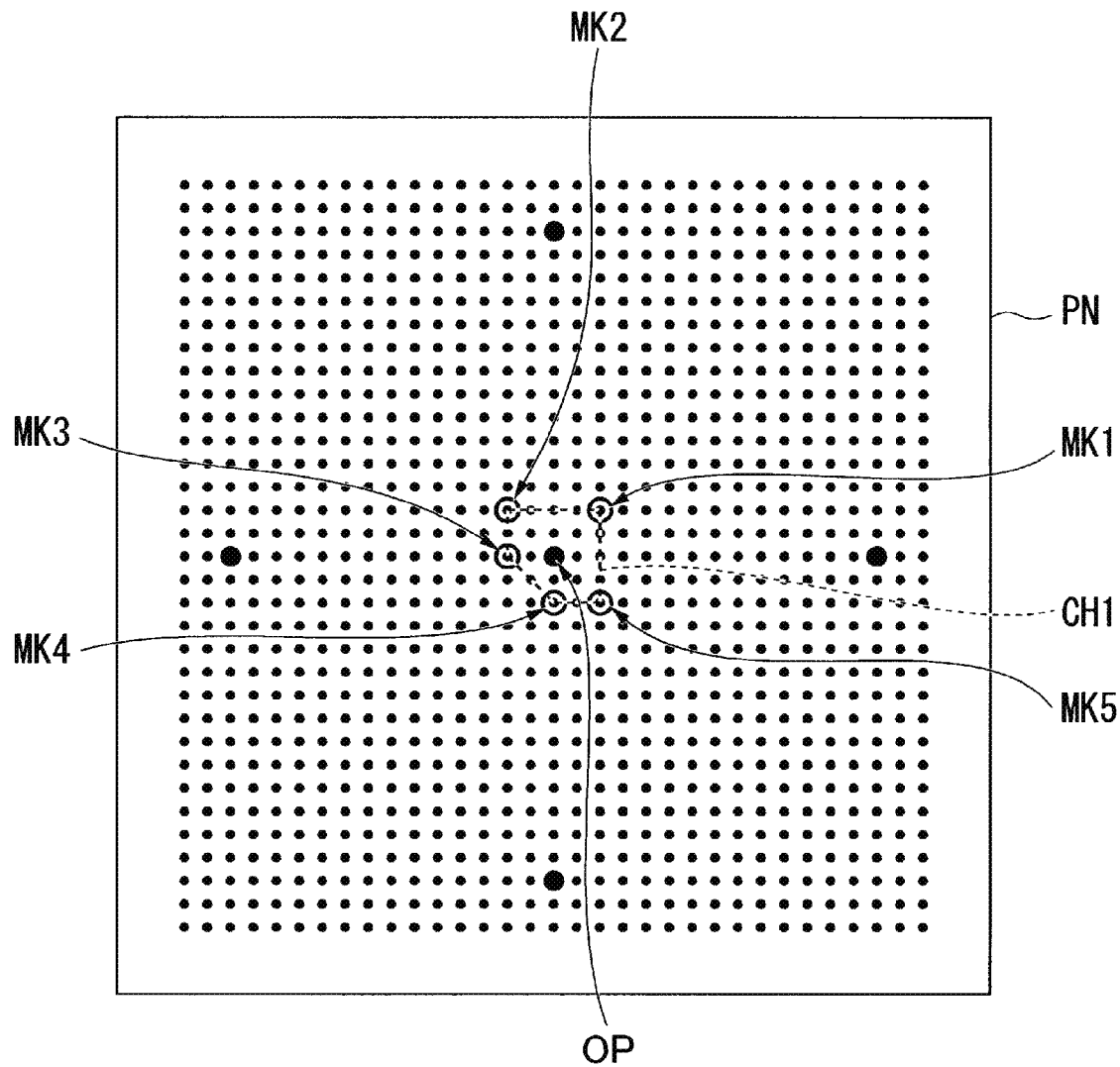
FIG. 20 shows an example of a geometrical position relationship between markers in the pattern.

In the pattern PN, the markers MK1 to MK5 as the figure center markers are located at vertices of a convex hull without rotational symmetry as shown in FIG. 20.

FIG. 20 shows an example of a geometrical position relationship among the markers MK1 to MK5 in the pattern PN. That is, the respective markers MK1 to MK5 are placed at respective vertices of a convex hull as a convex hexagon without rotational symmetry in the pattern PN. A convex hull CH1 shown in FIG. 20 is an example of the convex hull having the vertices at which the respective markers MK1 to MK5 are placed without rotational symmetry. According to the geometrical position relationship among the markers MK1 to MK5, all combinations of three markers that can be selected from the markers MK1 to MK5 are not aligned in straight lines. Further, as described above, the length of the side containing the marker MK1 as the first marker in the convex hull CH1 is longer than the lengths of the other sides in the convex hull CH1.

Returning to FIG. 17, the pattern PN in the example further contains black circles BC1 to BCn as n black circles, a marker OP, a marker XP5, a marker XP6, a marker YP1, and a marker YP2. Here, n is an arbitrary integer. Note that the pattern PN may have a configuration not containing part or all of the black circles BC1 to BCn as the n black circles, the marker OP, the marker XP5, the marker XP6, the marker YP1, and the marker YP2. At least one of the marker XP5 and the marker XP6 is an example of a first reference portion. Further, at least one of the marker YP1 and the marker YP2 is an example of a second reference portion.

The respective black circles BC1 to BCn are placed at the respective grid points when the area within the pattern PN are divided in a square grid pattern. Further, in a position in which a certain black circle in the black circles BC1 to BCn overlaps with one marker of the markers MK1 to MK5, the black circle is removed and the marker is placed in the position. The black circles BC1 to BCn are used when distortion correction of the imaging unit 10 is performed by the calibration board CB, for example. Further, the black circles BC1 to BCn can be used for improving detection accuracy of the calibration board CB by the robot control apparatus 30. Note that part or all of the black circles BC1 to BCn have another shape, another size, and another color. In this case, the part or all of the black circles should be distinct in comparison with any of the markers MK1 to MK5, the marker OP, the marker XP5, the marker XP6, the marker YP1, and the marker YP2.

The marker OP is a marker showing the origin of the coordinate system indicating positions on the pattern PN. The marker OP shown in FIG. 17 is shown by a black circle having a larger diameter than those of the plurality of black circles BC1 to BCn. Note that, in place of the black circle, the marker OP may be a black circle having a smaller diameter than those of the plurality of black circles BC1 to BCn, a marker having another shape, or a marker in another color. The marker OP is located within (inside) the convex hull CH1 having the vertices at which the respective markers MK1 to MK5 are located (see FIG. 20). In the example, the position of the marker OP is a position at the midpoint between the two markers at the longest distance among the markers MK1 to MK5. That is, the marker OP shows the position according to the geometrical position relationship among the markers MK1 to MK5. Here, in a position in which the marker OP overlaps with a certain black circle of the black circles BC1 to BCn, the black circle is removed and the marker OP is placed in the position. Note that the marker OP may not be contained in the pattern PN. In this regard, the marker OP is contained in the pattern PN, and thereby, the false detection of the position according to the geometrical position relationship among the markers MK1 to MK5 may be suppressed and the position may be accurately detected. Further, the marker OP may show a position regardless of the geometrical position relationship among the markers MK1 to MK5. In other words, the position of the marker OP may be any position within the convex hull CH1.

In the example, the shapes and sizes of the marker XP5 and the marker XP6 are the same as the shape and size of the marker OP. In the example, the marker XP5 and the marker XP6 are placed so that the marker OP may be located on a line connecting the marker XP5 and the marker XP6. Further, the marker XP5 and the marker XP6 are placed so that one side of the sides of the above described square grid and the line may be parallel. That is, the line connecting the marker XP5 and the marker XP6 shows an X-axis passing through the marker OP as the origin on the pattern PN. Here, in a position in which the marker XP5 overlaps with a certain black circle of the black circles BC1 to BCn, the black circle is removed and the marker XP5 is placed in the position. In a position in which the marker XP6 overlaps with a certain black circle of the black circles BC1 to BCn, the black circle is removed and the marker XP6 is placed in the position. The marker XP5 and the marker XP6 may not be contained in the pattern PN. In this regard, the marker XP5 and the marker XP6 are contained in the pattern PN, and thereby, the calibration board CB may suppress false detection of the X-axis according to the geometrical position relationship among the markers MK1 to MK5 in the coordinate system indicating the attitude of the calibration board CB and accurately detect the X-axis. One or both of the marker XP5 and the marker XP6 may have another shape, another size, or another color.

In the example, the shapes and sizes of the marker YP1 and the marker YP2 are the same as the shape and size of the marker OP. In the example, the marker YP1 and the marker YP2 are placed so that the marker OP may be located on a line connecting the marker YP1 and the marker YP2. Further, the marker YP1 and the marker YP2 are placed so that the line connecting the marker XP5 and the marker XP6 and the line connecting the marker YP1 and the marker YP2 may be orthogonal. That is, the line connecting the marker YP1 and the marker YP2 shows a Y-axis passing through the marker OP as the origin on the pattern PN. Here, in a position in which the marker YP1 overlaps with a certain black circle of the black circles BC1 to BCn, the black circle is removed and the marker YP1 is placed in the position. In a position in which the marker YP2 overlaps with a certain black circle of the black circles BC1 to BCn, the black circle is removed and the marker YP2 is placed in the position. The marker YP1 and the marker YP2 may not be contained in the pattern PN. In this regard, the marker YP1 and the marker YP2 are contained in the pattern PN, and thereby, the calibration board CB may suppress false detection of the Y-axis according to the geometrical position relationship among the markers MK1 to MK5 in the coordinate system indicating the attitude of the calibration board CB and accurately detect the Y-axis. One or both of the marker YP1 and the marker YP2 may have another shape, another size, or another color.

Hardware Configuration of Robot Control Apparatus

As below, referring to FIG. 2, a hardware configuration of the robot control apparatus 30 will be explained.

The robot control apparatus 30 respectively communicates with the imaging unit 10 and the robot 20 via a communication unit 34.

Functional Configuration of Robot Control Apparatus

As below, referring to FIG. 21, a functional configuration of the robot control apparatus 30 will be explained.

Figure 21:
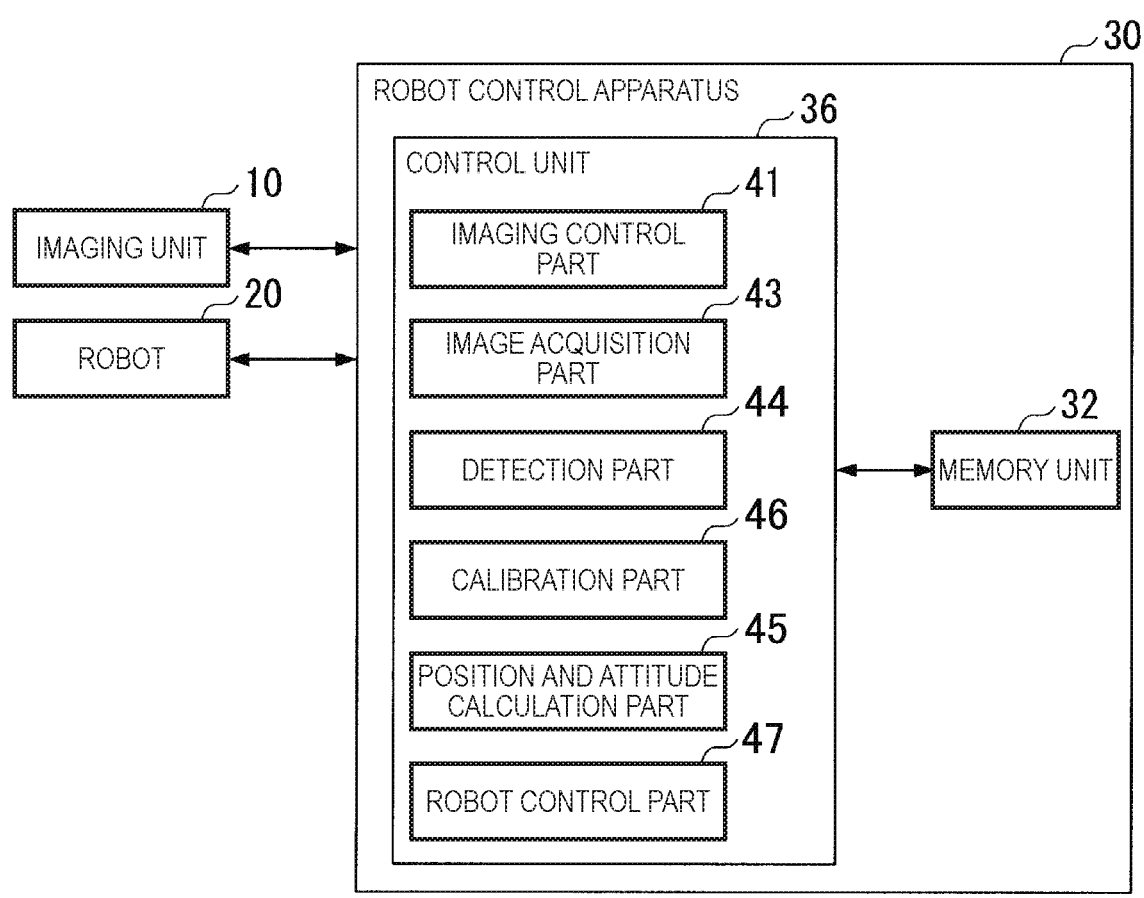
FIG. 21 shows an example of a functional configuration of the robot control apparatus.

FIG. 21 shows an example of the functional configuration of the robot control apparatus 30.

A control unit 36 includes an imaging control part 41, an image acquisition part 43, a detection part 44, a calibration part 46, a position and attitude calculation part 45, and a robot control part 47.

The imaging control part 41 allows the imaging unit 10 to image a range that can be imaged by the imaging unit 10.

The image acquisition part 43 acquires the captured image captured by the imaging unit 10 from the imaging unit 10.

The detection part 44 detects marker candidates as respective candidates for the markers MK1 to MK5 contained in the captured image based on the captured image acquired by the image acquisition part 43. The detection part 44 detects the pattern PN of the markers MK1 to MK5 based on the detected marker candidates. Further, the detection part 44 detects the marker OP contained in the captured image based on the captured image acquired by the image acquisition part 43. Furthermore, the detection part 44 detects the marker XP5 and the marker XP6 contained in the captured image based on the captured image acquired by the image acquisition part 43. Moreover, the detection part 44 detects the marker YP1 and the marker YP2 contained in the captured image based on the captured image acquired by the image acquisition part 43.

The calibration part 46 performs a calibration of correlating the imaging unit coordinate system CC and the robot coordinate system RC based on the pattern PN detected by the detection part 44.

The position and attitude calculation part 45 calculates a position and an attitude according to the geometrical position relationship among the markers MK1 to MK5 based on the pattern PN detected by the detection part 44. Note that the position and attitude calculation part 45 may be adapted to calculate a position or an attitude according to the geometrical position relationship among the markers MK1 to MK5 based on the pattern PN detected by the detection part 44.

The robot control part 47 allows the robot 20 to perform a predetermined job based on the position and the attitude calculated by the position and attitude calculation part 45.

Processing of Calibration Performed by Robot Control Apparatus

As below, referring to FIG. 22, processing of a calibration performed by the robot control apparatus 30 will be explained. The calibration is a calibration of correlating the imaging unit coordinate system CC and the robot coordinate system RC.

Figure 22:
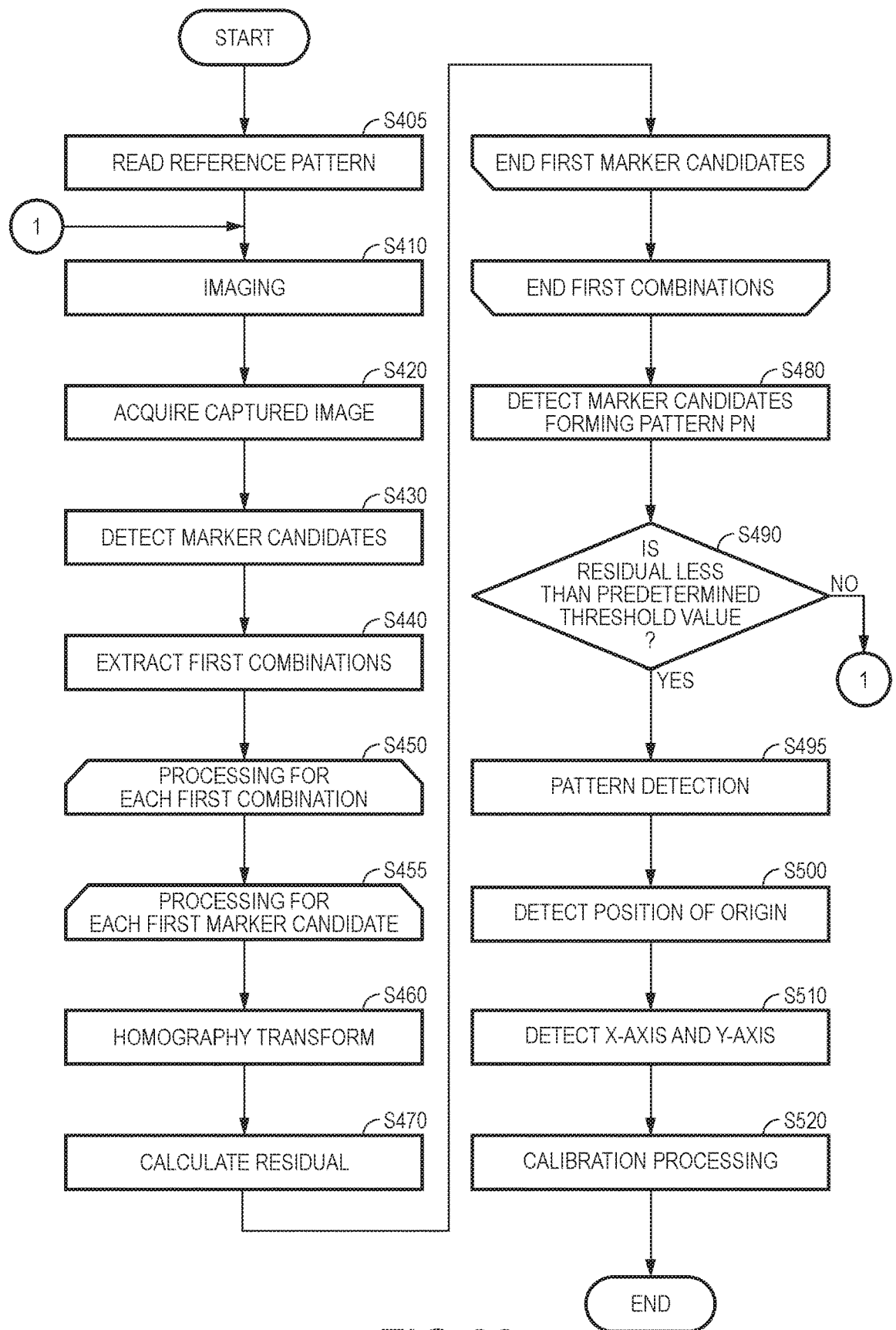
FIG. 22 is a flowchart showing an example of a flow of processing of a calibration performed by the robot control apparatus.

FIG. 22 is a flowchart showing an example of a flow of the processing of the calibration performed by the robot control apparatus 30. Note that, as described above, the case where the calibration of correlating the calibration board coordinate system and the robot coordinate system RC has been performed on the robot control apparatus 30 in advance will be explained as below.

The detection part 44 reads a reference pattern stored in the memory unit 32 in advance from the memory unit 32 (step S405). Here, the processing at step S405 is explained. The reference pattern is an image for comparison used by the detection part 44 for detecting the markers MK1 to MK5 contained in the captured image.

Figures 23, 24:
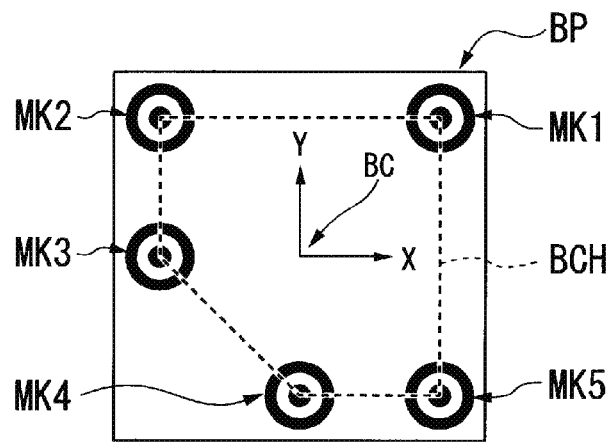
FIG. 23 shows an example of a reference pattern.
FIG. 24 is a table showing X-coordinates and Y-coordinates of respective markers in a two-dimensional coordinate system shown in FIG. 23.

FIG. 23 shows an example of the reference pattern. The reference pattern BP shown in FIG. 23 is an example of the reference pattern. In the reference pattern BP, a marker MK1, a marker MK2, a marker MK3, a marker MK4, and a marker MK5 are placed in a predetermined relative position relationship. The position relationship is the same position relationship as the geometrical position relationship among the respective markers MK1 to MK5 contained in the pattern PN. In other words, the respective markers MK1 to MK5 are located at respective vertices of a convex hull BCH having the same shape as the above described convex hull CH1.

Further, the reference pattern BP is associated with a two-dimensional coordinate system BC indicating a position and an attitude according to the geometrical position relationship among the markers MK1 to MK5 contained in the reference pattern BP. The position is indicated by a position in the robot coordinate system RC of the origin in the two-dimensional coordinate system BC. Further, the attitude is indicated by directions in the robot coordinate system RC of the respective coordinate axes in the two-dimensional coordinate system BC. Note that the position of the origin of the two-dimensional coordinate system BC shown in FIG. 23 is located inside of the convex hull BCH, however, may be located outside of the convex hull BCH.

More specifically, the respective markers MK1 to MK5 forming the reference pattern BP are placed on the reference pattern BP based on coordinates shown in FIG. 24.

FIG. 24 is a table showing X-coordinates and Y-coordinates of the respective markers MK1 to MK5 in the two-dimensional coordinate system BC shown in FIG. 23. In the example shown in FIGS. 23 and 24, the positive direction of the X-axis in the two-dimensional coordinate system BC coincides with a direction from the marker MK4 toward the marker MK5. Further, the positive direction of the Y-axis in the two-dimensional coordinate system BC coincides with a direction from the marker MK3 toward the marker MK2. Note that the positive direction of the X-axis and the positive direction of the Y-axis in the two-dimensional coordinate system BC may coincide with other directions. The values of the X-coordinates and Y-coordinates shown in FIG. 24 are values calculated with a relative distance between the marker closest to the origin of the two-dimensional coordinate system BC of the markers MK1 to MK5 and the origin of the two-dimensional coordinate system BC as "10". Accordingly, the values of the X-coordinates and Y-coordinates shown in FIG. 24 are shown without units.

After the processing at step S405 is performed, the image control part 41 allows the imaging unit 10 to image the range that can be imaged by the imaging unit 10 (step S410). Then, the image acquisition part 43 acquires the captured image captured by the imaging unit 10 at step S410 from the imaging unit 10 (step S420). Then, the detection part 44 detects marker candidates as respective candidates of the markers MK1 to MK5 contained in the captured image based on the captured image acquired by the image acquisition part 43 at step S420 (step S430). Here, the processing at step S430 is explained.

At step S430, the detection part 44 detects figures that can be determined as the figure center markers shown in FIG. 18 from a plurality of figures contained in the captured image acquired by the image acquisition part 43 at step S430 as the marker candidates. In other words, the detection part 44 detects combinations of figures that can be determined to have three or more centers of figure within the predetermined range as the marker candidates. The combinations contain noise. In the example, the noise includes other markers, figures, patterns etc. falsely detected by the detection part 44 from the captured image as the figure center markers shown in FIG. 18. As below, as an example, the case where the detection part 44 respectively detects marker candidates DP1 to DP6 as six marker candidates will be explained. In this case, the markers to be detected are the five markers MK1 to MK5, and one of the marker candidates DP1 to DP6 is noise falsely detected as the marker candidate. Note that the detection part 44 may be adapted to detect figures that can be determined as the figure center markers by pattern matching from the plurality of figures contained in the captured image as the marker candidates. In this case, the detection part 44 reads a model image of the figure center marker stored in the memory unit 32 in advance and detects the marker candidates based on the read model image. Note that, when detecting the marker candidates, the detection part 44 also detects the positions (X-coordinates and Y-coordinates) of the marker candidates in the imaging unit coordinate system CC.

Figure 25:
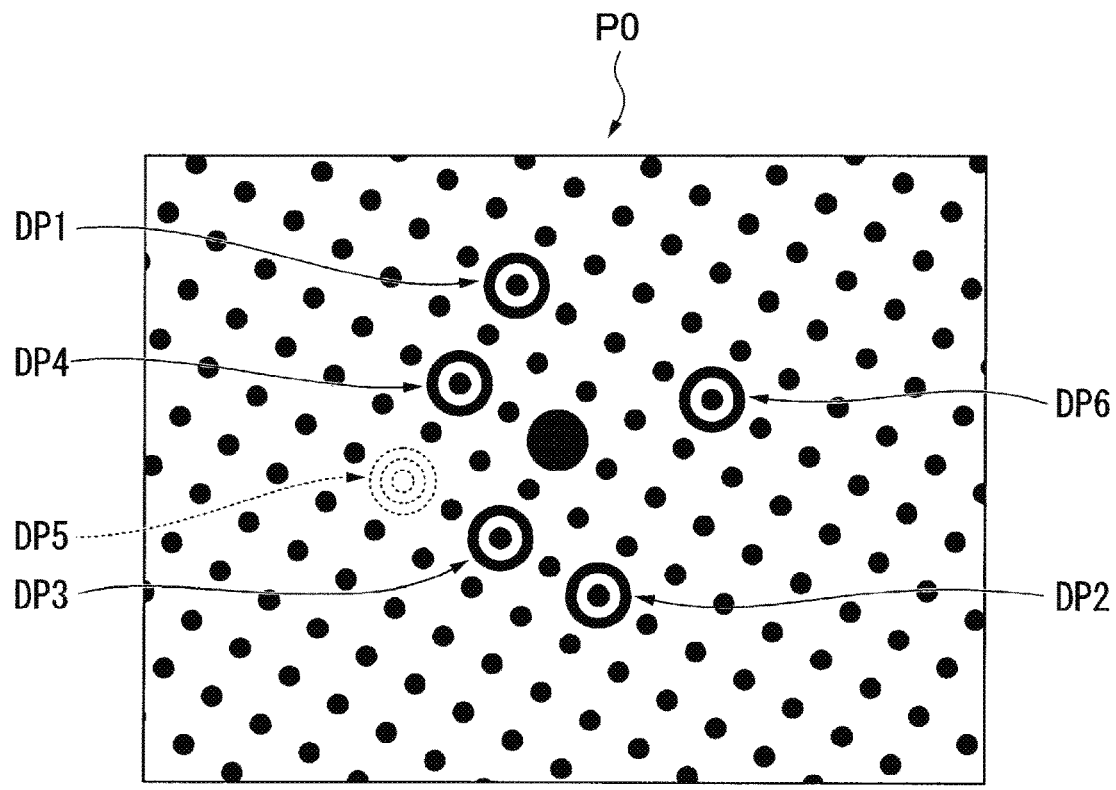
FIG. 25 shows an example of a part of a captured image acquired by an image acquisition part.

The respective marker candidates DP1 to DP6 shown in FIG. 25 are the marker candidates detected by the detection part 44 in the above described manner.

FIG. 25 shows an example of a part of the captured image acquired by the image acquisition part 43. The part is a part in which the respective markers MK1 to MK5 are imaged of the captured image. An image P0 shown in FIG. 25 is an example of the part. Note that, in the example shown in FIG. 25, the marker candidate DP5 is the noise falsely detected as the above described marker candidate. Accordingly, in FIG. 25, the marker candidate DP5 is shown by dotted lines for distinction from the other marker candidates.

After the processing at step S430 is performed, the detection part 44 extracts respective combinations of five marker candidates that can be selected from the six marker candidates detected at step S430 as zeroth combinations. Then, the detection part 44 extracts a combination that satisfies a predetermined condition from the extracted one or more zeroth combinations as a first combination (step S440). In the example, the predetermined condition is that the respective five marker candidates contained in the first combination are located at vertices of a convex hull. Here, the processing at step S440 is explained.

The detection part 44 detects a convex hull based on the five marker candidates contained in the zeroth combination with respect to each extracted zeroth combination. The method of detecting the convex hull with respect to each extracted zeroth combination by the detection part 44 may be an existing method or a method to be developed. When the method of detecting the convex hull is an existing method, the detection part 44 selects one marker candidate that satisfies a predetermined selection condition from the zeroth combination with respect to each zeroth combination. The predetermined selection condition is that both the following conditions 1), 2) are satisfied.

1) A marker candidate located in the uppermost position (the position having the largest Y-axis coordinate in the imaging unit coordinate system CC) within the capture image acquired by the image acquisition part 43 at step S420.

2) when there are two or more marker candidates that satisfy the condition 1), a marker candidate located in the rightmost position (the position having the largest X-axis coordinate in the imaging unit coordinate system CC) of the two or more marker candidates.

Note that the predetermined selection condition may satisfy another condition in place of the above described conditions 1), 2). Alternatively, the predetermined selection condition may satisfy another condition in addition to the above described conditions 1), 2). Alternatively, the predetermined selection condition may satisfy only the above described condition 1).

The detection part 44 calculates vectors from the selected marker candidate to the respective other marker candidates. The detection part 44 regularizes the respective calculated vectors into vectors having lengths of one. Here, when an outer product "vector CV1×vector CV2" of a certain vector CV1 included in the regularized vectors and a certain vector CV2 included in the regularized vectors is negative, the marker candidate shown by the vector CV1 is located in a position having the smaller X-axis coordinate in the imaging unit coordinate system CC than the marker candidate shown by the vector CV2. Accordingly, the detection part 44 calculates outer products of the respective regularized vectors and determines whether or not the results of the calculated outer products are negative, and thereby, specifies the marker candidate having the smallest X-axis coordinate. The detection part 44 selects the specified marker candidate as the next selected marker candidate. The detection part 44 repeats the selection of the selected marker candidate and repeats until the selected marker candidate that has been selected first is selected as the selected marker candidate again. Then, the detection part 44 detects a shape formed when the marker candidates selected as the selected marker candidates are connected by straight lines from the first selected marker candidate in the order of the selection, i.e., a convex hull. The detection part 44 performs the detection of the convex hull with respect to each zeroth combination. Note that the detection part 44 may be adapted to calculate the outer products of the respective regularized vectors and determine whether or not the results of the calculated outer products are negative, and thereby, specify the marker candidate having the largest X-axis coordinate.

The detection part 44 extracts the respective zeroth combinations that satisfy a predetermined condition as first combinations based on the detected convex hulls. The predetermined condition is that the respective marker candidates contained in the zeroth combination are located at vertices of the convex hull detected based thereon. That is, the detection part 44 excludes the convex hulls having four or less vertices from the respective detected convex hulls. Then, the detection part 44 specifies the remaining convex hulls not excluded, i.e., the convex hulls having five vertices. The detection part 44 extracts a combination of the marker candidates forming the convex hull with respect to each specified convex hull as the zeroth combination that satisfies the predetermined condition, i.e., the first combination.

Here, the zeroth combination that satisfies the predetermined condition will be explained by taking FIGS. 26 and 27 as examples.

Figure 26:
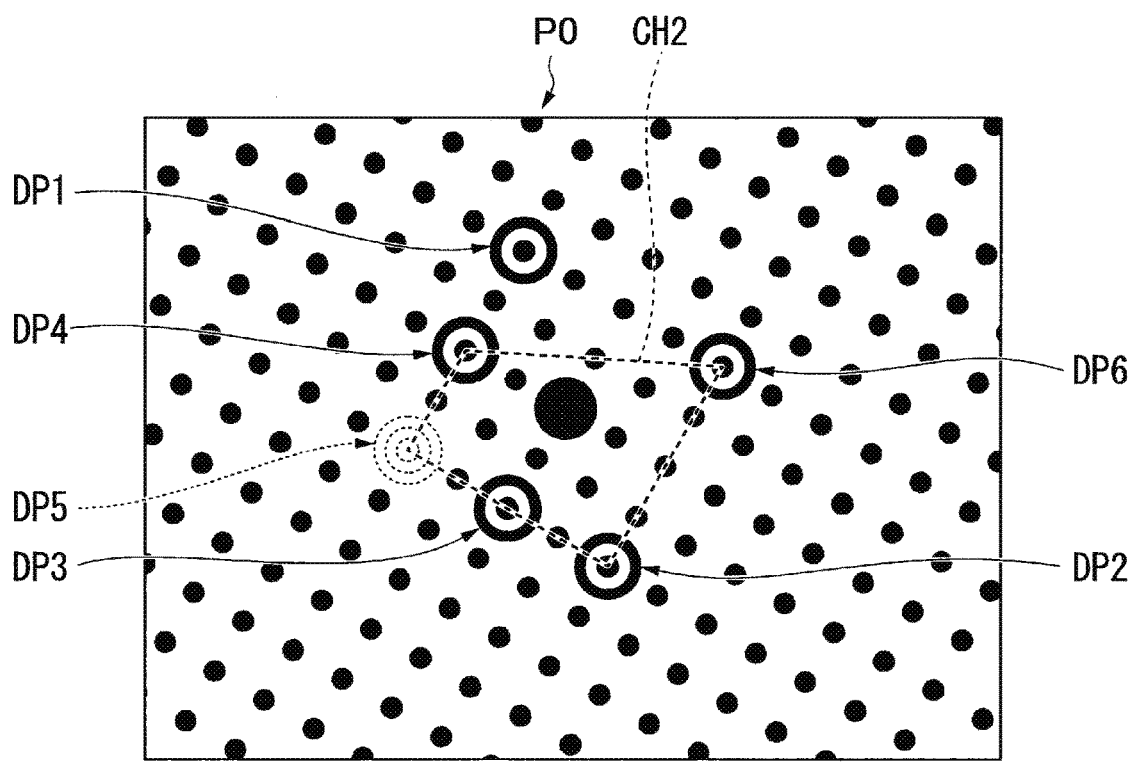
FIG. 26 shows an example of a zeroth combination that may be determined as a combination that satisfies a predetermined condition.

FIG. 26 shows an example of the zeroth combination that may be determined as the combination that satisfies the predetermined condition. Whether or not the zeroth combination shown in FIG. 26 satisfies the predetermined condition changes according to the position in which the marker candidate DP3 is detected in the imaging unit coordinate system CC. For example, when the output product of the marker candidate DP3 and the marker candidate DP2 is zero or positive, the detection part 44 detects a convex hull having vertices of the respective four marker candidates of the marker candidate DP2, marker candidate DP4, marker candidate DP5, marker candidate DP6 based on the zeroth combination shown in FIG. 26. A convex hull CH2 shown in FIG. 26 is an example of the convex hull. In this case, the number of vertices of the convex hull is four, and the detection part 44 does not extract the zeroth combination shown in FIG. 26 as the first combination. On the other hand, when the output product of the marker candidate DP3 and the marker candidate DP2 is negative, the detection part 44 detects a convex hull having vertices of the respective five marker candidates of the marker candidate DP2, marker candidate DP3, marker candidate DP4, marker candidate DP5, marker candidate DP6. In this case, the number of vertices of the convex hull is five, and the detection part 44 extracts the zeroth combination shown in FIG. 26 as the first combination.

Figure 27:
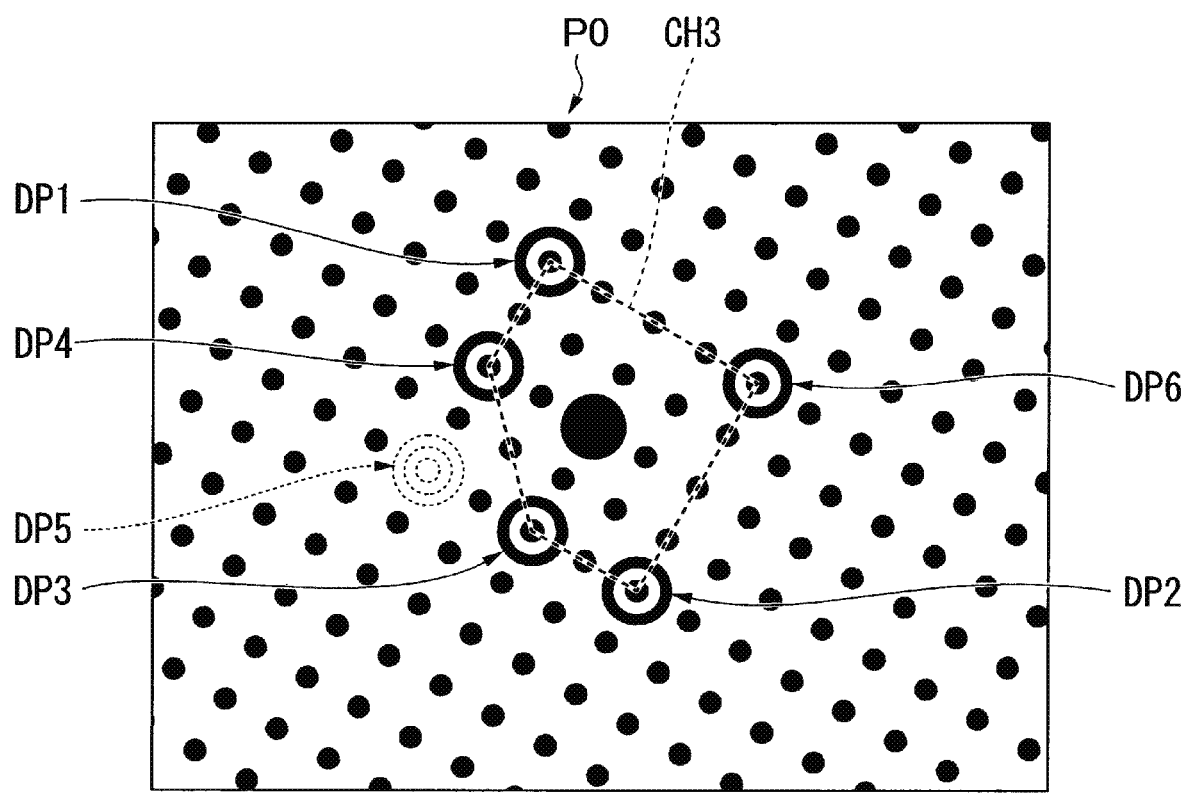
FIG. 27 shows an example of a zeroth combination that is determined as the combination that satisfies the predetermined condition.

On the other hand, FIG. 27 shows an example of the zeroth combination that is determined as the combination that satisfies the predetermined condition. In the example shown in FIG. 27, the detection part 44 selects the combination of the marker candidates DP1 to DP4 and the marker candidate DP6 as the zeroth combination. In this case, the detection part 44 detects a convex hull CH3 based on the zeroth combination. As shown in FIG. 27, the number of vertices of the convex hull CH3 is five. Accordingly, the detection part 44 determines that the zeroth combination shown in FIG. 27 is the combination that satisfies the predetermined condition and extracts the zeroth combination as the first combination.

Further, at step S440, the detection part 44 associates the respective marker candidates contained in the first combination with the order with respect to each extracted first combination. Here, processing of associating the respective marker candidates with the order is explained by taking the first combination shown in FIG. 27 as an example. The detection part 44 associates the respective marker candidates contained in the first combination with the order of the selection of the respective marker candidates as the above described selected marker candidates. In the example shown in FIG. 27, the marker candidate first selected as the selected marker candidate is the marker candidate DP1. Accordingly, the detection part 44 associates the marker candidate DP1 with "1" as the number indicating the first. Further, in the example, the marker candidate secondly selected as the selected marker candidate is the marker candidate DP4. Accordingly, the detection part 44 associates the marker candidate DP4 with "2" as the number indicating the second. The detection part 44 repeats this, and associates the marker candidate DP3 with "3" as the number of the third, associates the marker candidate DP2 with "4" as the number of the fourth, and associates the marker candidate DP6 with "5" as the number of the fifth.

After the processing at step S440 is performed, the detection part 44 repeats the processing at steps S455 to S470 with respect to each of the one or more first combinations extracted at step S440 (step S450).

The detection part 44 selects a first marker candidate as a candidate for the first marker one by one from the marker candidates contained in the first combination selected at step S450. Then, the detection part 44 repeatedly performs the processing at steps S460 to S470 with respect to each selected first marker candidate (step S455). More specifically, the detection part 44 performs homography transform of mapping the respective five marker candidates contained in the first combination selected at step S450 on the respective markers MK1 to MK5 contained in the reference pattern BP so that the first marker candidate selected at step S455 and the first marker (in the example, the marker MK1) contained in the reference pattern BP may coincide.

Then, the detection part 44 compares the result of the homography transform performed at step S460 and the reference pattern BP, and calculates a residual between the result and the reference pattern BP as a value indicating matching between the result and the reference pattern BP (step S470). The calculation method of the residual may be a known method or a method to be developed. Here, referring to FIGS. 28 to 30, the processing at steps S460 to S470 is explained. Note that, here, the case where the zeroth combination shown in FIG. 27 is the first combination selected at step S450 is explained as an example.

FIG. 28 is a table showing examples of X-coordinates and Y-coordinates of the respective marker candidates DP1 to DP6 in the imaging unit coordinate system CC detected by the detection part 44 at step S430.

FIG. 29 shows an example of coordinates of the respective marker candidates contained in the first combination after the homography transform is performed at step S460 in the two-dimensional coordinate system BC. In the example shown in FIG. 29, the detection part 44 selects the marker candidate DP1 as the first marker candidate. In this case, the detection part 44 calculates the residual between the result of the homography transform shown in FIG. 29 and the reference pattern BP as 3.26 at step S470.

On the other hand, FIG. 30 shows another example of coordinates in the two-dimensional coordinate system BC of the respective marker candidates contained in the first combination after homography transform is performed at step S460. In the example shown in FIG. 30, the detection part 44 selects the marker candidate DP6 as the first marker candidate. In this case, the detection part 44 calculates the residual between the result of the homography transform shown in FIG. 30 and the reference pattern BP as 0.0158 at step S470.

After the residuals corresponding to each of the combinations of the first combination and the first marker candidate are calculated by the repeated processing at steps S450 to S470, the detection part 44 specifies the combination corresponding to the minimum residual. Note that the detection part 44 specifies the combination based on the homography transform, and thereby, may exclude the first combination forming the pattern not matching the reference pattern BP shown in FIG. 26. Accordingly, even in the case where exclusion of the first combination has not been unsuccessful at step S440, the detection part 44 excludes the first combination by the repeated processing at steps S450 to S470. Then, the detection part 44 detects the five marker candidates contained in the first combination in the combination corresponding to the specified minimum residual as the marker candidates forming the pattern PN as the pattern matching the reference pattern BP (step S480).

Then, the detection part 44 determines whether or not the residual corresponding to the first combination containing the combination of the marker candidates detected at step S480 is less than a predetermined threshold value (step S490). If determining that the residual is not less than the predetermined threshold value (step S490—NO), the detection part 44 determines that the detection of the pattern PN has been unsuccessful based on the captured image acquired by the image acquisition part 43 at step S420. Then, the imaging control part 41 transitions to step S410, and allows the imaging unit 10 to image the range that can be imaged by the imaging unit 10. On the other hand, if determining that the residual is less than the predetermined threshold value (step S490—YES), the detection part 44 detects (specifies) the five marker candidates detected at step S480 as the markers MK1 to MK5. In other words, in this case, the detection part 44 detects the pattern PN of the marker candidates (step S495).

Then, the detection part 44 detects a position according to the geometrical position relationship among the markers MK1 to MK5 contained in the pattern PN detected at step S495 in the imaging unit coordinate system CC (step S500). Specifically, the detection part 44 calculates the position of the origin of the two-dimensional coordinate system BC associated with the reference pattern BP in the imaging unit coordinate system CC by homography transform (inverse homography transform to the homography transform performed at step S460). Note that, in the example, the pattern PN contains the marker OP. Accordingly, the detection part 44 may detect the position of the marker OP in the imaging unit coordinate system CC as a position according to the geometrical position relationship among the markers MK1 to MK5 contained in the pattern PN detected at step S495. In this case, the detection part 44 detects the marker OP existing inside of the convex hull CH1 having vertices at which the respective markers MK1 to MK5 forming the pattern PN are located. For example, the detection part 44 detects the marker OP by pattern matching. Then, the detection part 44 detects the position of the marker OP in the imaging unit coordinate system CC as a position according to the geometrical position relationship among the markers MK1 to MK5 contained in the pattern PN detected at step S495. Thereby, the detection part 44 may detect the position with high accuracy regardless of the accuracy of the homography transform. Note that the detection part 44 may be adapted to detect the marker OP using another method in place of the pattern matching.

Then, the detection part 44 respectively detects an X-axis and a Y-axis on the pattern PN detected at step S495 in the imaging unit coordinate system CC (step S510). Specifically, the detection part 44 detects directions of the respective coordinate axes in the two-dimensional coordinate system BC associated with the reference pattern BP in the imaging unit coordinate system CC by homography transform (inverse homography transform to the homography transform performed at step S460). Note that, in the example, the pattern PN contains the respective marker XP5, marker XP6, marker YP1, and marker YP2. Accordingly, the detection part 44 may detect the respective X-axis and Y-axis on the pattern PN detected at step S495 in the imaging unit coordinate system CC based on the respective marker XP5, marker XP6, marker YP1, and marker YP2. In this case, the detection part 44 detects the respective marker XP5, marker XP6, marker YP1, and marker YP2 existing outside of the convex hull CH1 having vertices at which the respective markers MK1 to MK5 forming the pattern PN are located. For example, the detection part 44 detects the respective marker XP5, marker XP6, marker YP1, and marker YP2 by pattern matching. Then, the detection part 44 detects a line passing through both the detected marker XP5 and marker XP6 as the X-axis. Further, the detection part 44 detects a line passing through both the detected marker YP1 and marker YP2 as the Y-axis. Thereby, the detection part 44 may detect the X-axis and the Y-axis with high accuracy regardless of the accuracy of the homography transform.

Then, the calibration part 46 correlates the imaging unit coordinate system CC and the robot coordinate system RC based on the pattern PN detected at step S495, the position of the origin detected at step S500, and the X-axis and the Y-axis detected at step S510 (step S520) and ends the processing. Specifically, the calibration part 46 performs a calibration of correlating the robot coordinate system RC and the calibration board coordinate system indicating a position on the calibration board CB (in the example, the two-dimensional coordinate system BC) based on the pattern PN, the position of the origin, and the X-axis and the Y-axis. The calibration part 46 correlates the imaging unit coordinate system CC and the robot coordinate system RC based on the result of the calibration and the result of the correlation between the robot coordinate system RC and the calibration board coordinate system.

As described above, the robot control apparatus 30 detects a predetermined number of marker candidates matching the reference pattern BP including a predetermined number (four or more) of markers respectively located at vertices of a convex hull from marker candidates contained in the captured image captured by the imaging unit 10. Thereby, the robot control apparatus 30 may accurately detect the positions according to the four or more markers.

Processing Performed by Robot Control Apparatus when Allowing Robot to Perform Predetermined Job As below, referring to FIGS. 31 and 32, the processing performed by the robot control apparatus 30 when allowing the robot 20 to perform a predetermined job will be explained.

Figure 31:
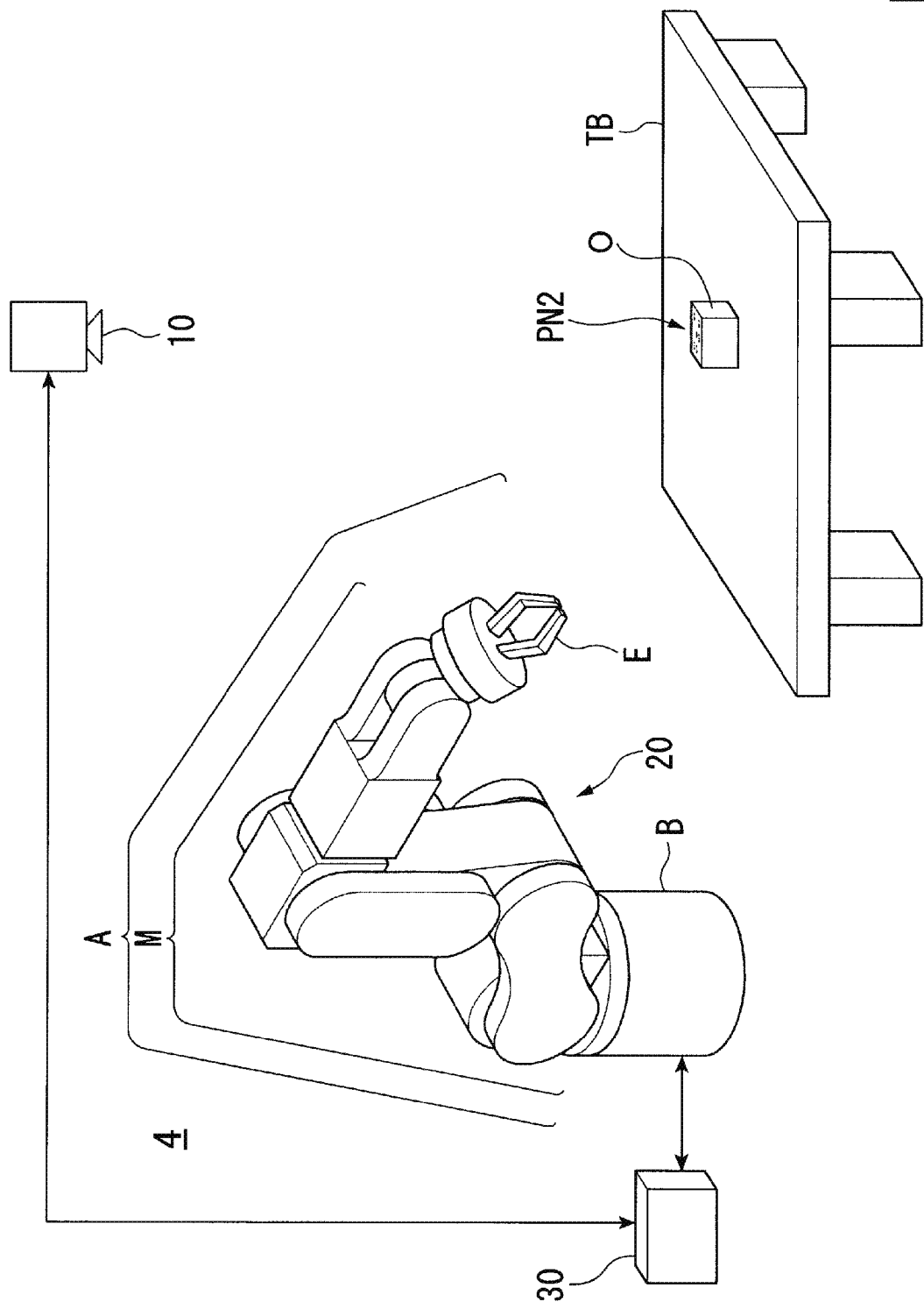
FIG. 31 shows an example of a configuration of a robot system when a robot is allowed to perform a predetermined job.

FIG. 31 shows an example of the configuration of the robot system 4 when the robot 20 is allowed to perform a predetermined job. The configuration shown in FIG. 31 is different from the configuration shown in FIG. 16 in object mounted on the worktable TB. In the configuration shown in FIG. 31, an object O is mounted on the top surface of the worktable TB in place of the calibration board CB. The object O is e.g. an industrial part or member including a plate, screw, or bolt to be assembled in a product. Note that, in place of the industrial part or member, the object O may be another object including a commodity or biological object. In the example shown in FIG. 16, the object O is shown as an object having a cubic shape. Note that the shape of the object O may be another shape in place of the cubic shape.

A pattern PN2 is provided on a surface opposed to a surface in surface contact with the top surface of the worktable TB of the surfaces of the object O. The pattern PN2 is a pattern in which the n black circles BC1 to BCn are omitted from the pattern PN. That is, the pattern PN2 includes the respective markers MK1 to MK5, marker OP, marker XP5, marker XP6, marker YP1, and marker YP2. The pattern PN2 may be the same as the pattern PN.

In the example shown in FIG. 31, the predetermined job that the robot control apparatus 30 allows the robot 20 to perform is a job of grasping the object O and feeding the grasped object O into a feed region (not shown). Here, referring to FIG. 32, the processing of allowing the robot 20 to perform the predetermined job by the robot control apparatus 30 is explained.

Figure 32:
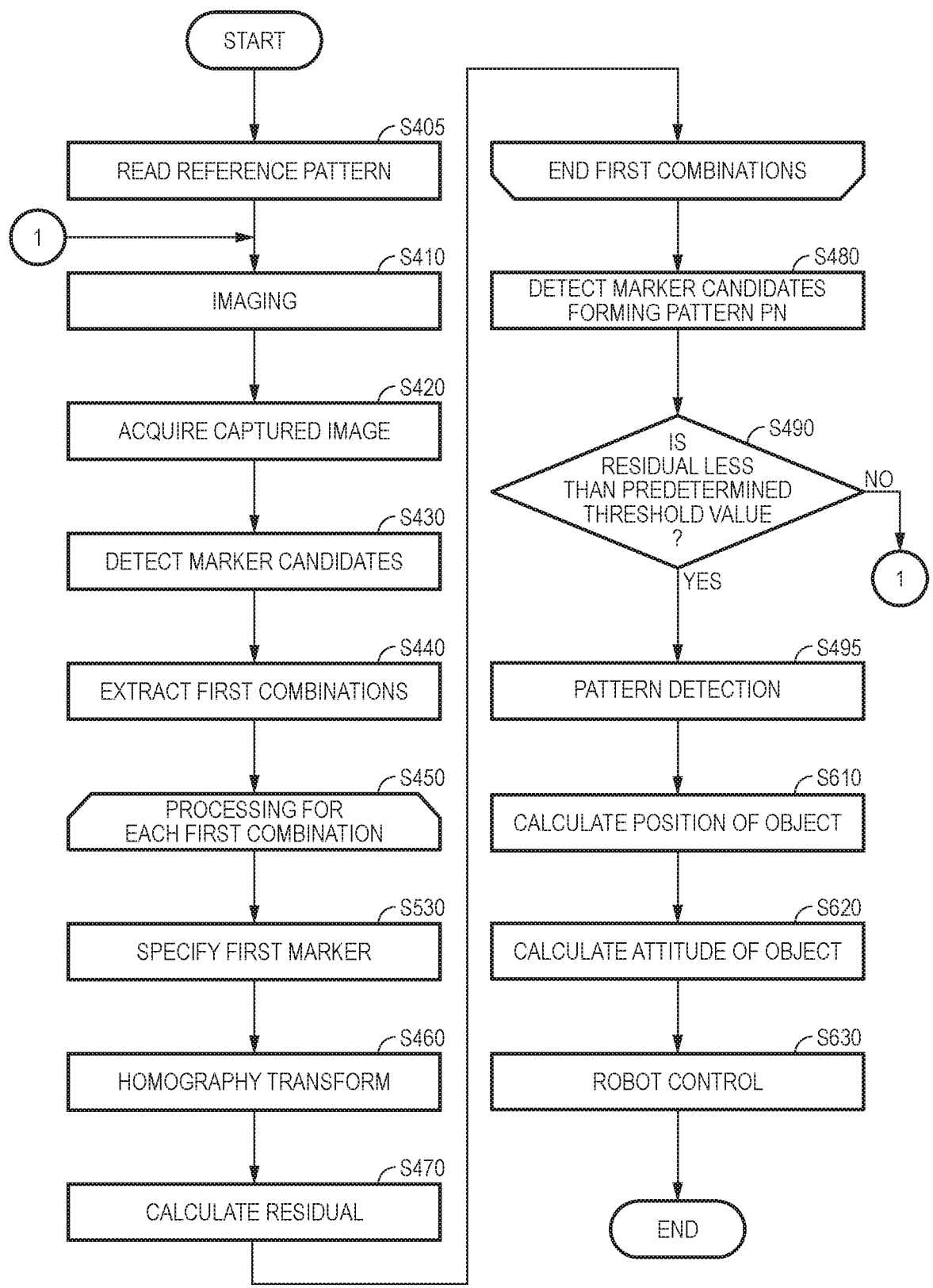
FIG. 32 shows an example of a flow of processing of allowing the robot to perform the predetermined job by the robot control apparatus.

FIG. 32 is a flowchart showing an example of a flow of the processing of allowing the robot 20 to perform the predetermined job by the robot control apparatus 30. Note that the processing at steps S405 to S495 of the flowchart shown in FIG. 32 is the same processing at steps S405 to S495 of the flowchart shown in FIG. 22, and the explanation is omitted.

The position and attitude calculation part 45 detects a position of an origin of a coordinate system indicating a position on the pattern PN2 detected at step S495 in the imaging unit coordinate system CC. Then, the position and attitude calculation part 45 calculates a position of the object O in the robot coordinate system RC based on the detected position (step S610).

Then, the position and attitude calculation part 45 detects respective X-axis and Y-axis on the pattern PN2 detected at step S495 in the imaging unit coordinate system CC. Then, the position and attitude calculation part 45 calculates respective directions of the detected X-axis and Y-axis in the robot coordinate system RC as an attitude of the object O (step S620).

Then, the robot control part 47 allows the robot 20 to perform the predetermined job based on the position of the object O in the robot coordinate system RC calculated at step S610 and the attitude of the object O in the robot coordinate system RC calculated at step S620 (step S630), and ends the processing.

As described above, the robot control apparatus 30 operates the robot 20 based on the captured image obtained by imaging using the imaging unit 10 of the pattern PN of the four or more markers respectively located at the vertices of the convex hull by the processing of the flowchart shown in FIG. 32. Thereby, the robot control apparatus 30 may accurately allow the robot 20 to perform the predetermined job based on the position according to the four or more markers detected from the image captured by the imaging unit.

Modified Example 3 of Embodiment

As below, referring to FIGS. 33 and 34, Modified Example 3 of the embodiment will be explained.

Figure 33:
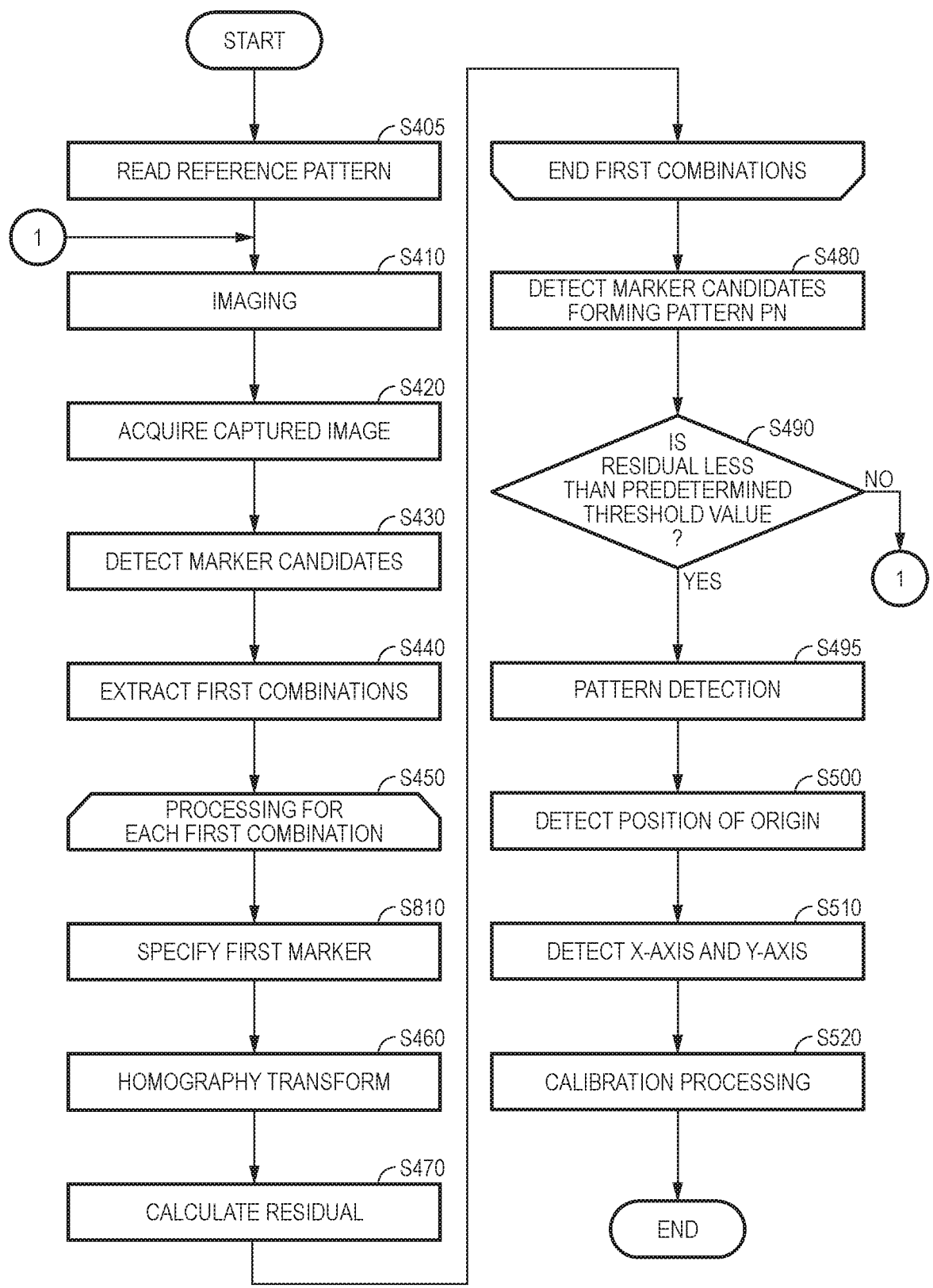
FIG. 33 is a flowchart showing another example of the flow of processing of performing a calibration by the robot control apparatus.

In Modified Example 3 of the embodiment, the robot control apparatus 30 performs processing at step S810 shown in FIG. 33 in place of the processing at step S455 shown in FIG. 22.

FIG. 33 is a flowchart showing another example of the flow of processing of performing the calibration by the robot control apparatus 30. Note that the respective processing at steps S405 to S450 and processing at steps S460 to S520 shown in FIG. 33 are the same as the respective processing at steps S405 to S450 and processing at steps S460 to S520 shown in FIG. 22, and the explanation is omitted.

At step S810, the detection part 44 specifies the first marker among the marker candidates contained in the first combination selected at step S450 (step S810). Here, the processing at step S810 is explained. The detection part 44 extracts a combination of two marker candidates that can be selected from the marker candidates contained in the first combination as a pair of marker candidates. The detection part 44 calculates a distance between the two marker candidates contained in the pair of marker candidates with respect to each extracted pair of marker candidates.

Figures 34, 35:
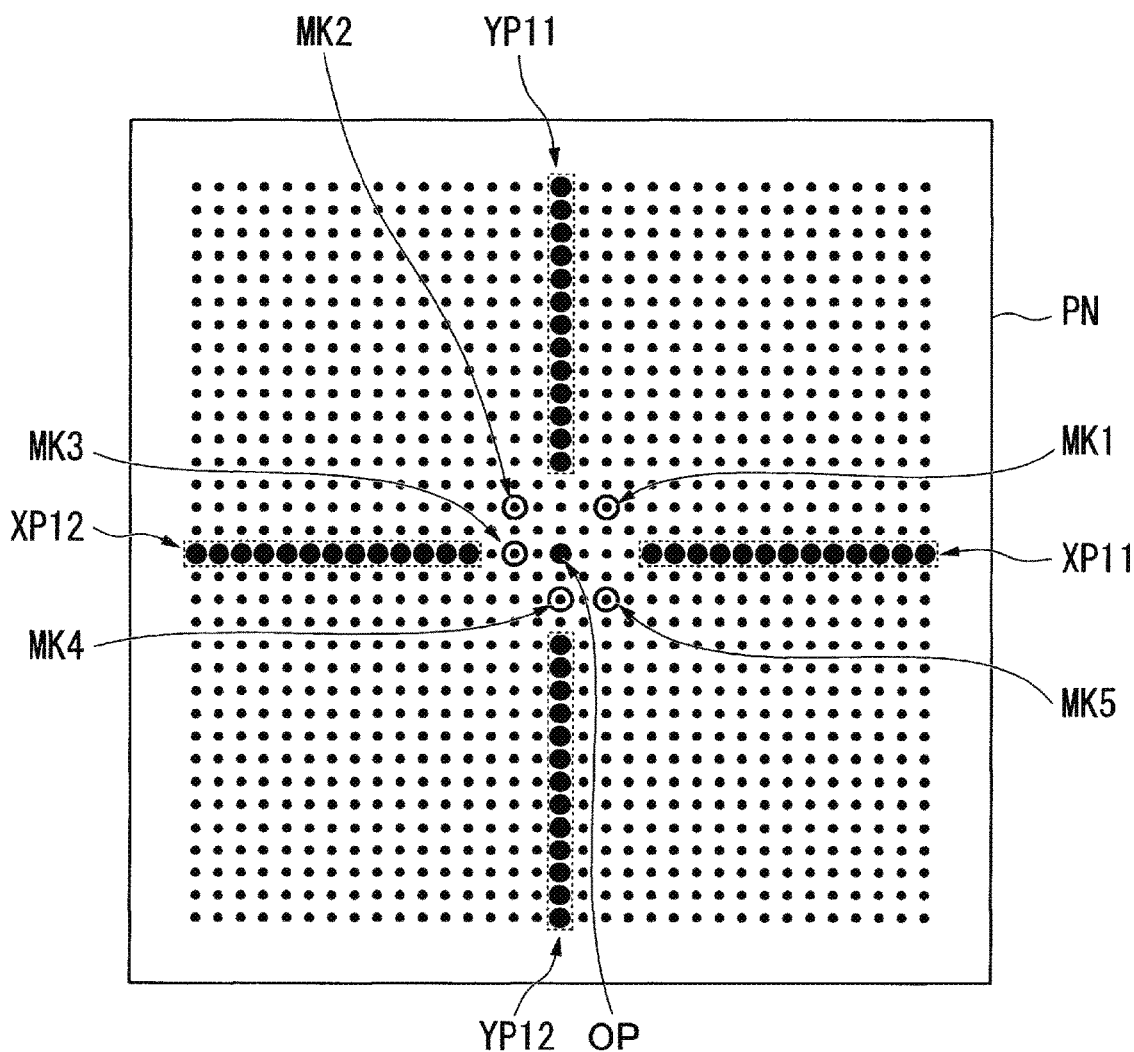
FIG. 34 shows examples of distances between marker candidates contained in respective pairs of marker candidates calculated by the detection part.
FIG. 35 shows an example of a calibration board according to Modified Example 4 of the second embodiment.

FIG. 34 shows examples of the distances between the marker candidates contained in the respective pairs of marker candidates calculated by the detection part 44. The detection part 44 specifies the pair of marker candidates corresponding to the longest distance of the distances calculated with respect to each pair of marker candidates and the pair of marker candidates corresponding to the second longest distance of the distances calculated with respect to each pair of marker candidates. Then, the detection part 44 specifies the marker candidate contained in both the specified two pairs of marker candidates in common as the first marker. In the example shown in FIG. 34, the distance corresponding to the pair of marker candidates containing the marker candidate DP6 and the marker candidate DP1 is the longest and the distance corresponding to the pair of marker candidates containing the marker candidate DP2 and the marker candidate DP6 is the second longest. The marker candidate contained in both the pairs of marker candidates in common is the marker candidate DP6. Therefore, the detection part 44 specifies the marker candidate DP6 as the first marker in the example shown in FIG. 34.

As described above, the robot control apparatus 30 specifies the first marker by the processing at step S810, and it is unnecessary to perform the repeated processing at step S455 and the time taken for the calibration of correlating the imaging unit coordinate system CC and the robot coordinate system RC may be shortened. Further, the robot control apparatus 30 may obtain the same advantages as those of the embodiment.

Modified Example 4 of Embodiment

As below, referring to FIG. 35, Modified Example 4 of the embodiment will be explained.

In Modified Example 4 of the embodiment, on the calibration board CB, two or more markers XP5 are provided side by side as a first reference portion XP11 on a line connecting the markers XP5 and the marker OP. Further, on the calibration board CB, two or more markers XP6 are provided side by side as a first reference portion XP12 on a line connecting the markers XP6 and the marker OP. On the calibration board CB, two or more markers YP1 are provided side by side as a second reference portion YP11 on a line connecting the markers YP1 and the marker OP. Further, on the calibration board CB, two or more markers YP2 are provided side by side as a second reference portion YP12 on a line connecting the markers YP2 and the marker OP.

FIG. 35 shows an example of the calibration board CB according to Modified Example 4 of the embodiment. In the example shown in FIG. 35, in the first reference portion XP11, 13 markers XP5 are provided side by side on a line. Further, in the first reference portion XP12, 13 markers XP6 are provided side by side on a line. In the second reference portion YP11, 13 markers YP11 are provided side by side on a line. Further, in the second reference portion YP12, 13 markers YP12 are provided side by side on a line.

In the case where the calibration board CB according to Modified Example 4 of the embodiment is used, the detection part 44 detects at least one of the direction in which the markers XP5 are arranged in the first reference portion XP11 and the direction in which the markers XP6 are arranged in the first reference portion XP12 as an X-axis direction on the pattern PN. Further, in this case, the detection part 44 detects at least one of the direction in which the markers YP1 are arranged in the second reference portion YP11 and the direction in which the markers YP2 are arranged in the second reference portion YP12 as a Y-axis direction on the pattern PN.

In the case where the calibration board CB contains the first reference portion XP11, first reference portion XP12, second reference portion YP11, and second reference portion YP12, even when only a part of the calibration board CB is contained in the captured image captured by the imaging unit 10, the robot control apparatus 30 may change the direction of the optical axis of the imaging unit 10 so that the entire pattern PN of the calibration board CB may be within the range that can be imaged by the imaging unit 10 based on the part. Note that, in this case, it is necessary that a mechanism part that changes the direction of the optical axis of the imaging unit 10 is provided in the imaging unit 10 or a moving part (e.g. the arm A of the robot 20) that can move the imaging unit 10 is provided in the imaging unit 10. As below, as an example, the case where the mechanism part that changes the direction of the optical axis of the imaging unit 10 is provided in the imaging unit 10 will be explained.

For example, in the case where the range containing all of the markers MK1 to MK5 of the calibration board CB is not contained in the captured image captured by the imaging unit 10 and only the range containing the first reference portion XP11 of the calibration board CB is contained in the captured image, the robot control apparatus 30 detects the first reference portion XP11 from the captured image. Then, the robot control apparatus 30 moves the direction of the optical axis of the imaging unit 10 along the direction in which the markers XP5 contained in the detected first reference portion XP11 are arranged. In this regard, the robot control apparatus 30 allows the imaging unit 10 to image the range that the imaging unit 10 can image at each time when the amount of movement of the optical axis becomes a predetermined amount of movement. The robot control apparatus 30 repeats the movement of the optical axis until the captured image captured by the imaging unit 10 contains the range containing all of the markers MK1 to MK5 of the calibration board CB. Thereby, even when only a part of the calibration board CB is contained in the captured image captured by the imaging unit 10, the robot control apparatus 30 may change the direction of the optical axis of the imaging unit 10 so that the entire pattern PN of the calibration board CB may be within the range that can be imaged by the imaging unit 10 based on the part.

As described above, the calibration board CB contains the respective first reference portion XP11, first reference portion XP12, second reference portion YP11, and second reference portion YP12, and thereby, the robot control apparatus 30 may suppress false detection of the X-axis and the Y-axis on the pattern PN. Further, even in the case where the calibration board CB according to Modified Example 4 of the embodiment is used, the robot control apparatus 30 may obtain the same advantages as those of the embodiment.

Note that, in the embodiment explained as above, the size of the first marker may be larger than those of the other markers. Further, the shape of the first marker may be different from those of the other markers. Furthermore, the color of the first marker may be different from those of the other markers. Thereby, the robot control apparatus 30 may easily detect the first marker.

As described above, in the calibration board CB, the respective four or more markers (in the example, the markers MK1 to MK5) are located at the vertices of the convex hull (in the example, the convex hull CH1) without rotational symmetry. Thereby, the calibration board CB may enable accurate detection of the positions according to the four or more markers.

In the calibration board CB, the respective four or more markers are figure center markers. Thereby, the calibration board CB may enable accurate detection of the positions according to the four or more figure center markers.

Further, in the calibration board CB, each of the figure center markers has a figure in which three or more figure centers overlap. Thereby, the calibration board CB may enable detection of the four or more figure center markers having figures in which three of more figure centers overlap from the image without errors.

In the calibration board CB, the length of the side containing the first marker (in the example, the marker MK1) in the convex hull is longer than the lengths of the other sides in the convex hull. Thereby, the calibration board CB may enable efficient detection of the positions according to the four or more markers with reference to the first marker.

The calibration board CB includes the origin (in the example, the marker OP) inside the convex hull. Thereby, the calibration board CB may indicate the positions according to the four or more markers using the origin more accurately.

Further, in the calibration board CB, the line passing through the origin and the first reference portion (in the example, the markers XP5, markers XP6, first reference portion XP11, and first reference portion XP12) and the line passing through the origin and the second reference portion (in the example, the markers YP1, markers YP2, second reference portion YP11, and second reference portion YP12) are orthogonal. Thereby, the calibration board CB may indicate the attitude of the calibration board using the first reference portion and the second reference portion more accurately.

In the calibration board CB, the number of markers is five. Thereby, the calibration board CB may enable accurate detection of the positions according to the five markers.

The robot 20 acts based on the image (in the example, the captured image) obtained by imaging of the pattern (in the example, the pattern PN) of four or more markers respectively located at the vertices of the convex hull by the imaging unit (in the example, the imaging unit 10). Thereby, the robot 20 may accurately perform the predetermined job based on the positions according to the four or more markers detected from the image captured by the imaging unit.

Further, the robot 20 performs the calibration between the coordinate system of the robot (in the example, the robot coordinate system RC) and the coordinate system of the imaging unit (in the example, the imaging unit coordinate system CC) based on the image obtained by imaging of the pattern including four or more markers respectively located at the vertices of the convex hull by the imaging unit. Thereby, the robot 20 may accurately calculate the positions in the coordinate system of the robot according to the positions in the coordinate system of the imaging unit.

The robot 20 acts based on the image obtained by imaging of the pattern including four or more figure center markers respectively located at the vertices of the convex hull by the imaging unit. Thereby, the robot 20 may accurately perform the predetermined job based on the positions according to the four or more figure center markers detected from the image captured by the imaging unit.

Further, the robot 20 acts based on the image obtained by imaging of the pattern of the figure center markers having figures in which three or more figure centers overlap. Thereby, the robot 20 may accurately perform the predetermined job based on the positions according to the four or more figure center markers having figures in which three or more figure centers overlap detected from the image captured by the imaging unit.

The robot 20 acts based on the image obtained by imaging of the pattern of four or more markers in which the length of the side containing the first marker in the convex hull is longer than the lengths of the other sides in the convex hull. Thereby, the robot 20 may efficiently detect the positions according to the four or more markers from the image captured by the imaging unit with reference to the first marker and accurately perform the predetermined job based on the detected positions.

Further, the robot 20 acts based on the image obtained by imaging of the pattern including four or more markers respectively located at the vertices of the convex hull with the origin inside of the convex hull. Thereby, the robot 20 may accurately perform the predetermined job based on the positions indicated by the origin inside of the convex hull detected from the image captured by the imaging unit.

The robot 20 acts based on the image obtained by imaging of the pattern of four or more markers respectively located at the vertices of the convex hull having the first reference portion and the second reference portion outside. Thereby, the robot may accurately detect the attitude of the calibration board and perform the predetermined job based on the detected attitude.

The robot 20 acts based on the image obtained by imaging of the pattern of five markers respectively located at the vertices of the convex hull by the imaging unit. Thereby, the robot 20 may accurately perform the predetermined job based on the positions according to the five markers detected from the image captured by the imaging unit.

The detection method detects the predetermined number of candidates matching the reference pattern of the predetermined number (four or more) of markers respectively located at the vertices of the respective convex hull without rotational symmetry from the marker candidates contained in the captured image captured by the imaging unit. Thereby, the detection method may enable accurate detection of the positions according to the four or more markers.

Further, the detection method detects the predetermined number of candidates based on matching between the result of the homography transform of the first pattern of the predetermined candidates selected from the marker candidates contained in the captured image captured by the imaging unit and the reference pattern. Thereby, the detection method may enable correct detection of the pattern of the four or more markers even when the marker candidates contained in the image include a wrong marker.

In the detection method, matching with the reference pattern is shown by the difference between the result of the homography transform of the first pattern and the reference pattern. Thereby, the detection method may enable correct detection of the pattern of the four or more markers based on the matching shown by the difference between the result of the homography transform of the first pattern and the reference pattern even when the marker candidates contained in the image include a wrong marker.

Third Embodiment

As below, an embodiment of the invention will be explained with reference to the drawings. The same component elements as those of the first or second embodiment will have the same signs and their explanation will be omitted or simplified.

Robot System

Figure 36:
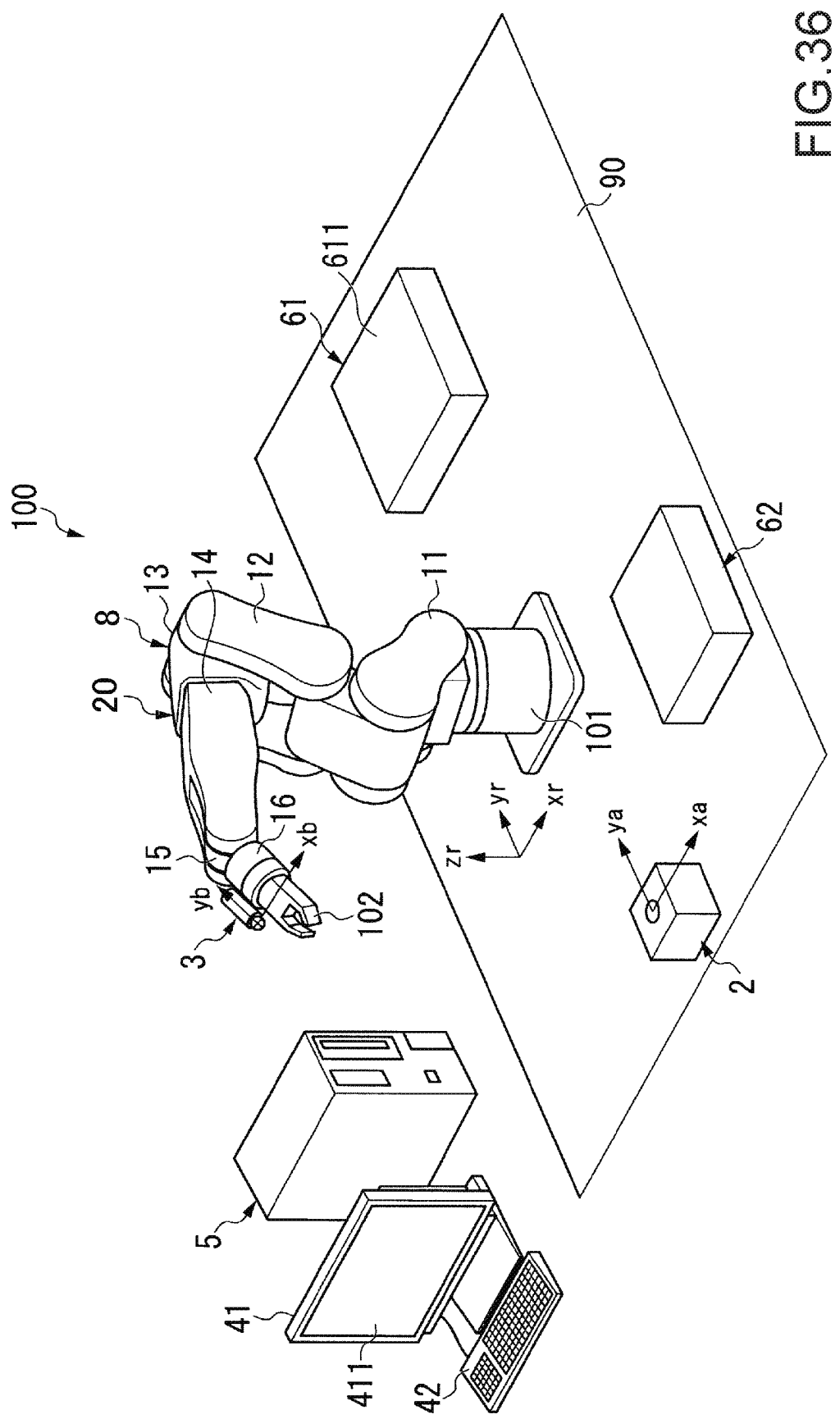
FIG. 36 is a schematic perspective view showing a robot system according to the third embodiment.
Figure 37:
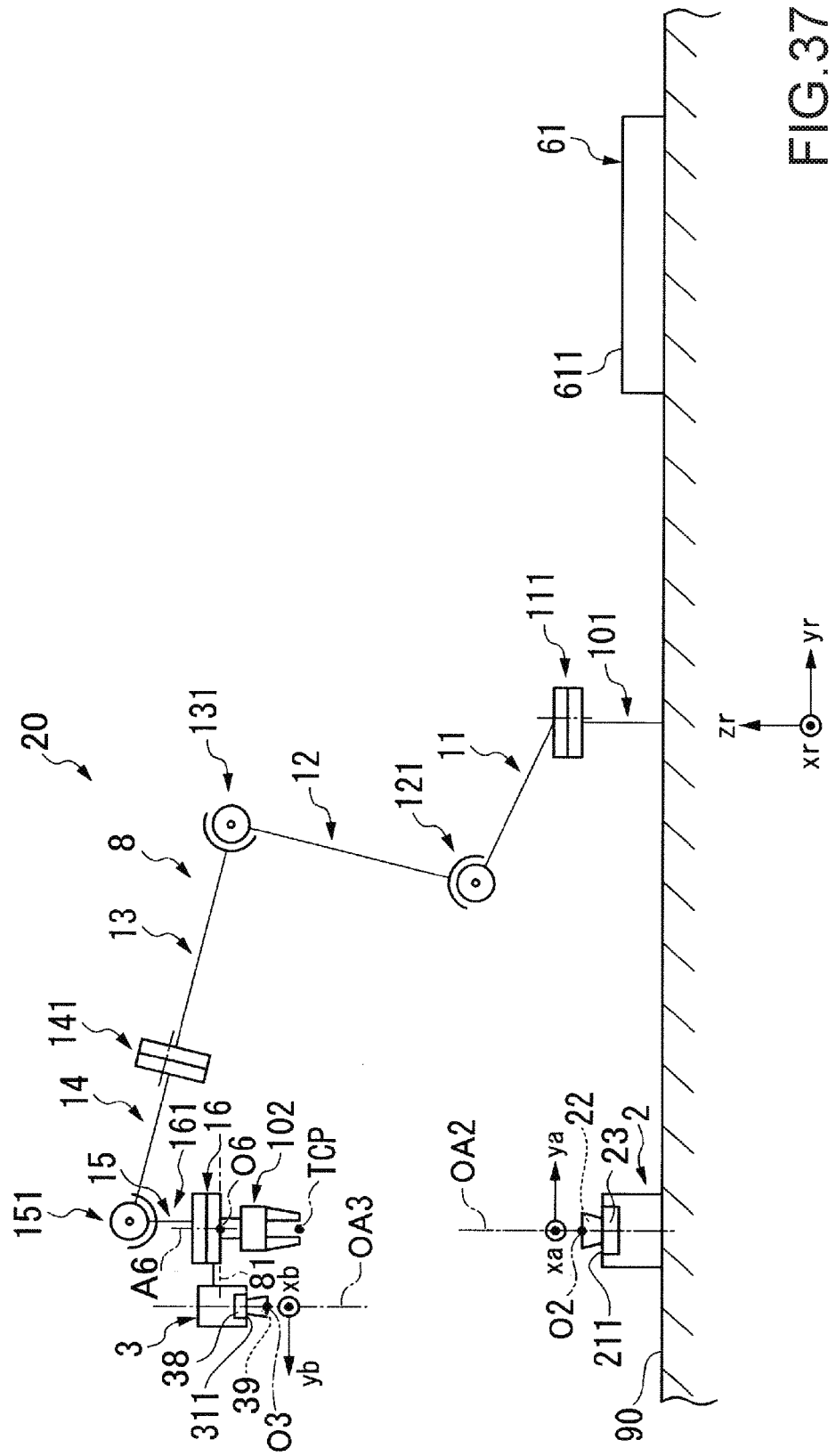
FIG. 37 is a schematic view of a robot shown in FIG. 36.
Figure 38:
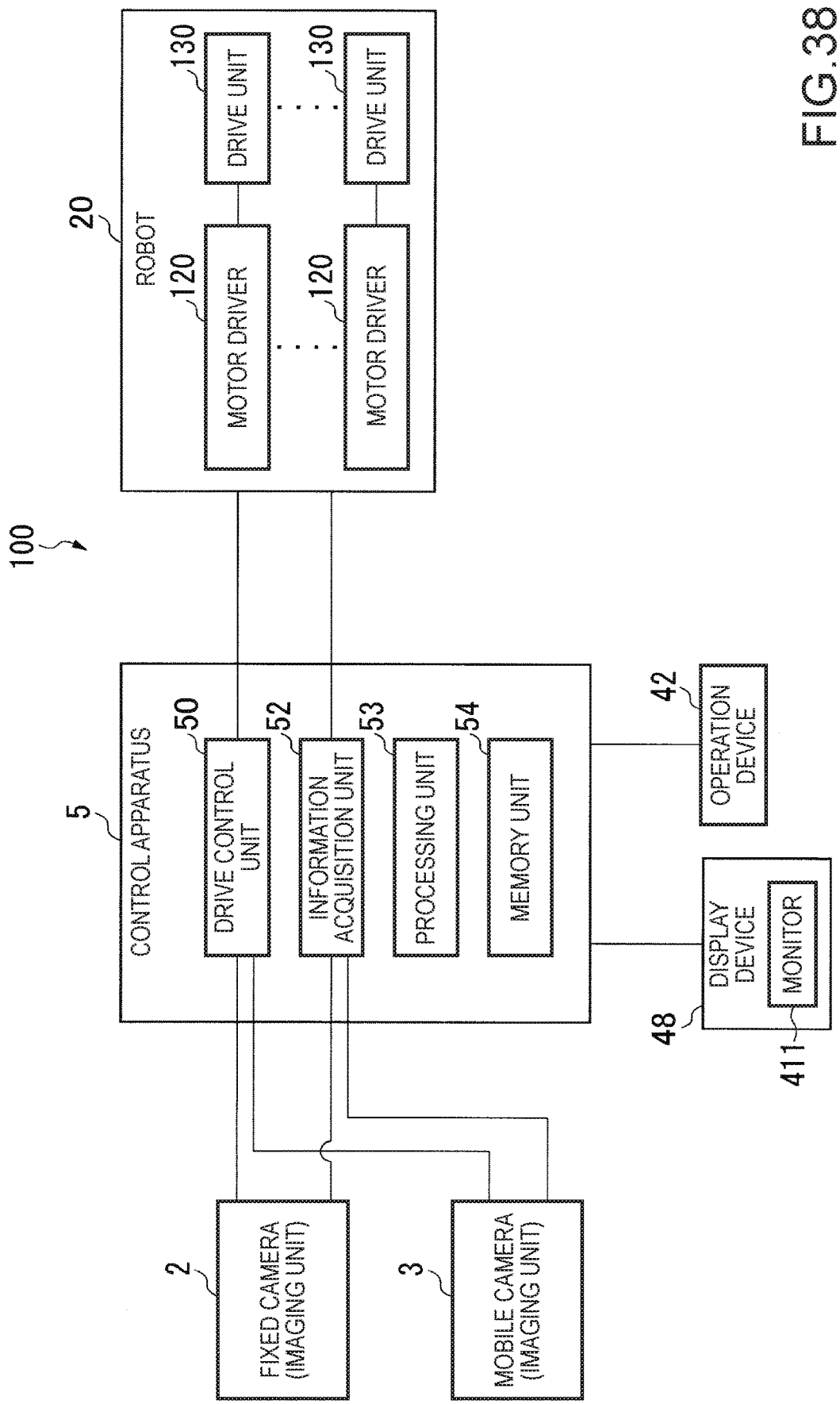
FIG. 38 is a block diagram of a robot system shown in FIG. 36.

FIG. 36 is a schematic perspective view showing a robot system 100 according to the embodiment of the invention. FIG. 37 is a schematic view of a robot 20 shown in FIG. 36. FIG. 38 is a block diagram of the robot system 100 shown in FIG. 36.

Hereinafter, for convenience of explanation, the upside in FIG. 37 (zr direction) is referred to as "upper" or "above" and the downside (−zr direction) is referred to as "lower" or "below". Further, upward and downward directions in FIG. 37 are referred to as "vertical directions", a plane crossing the vertical directions is referred to as "horizontal plane", and directions parallel to the horizontal plane are referred to as "horizontal directions". Here, "horizontal" in this specification includes not only the case of being completely horizontal but also cases of being tilted in a range equal to or less than 5° with respect to the horizontal directions. Further, "vertical" in this specification includes not only the case of being completely vertical but also cases of being tilted in a range equal to or less than 5° with respect to the vertical directions. The base side shown in FIG. 37 is referred to as "proximal end" and the opposite side (hand side) is referred to as "distal end".

The robot system 100 shown in FIG. 36 is an apparatus used for jobs of grasping, carrying, assembly, etc. of objects such as electronic parts and electronic apparatuses.

As shown in FIG. 36, the robot system 100 has the robot 20 having a robot arm 8, a fixed camera 2 (imaging unit) fixed within a work area 90 and having an imaging function, a mobile camera 3 (imaging unit) attached to the robot 20 and having an imaging function, and a control apparatus 5 (calibration apparatus) that respectively controls the robot 20, the fixed camera 2, and the mobile camera 3.

Further, in the embodiment, a work board 61 (assembly board) for assembly of objects and a feed board 62 to which objects are fed by e.g. an operator are provided within the work area 90. The work board 61 and the feed board 62 are respectively provided within a drive range of the robot arm 8 of the robot 20.

As below, the respective parts of the robot system 100 will be sequentially explained.

Robot

The robot 20 shown in FIGS. 36 and 37 may perform jobs of grasping, carrying, assembly, etc. of objects.

The robot 20 is a six-axis vertical articulated robot, and has a base 101, the robot arm 8 connected to the base 101, and a hand 102 (tool) provided in the distal end part of the robot arm 8. Further, as shown in FIG. 38, the robot 20 includes a plurality of drive units 130 and a plurality of motor drivers 120 that generate power for driving the robot arm 8.

The base 101 is a part in which the robot 20 is attached to a predetermined location within the work area 90.

The robot arm 8 has a first arm 11 (arm), a second arm 12 (arm), a third arm 13 (arm), a fourth arm 14 (arm), a fifth arm 15 (arm), and a sixth arm 16 (arm). The first arm 11 is connected to the base 101, and the first arm 11, the second arm 12, the third arm 13, the fourth arm 14, the fifth arm 15, and the sixth arm 16 are coupled in this order from the proximal end side toward the distal end side.

As shown in FIG. 37, the first arm 11 has a rotation shaft member 111 coupled to the base 101 and is rotatable about a center axis of the rotation shaft member 111 as a rotation center with respect to the base 101. The second arm 12 has a rotation shaft member 121 coupled to the first arm 11 and is rotatable about a center axis of the rotation shaft member 121 as a rotation center with respect to the first arm 11. The third arm 13 has a rotation shaft member 131 coupled to the second arm 12 and is rotatable about a center axis of the rotation shaft member 131 as a rotation center with respect to the second arm 12. The fourth arm 14 has a rotation shaft member 141 coupled to the third arm 13 and is rotatable about a center axis of the rotation shaft member 141 as a rotation center with respect to the third arm 13. The fifth arm 15 has a rotation shaft member 151 coupled to the fourth arm 14 and is rotatable about a center axis of the rotation shaft member 151 as a rotation center with respect to the fourth arm 14. The sixth arm 16 has a rotation shaft member 161 coupled to the fifth arm 16 and is rotatable about a center axis A6 of the rotation shaft member 161 as a rotation center with respect to the fifth arm 15. Here, a point at which the center axis A6 and the distal end surface of the sixth arm 16 (the center of the distal end surface of the sixth arm 16) intersect is called an axis coordinate O6 (predetermined part).

The hand 102 is attached to the distal end surface of the sixth arm 16, and the center axis of the hand 102 coincides with the center axis A6 of the rotation shaft member 161. Here, the center of the distal end surface of the hand 102 is called TCP. In the embodiment, the center refers to a center of a region between two fingers of the hand 102.

The plurality of drive units 130 each having a motor such as a servo motor and a reducer are provided in the first arm 11 to sixth arm 16. In other words, as shown in FIG. 38, the robot 20 has the drive units 130 in the number (six in the embodiment) corresponding to the first arm 11 to sixth arm 16. Further, the first arm 11 to sixth arm 16 are controlled by the control apparatus 5 via the plurality of (six in the embodiment) motor drivers 120 electrically connected to the corresponding drive units 130.

In each drive unit 130, e.g. an angle sensor such as an encoder or rotary encoder (not shown) is provided. Thereby, rotation angles of rotation shafts of the motors or reducers of the respective drive units 130 may be detected.

As shown in FIGS. 36 and 37, in the embodiment, as a robot coordinate system used when the robot 20 is controlled (coordinate system of the robot 20), a three-dimensional orthogonal coordinate system determined by an xr-axis and a yr-axis respectively parallel to the horizontal directions and a zr-axis in an upward vertical positive direction orthogonal to the horizontal directions is set. A translation component with respect to the xr-axis is referred to as "component xr", a translation component with respect to the yr-axis is referred to as "component yr", a translation component with respect to the zr-axis is referred to as "component zr", a rotation component about the zr-axis is referred to as "component ur", a rotation component about the yr-axis is referred to as "component vr", a rotation component about the xr-axis is referred to as "component wr". The unit of the lengths (magnitudes) of the component xr, component yr, and component zr is "mm" and the unit of the angles (magnitudes) of the component ur, component vr, and component wr is "°".

Fixed Camera

The fixed camera 2 shown in FIGS. 36 and 37 has a function of imaging an object etc.

As shown in FIG. 37, the fixed camera 2 has e.g. an imaging device 23 including a CCD image sensor with a plurality of pixels and a lens 22 (optical system). The fixed camera 2 forms an image of light from an object or the like on a light receiving surface 211 (sensor surface) of the imaging device 23 using the lens 22, converts the light into an electric signal, and outputs the electric signal to the control apparatus 5. Here, the light receiving surface 211 is a surface of the imaging device 23 on which the image of the light is formed. Further, in the embodiment, a position at a focal length from the light receiving surface 211 in an optical axis OA2 direction is referred to as "imaging reference point O2 of fixed camera 2".

The fixed camera 2 is fixed to a predetermined location within the work area 90 to image the upside in the vertical direction. Further, in the embodiment, the fixed camera 2 is attached so that the optical axis OA2 (the optical axis of the lens 22) may be nearly in parallel to the vertical direction.

In the embodiment, as an image coordinate system of the fixed camera 2 (a coordinate system of an image output from the fixed camera 2), a two-dimensional orthogonal coordinate system determined by an xa-axis and a ya-axis respectively parallel to the in-plane direction of the image is set. Further, a translation component with respect to the xa-axis is referred to as "component xa", a translation component with respect to the ya-axis is referred to as "component ya", and a rotation component about the normal of the xa-ya plane is referred to as "component ua". The unit of the lengths (magnitudes) of the component xa and component ya is "pixel" and the unit of the angle (magnitude) of the component ua is "°".

Note that the image coordinate system of the fixed camera 2 is a two-dimensional orthogonal coordinate system obtained by non-linear transform of three-dimensional orthogonal coordinates reflected in the field of view of the fixed camera 2 in consideration of the optical characteristics (focal length, distortion, etc.) of the lens 22 and the number of pixels and the size of the imaging device 23.

Mobile Camera

The mobile camera 3 shown in FIGS. 36 and 37 has a function of imaging an object etc.

As shown in FIG. 37, the mobile camera 3 has e.g. an imaging device 38 including a CCD image sensor with a plurality of pixels and a lens 39 (optical system). The mobile camera 3 forms an image of light from an object or the like on a light receiving surface 311 (sensor surface) of the imaging device 38 using the lens 39, converts the light into an electric signal, and outputs the electric signal to the control apparatus 5. Here, the light receiving surface 311 is a surface of the imaging device 38 on which the image of the light is formed. Further, in the embodiment, a position at a focal length from the light receiving surface 311 in an optical axis OA3 direction is referred to as "imaging reference point O3 of mobile camera 3".

The mobile camera 3 is attached to the sixth arm 16 to image the distal end side of the robot arm 8 with respect to the sixth arm 16. Further, in the embodiment, the mobile camera 3 is attached to the sixth arm 16 so that the optical axis OA3 (the optical axis of the lens 39) may be nearly parallel to the center axis A6 of the sixth arm 16 in design. The mobile camera 3 is attached to the sixth arm 16, and may change the attitude thereof with the sixth arm 16 by driving of the robot arm 8.

In the embodiment, as an image coordinate system of the mobile camera 3 (a coordinate system of an image output from the mobile camera 3), a two-dimensional orthogonal coordinate system determined by an xb-axis and a yb-axis respectively parallel to the in-plane direction of the image is set. Further, a translation component with respect to the xb-axis is referred to as "component xb", a translation component with respect to the yb-axis is referred to as "component yb", and a rotation component about the normal of the xb-yb plane is referred to as "component ub". The unit of the lengths (magnitudes) of the component xa and component ya is "pixel" and the unit of the angle (magnitude) of the component ua is "°".

Note that the image coordinate system of the mobile camera 3 is a two-dimensional orthogonal coordinate system obtained by non-linear transform of three-dimensional orthogonal coordinates reflected in the field of view of the mobile camera 3 in consideration of the optical characteristics (focal length, distortion, etc.) of the lens 39 and the number of pixels and the size of the imaging device 38.

Control Apparatus

The control apparatus 5 shown in FIG. 36 controls the respective parts of the robot 20, the fixed camera 2, and the mobile camera 3. The control apparatus 5 may include e.g. a personal computer (PC) having a CPU, ROM, and RAM therein or the like.

As shown in FIG. 38, the control apparatus 5 includes a drive control unit 50, an information acquisition unit 52, a processing unit 53, and a memory unit 54.

The drive control unit 50 controls driving of the respective drive units 130 for driving the first arm 11 to sixth arm 16 of the robot 20, and may respectively and independently drive and stop the first arm 11 to sixth arm 16. For example, the drive control unit 50 derives target values of the motors of the respective drive units 130 provided in the first arm 11 to sixth arm 16 for moving the hand 102 to a target position. Further, the drive control unit 50 feedback-controls the robot 20 based on rotation angles (detection results) output from the angle sensors of the respective drive units 130. Furthermore, the drive control unit 50 controls imaging of the fixed camera 2 and the mobile camera 3 etc.

The information acquisition unit 52 acquires the detection results respectively output from the robot 20, the fixed camera 2, and the mobile camera 3. The detection results include e.g. the rotation angles of the rotation shafts of the motors or reducers of the respective drive units 130 of the robot 20, the images respectively captured by the fixed camera 2 and the mobile camera 3, and the coordinates of the axis coordinate O6 in the robot coordinate system (components xr, yr, zr, ur, vr, wr: position and attitude), etc.

The processing unit 53 performs processing including various calculations and various determinations based on the detection results acquired by the information acquisition unit 52. For example, the processing unit 53 calculates the coordinates (components xa, ya, ua: position and attitude) of the object to be imaged in the image coordinate system of the fixed camera 2 based on the image captured by the fixed camera 2 and calculates the coordinates (components xb, yb, ub: position and attitude) of the object to be imaged in the image coordinate system of the mobile camera 3 based on the image captured by the mobile camera 3. Further, for example, the processing unit 53 obtains correction parameters for transform of the coordinates of the object in the image coordinate system of the fixed camera 2 into coordinates in the robot coordinate system, and obtains correction parameters for transform of the coordinates of the object in the image coordinate system of the mobile camera 3 into coordinates in the robot coordinate system.

The memory unit 54 stores programs, data, etc. for the control apparatus 5 to perform various kinds of processing. Further, the memory unit 54 stores various detection results etc.

As shown in FIGS. 36 and 38, a display device 48 and an operation device 42 are connected to the control apparatus 5.

The display device 48 has a monitor 411 including a display panel such as a liquid crystal display panel. The operator may confirm the images captured by the fixed camera 2 and the mobile camera 3, the jobs by the robot 20, etc. via the monitor 411.

The operation device 42 is an input device including a keyboard, and outputs an operation signal according to operation by the operator to the control apparatus 5. Therefore, the operator may give instructions of various kinds of processing etc. to the control apparatus 5 by operating the operation device 42.

As above, the basic configuration of the robot system 100 will be briefly explained.

In the robot system 100 having the above described configuration, for example, the following jobs will be performed.

First, the robot arm 8 is driven to grasp an object with the hand 102 under the control of the control apparatus 5. Then, the robot arm 8 is driven to move the hand 102 onto the fixed camera 2. Then, the fixed camera 2 images the object and the control apparatus 5 determines whether or not the object is properly grasped by the hand 102 based on the image captured by the fixed camera 2. If the object is properly grasped, the robot arm 8 is driven to move the hand 102 onto the work board 61. Then, the object grasped by the hand 102 is assembled in an object placed on the work board 61 in advance based on the image captured by the mobile camera 3.

In the above described job, the robot 20 performs the job on the object based on the images of the objects respectively captured by the fixed camera 2 and the mobile camera 3.

In the job, in order that the robot 20 properly performs the job on the object based on the image captured by the fixed camera 2, processing of obtaining correction parameters for transform of coordinates on the image of the fixed camera 2 (position and attitude in the image coordinate system) into coordinates in the robot coordinate system, i.e., a calibration of the fixed camera 2 is necessary. Further, similarly, in order that the robot 20 properly performs the job on the object or the like based on the image captured by the mobile camera 3, processing of obtaining correction parameters for transform of coordinates on the image of the mobile camera 3 (position and attitude in the image coordinate system) into coordinates in the robot coordinate system, i.e., a calibration of the mobile camera 3 is necessary.

As below, a calibration method of the fixed camera 2 and a calibration method of the mobile camera 3 using the robot system 100 (hereinafter, these are collectively referred to as "calibration method of imaging units") will be explained.

Calibration Method of Imaging Units

Figure 39:
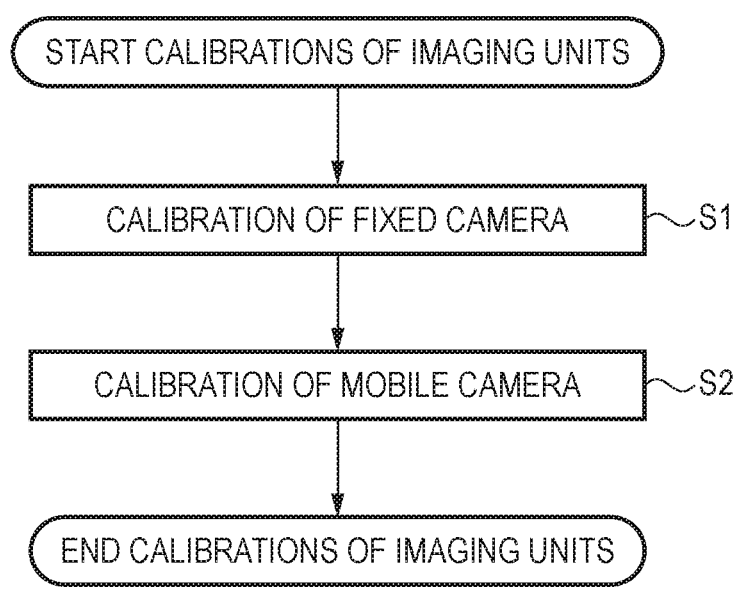
FIG. 39 is a flowchart showing a calibration method of imaging units using the robot system shown in FIG. 36.
Figure 40:
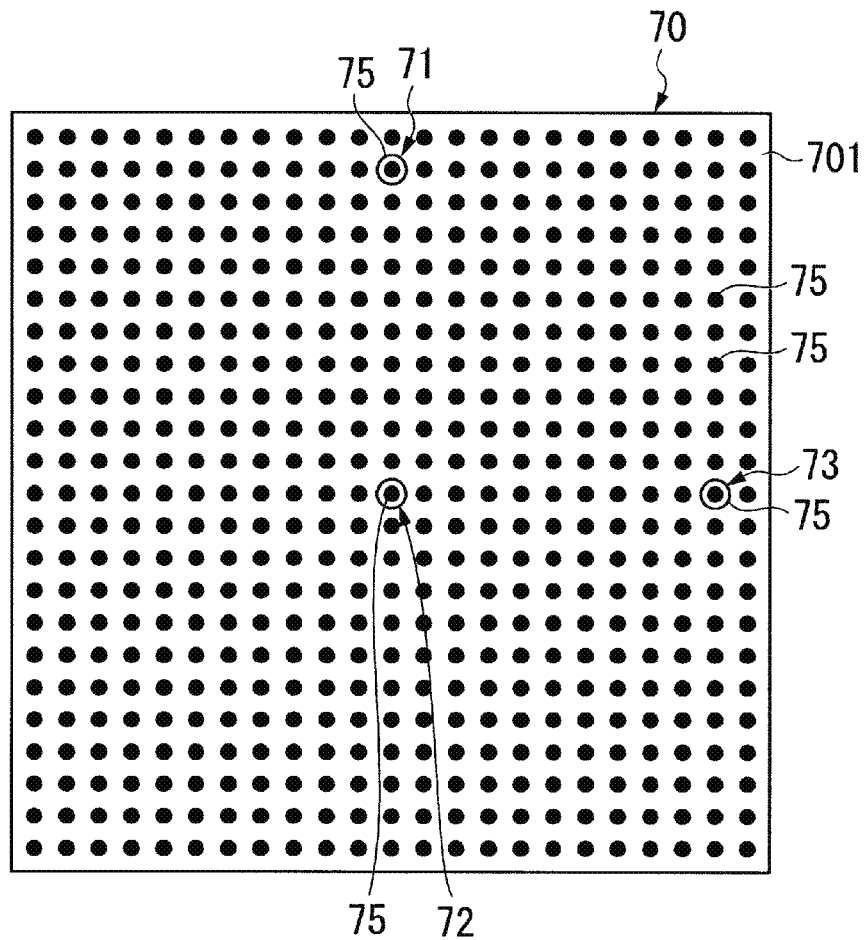
FIG. 40 is a plan view of a member for calibration used in calibrations of the imaging units shown in FIG. 39.
Figure 41:
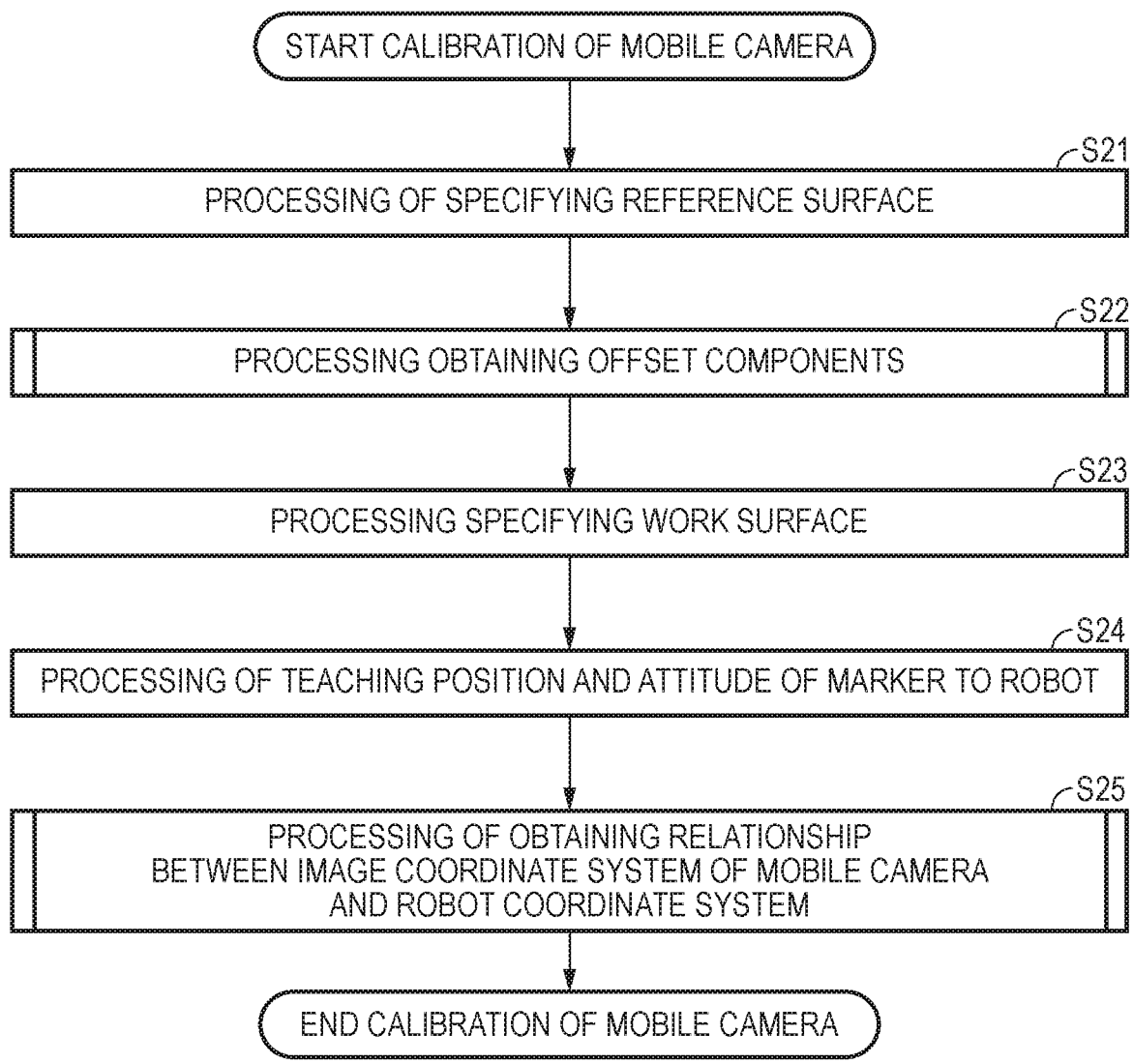
FIG. 41 is a flowchart for explanation of a calibration of a mobile camera shown in FIG. 39.
Figure 42:
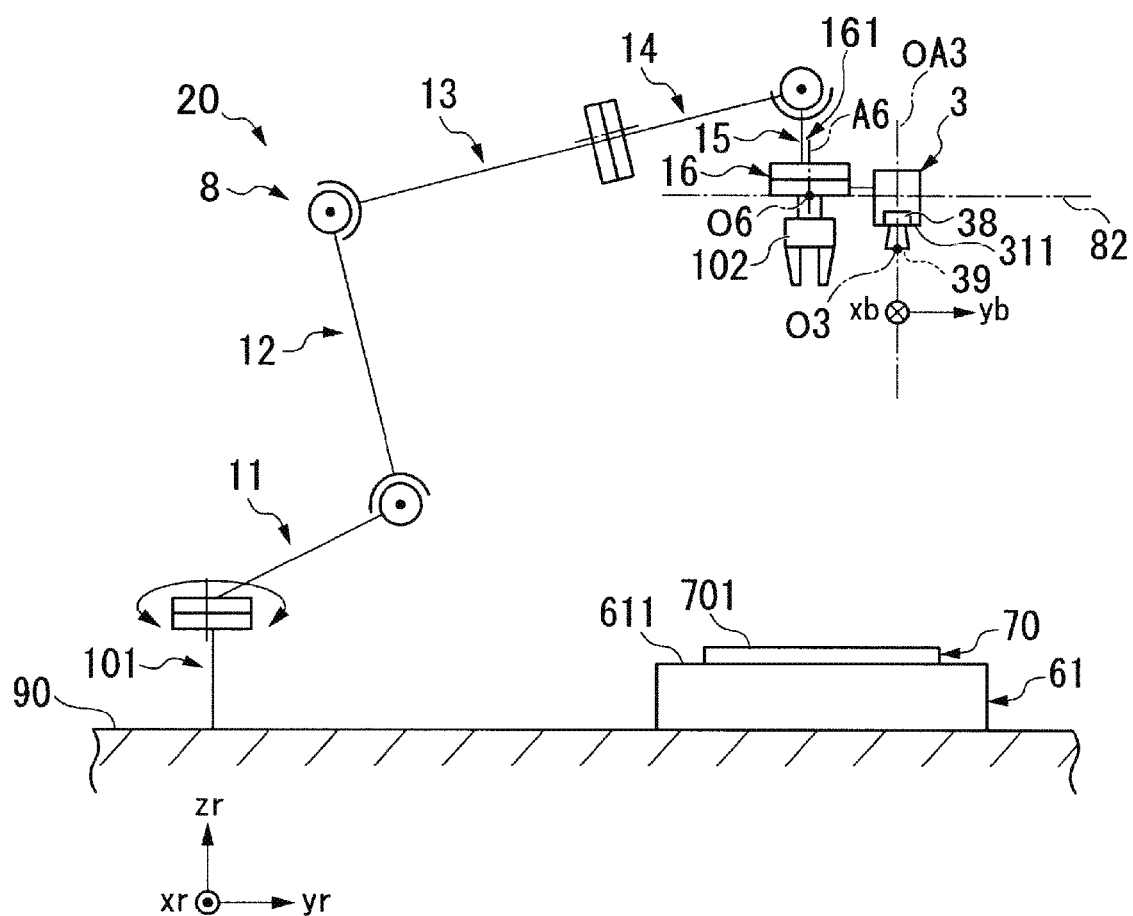
FIG. 42 is a schematic view of a robot for explanation of the calibration of the mobile camera shown in FIG. 41.
Figure 43:
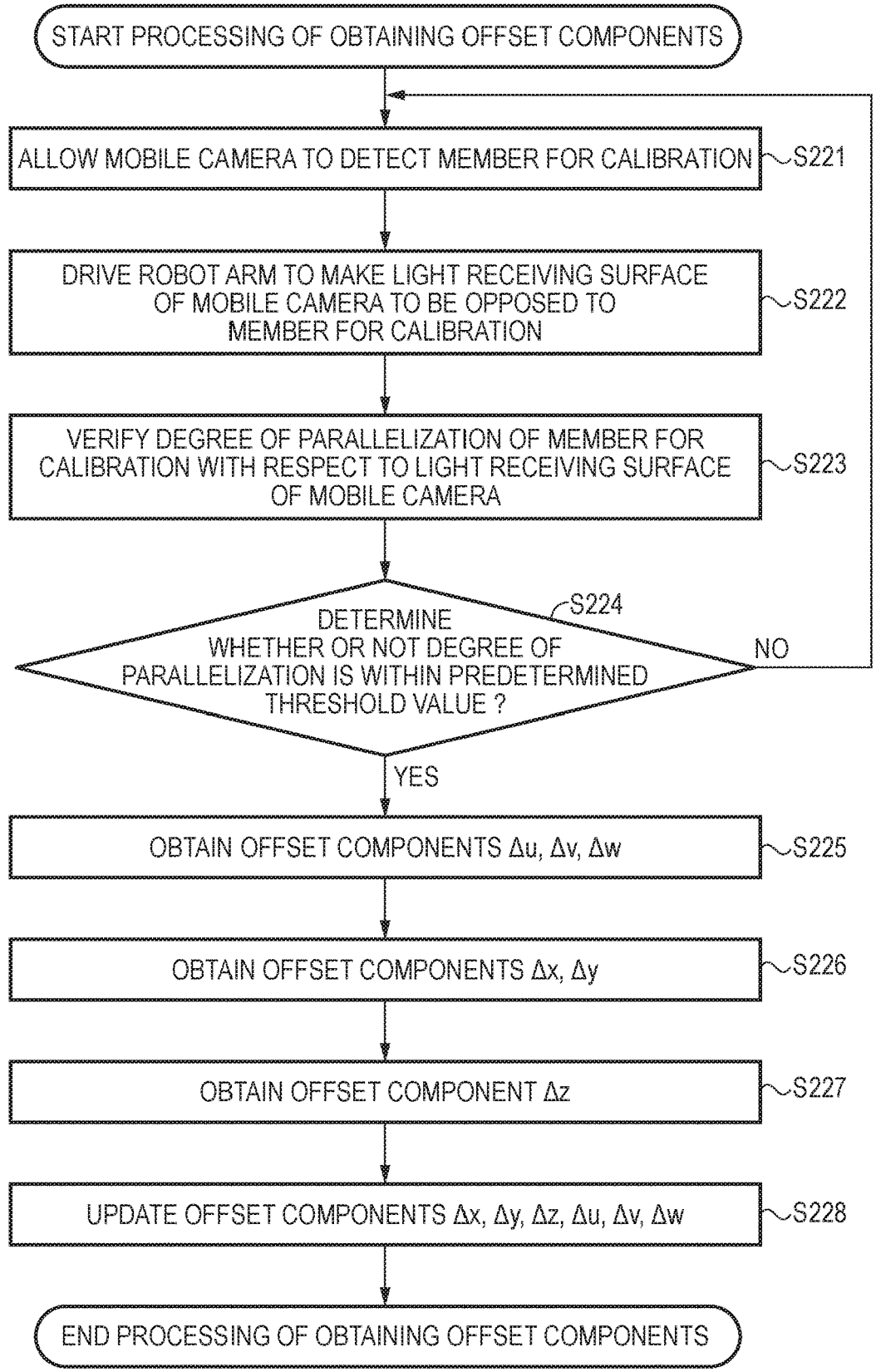
FIG. 43 is a flowchart for explanation of processing of obtaining offset components shown in FIG. 41.
Figure 44:
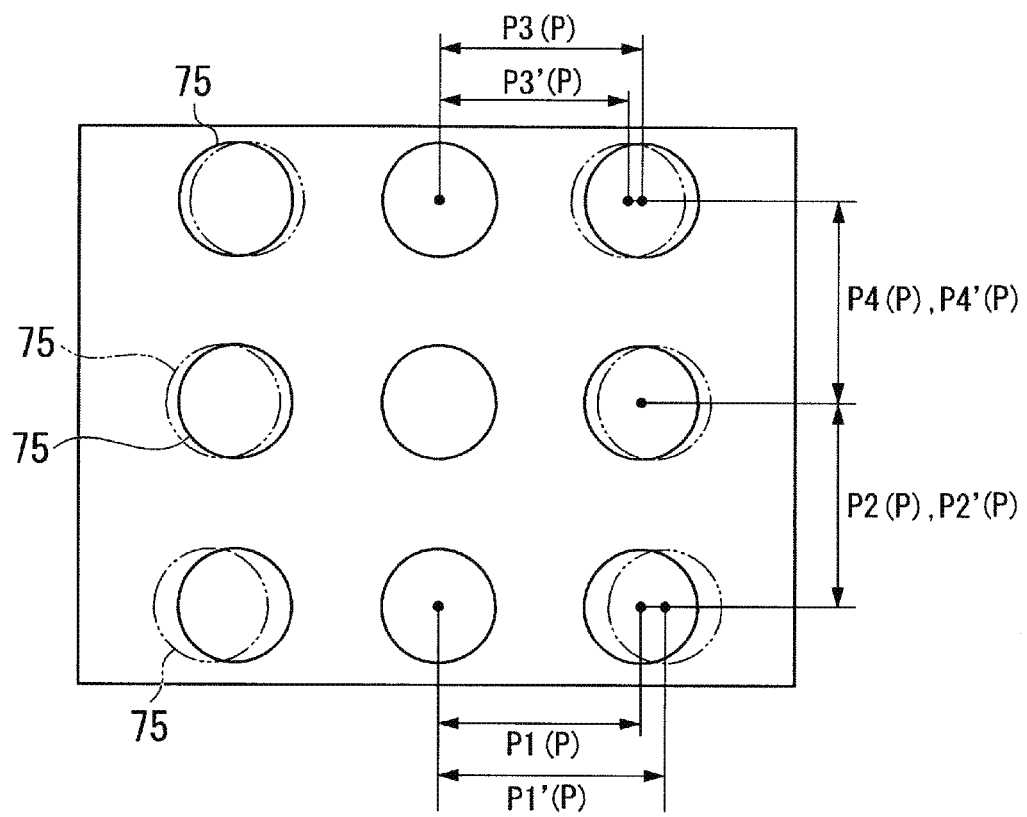
FIG. 44 is a diagram for explanation of processing of obtaining the offset components $\Delta u$, $\Delta v$, $\Delta w$ shown in FIG. 43.
Figure 45:
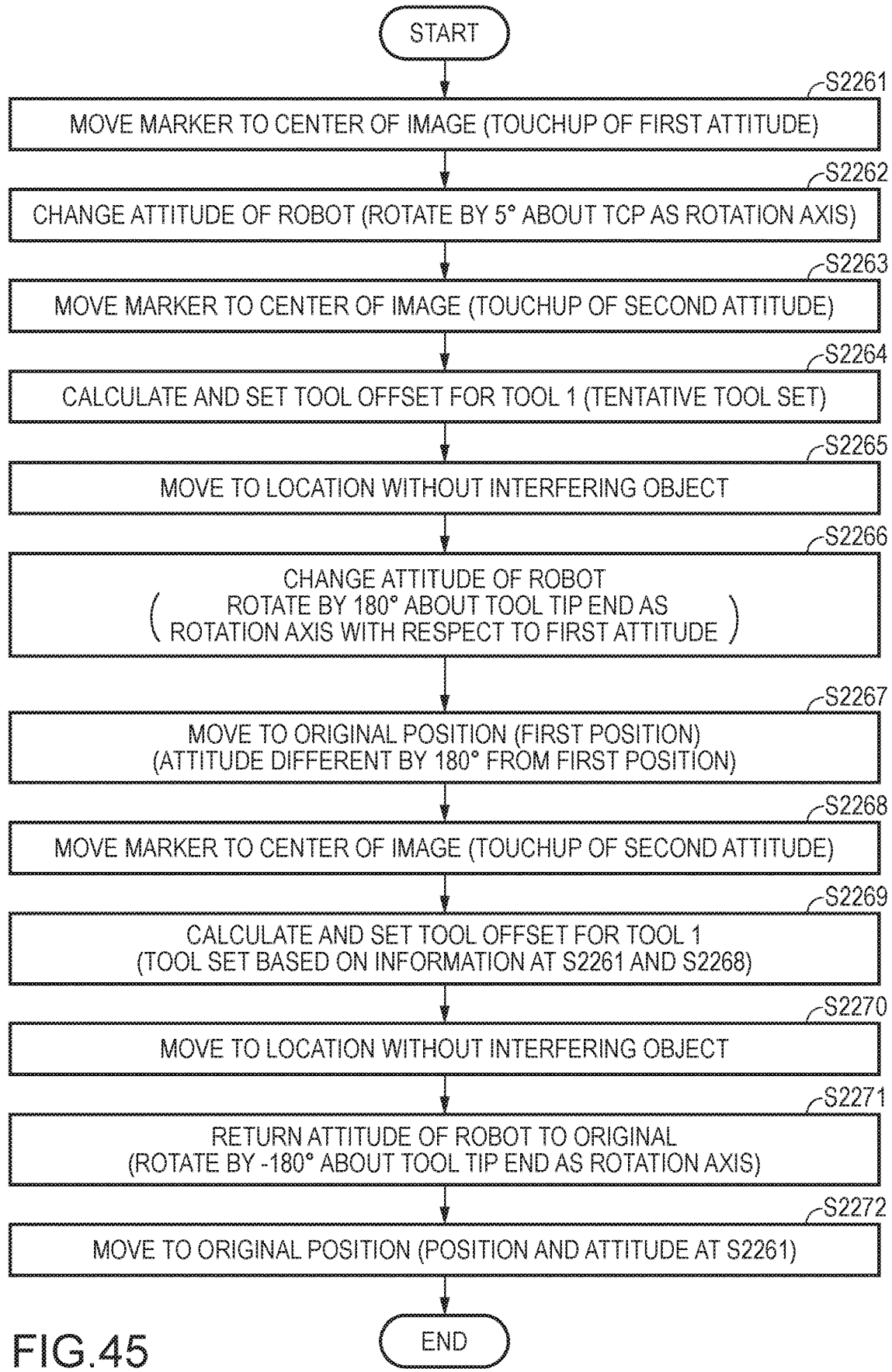
FIG. 45 is a flowchart for explanation of processing of obtaining the offset components $\Delta x$, $\Delta y$ shown in FIG. 43.
Figure 49:
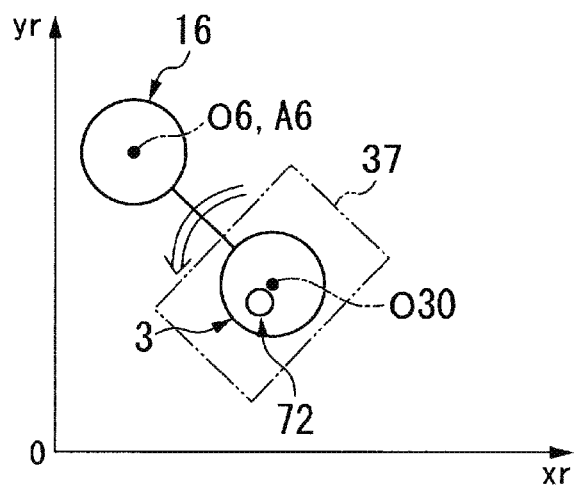
FIG. 49 is a diagram for explanation of the processing of obtaining the offset components $\Delta x$, $\Delta y$ shown in FIG. 43.
Figure 50:
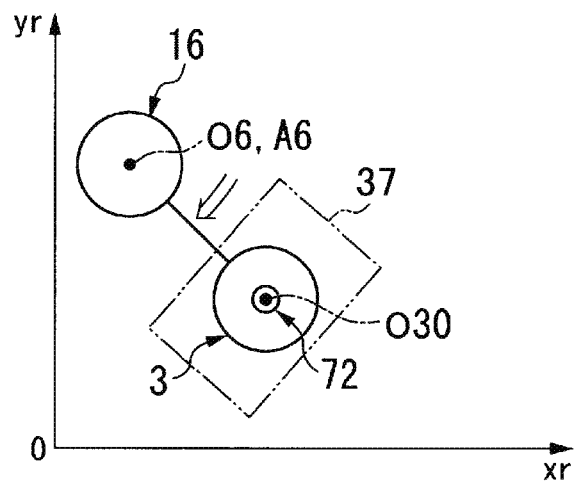
FIG. 50 is a diagram for explanation of the processing of obtaining the offset components $\Delta x$, $\Delta y$ shown in FIG. 43.
Figure 51:
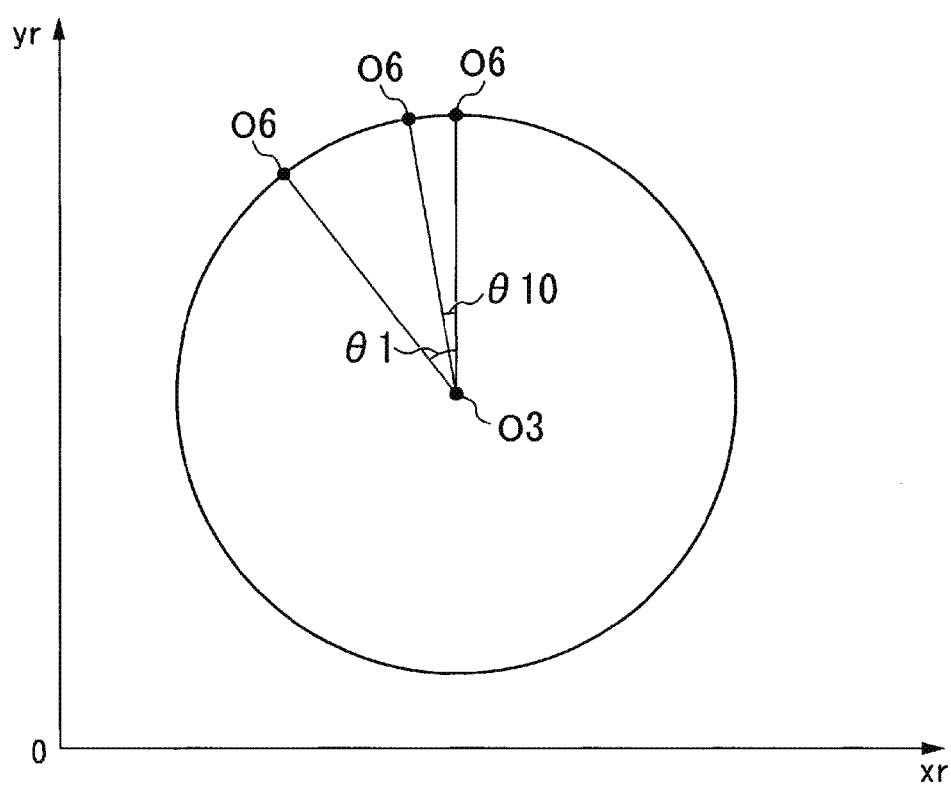
FIG. 51 is a coordinate diagram for explanation of the processing of obtaining the offset components $\Delta x$, $\Delta y$ shown in FIG. 43.
Figure 52:
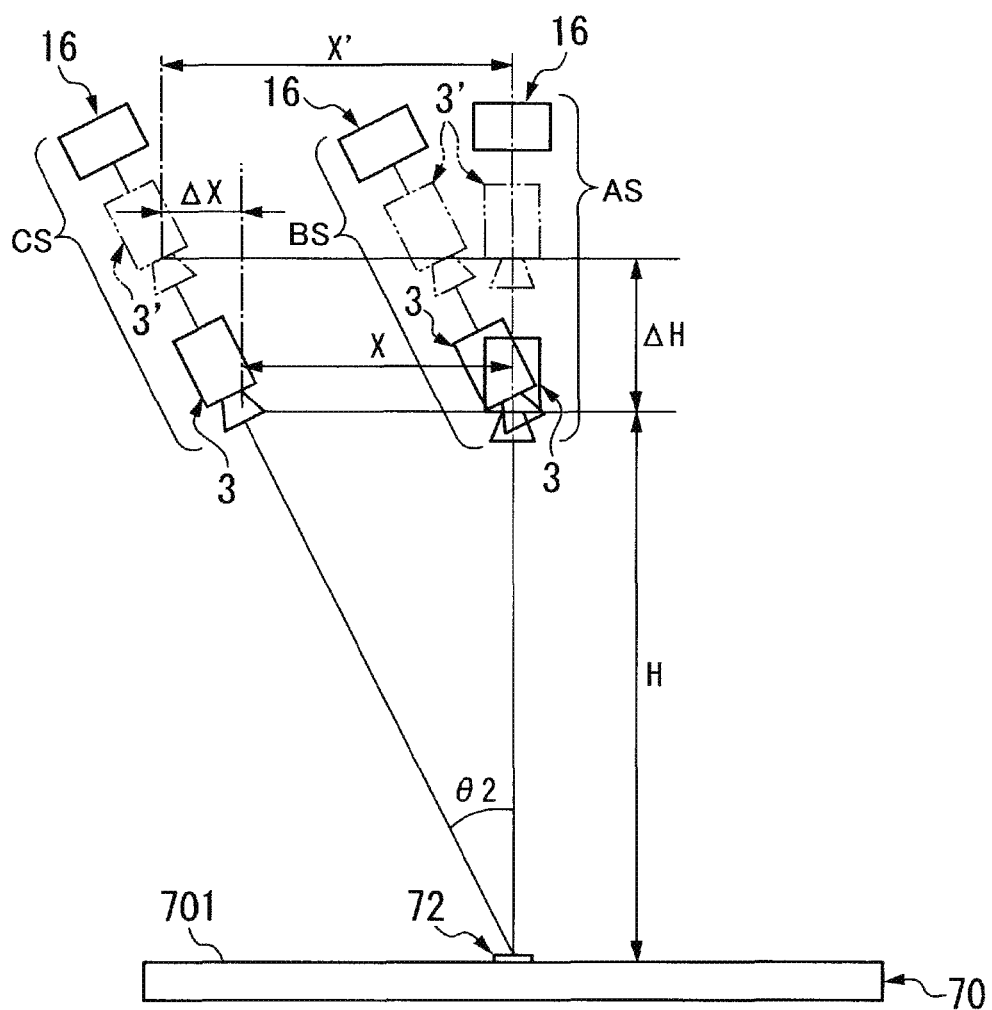
FIG. 52 is a diagram for explanation of processing of obtaining the offset component $\Delta z$ shown in FIG. 43.

FIG. 39 is a flowchart showing a calibration method of the imaging units using the robot system 100 shown in FIG. 36. FIG. 40 is a plan view of a member for calibration used in calibrations of the imaging units shown in FIG. 39. FIG. 41 is a flowchart for explanation of a calibration of the mobile camera 3 shown in FIG. 39. FIG. 42 is a schematic view of the robot 20 for explanation of the calibration of the mobile camera 3 shown in FIG. 41. FIG. 43 is a flowchart for explanation of processing of obtaining offset components shown in FIG. 41. FIG. 44 is a diagram for explanation of processing of obtaining the offset components Δu, Δv, Δw shown in FIG. 43. FIG. 45 is a flowchart for explanation of processing of obtaining the offset components Δx, Δy shown in FIG. 43. FIGS. 46, 47, 48, 49, and 50 are diagrams for explanation of the processing of obtaining the offset components Δx, Δy shown in FIG. 43. FIG. 51 is a coordinate diagram for explanation of the processing of obtaining the offset components Δx, Δy shown in FIG. 43. FIG. 52 is a diagram for explanation of processing of obtaining the offset component Δz shown in FIG. 43.

As shown in FIG. 39, in the calibration method of the imaging units of the embodiment, the calibration of the fixed camera 2 (step S1) is performed, and then, the calibration of the mobile camera 3 (step S2) is performed.

The calibrations of the imaging units are started by the operator giving an instruction to start the calibrations of the imaging units to the control apparatus 5 using the operation device 42. Then, if the operator only gives an instruction to start the calibrations of the imaging units to the control apparatus 5, subsequently, the calibrations of the imaging units are automatically performed by the robot system 100. Note that the calibrations of the imaging units are performed at each time when the job details etc. of the robot 20 change, for example.

Here, in the embodiment, the calibrations of the imaging units are performed using a member for calibration 70 (calibration board) shown in FIG. 40.

The member for calibration 70 is a rectangular plate-like member and a plurality of markers 75 are attached to a surface 701 of the member for calibration 70. The plurality of markers 75 have the same circular shapes as one another and have nearly the same size as one another. Further, the plurality of markers 75 are provided so that all of the pitches (distances) between the adjacent markers 75 may be nearly constant. The pitches between the markers 75 are measured in advance and known.

Circles surrounding the markers 75 are respectively attached to the marker 75 located on the upside in FIG. 40, the marker 75 located in the center portion (the center portion of the surface 701) in FIG. 40, and the marker 75 located on the right side in FIG. 40 of the plurality of markers 75. Of the markers having concentric shapes including these three markers 75 and the surrounding circles, the marker 75 located on the upside in FIG. 40 is referred to as "first marker 71 (first reference point)", the marker 75 located in the center portion in FIG. 40 is referred to as "second marker 72 (second reference point)", and the marker 75 located on the right side in FIG. 40 is referred to as "third marker 73 (third reference point)". The first marker 71, the second marker 72, and the third marker 73 are used as reference markers in processing of specifying a reference surface of the calibration of the imaging unit, which will be described later. Thus, the first marker 71, the second marker 72, and the third marker 73 are located in different positions from one another and the first marker 71, the second marker 72, and the third marker 73 are not in the same straight line.

Note that the respective shapes of the plurality of markers 75, the first marker 71, the second marker 72, and the third marker 73 are not limited to the illustrated shapes, but may be any shapes. Further, the plurality of markers 75, the first marker 71, the second marker 72, and the third marker 73 may respectively have any forms that can be visually recognized, any colors, and any forms with irregular surfaces. Furthermore, the plurality of markers 75, the first marker 71, the second marker 72, and the third marker 73 may have different forms. For example, the plurality of markers 75, the first marker 71, the second marker 72, and the third marker 73 may respectively have different colors and shapes. Note that it is preferable that the first marker 71, the second marker 72, and the third marker 73 have forms that can be distinguished from the other markers 75 for use as the reference markers.

The member for calibration 70 having the configuration has been grasped by the robot 20 with the hand 102 in advance before the operator gives the instruction to start the calibrations of the imaging units. In the embodiment, the hand 102 is allowed to grasp the member for calibration 70 so that the second marker 72 may be located on the center axis A6 of the sixth arm 16. Further, in the embodiment, the coordinates of the second marker 72 with respect to the coordinates of the axis coordinate O6 in the robot coordinate system are specified and the coordinates of the second marker 72 in the robot coordinate system may be obtained.

Note that, in the embodiment, the second marker 72 is located on the center axis A6 of the sixth arm 16, however, the second marker 72 is not necessarily located on the center axis A6 of the sixth arm 16 if settings such that the coordinates of the second marker 72 in the robot coordinate system may be obtained are made.

Calibration of Fixed Camera (Step S1)

As shown in FIG. 39, when the instruction to start the calibrations of the imaging units is given by the operator, the control apparatus 5 first starts the calibration of the fixed camera 2 (step S1).

In the calibration of the fixed camera 2 (step S1), processing of specifying the reference surface is performed, and then, processing of obtaining a relationship between the image coordinate system of the fixed camera 2 and the robot coordinate system is performed.

Processing of Specifying Reference Surface

As below, the processing of specifying the reference surface will be explained.

When the processing of specifying the reference surface is started, first, the control apparatus 5 drives the robot arm 8 to make the member for calibration 70 to face the fixed camera 2.

Then, the control apparatus 5 drives the robot arm 8 to move the member for calibration 70 so that the second marker 72 attached to the member for calibration 70 may be located in the center part of the image of the fixed camera 2.

Then, the control apparatus 5 allows the fixed camera 2 to image the second marker 72. In this regard, the control apparatus 5 performs processing (focusing processing) of moving the member for calibration 70 so that the fixed camera 2 may be focused on the second marker 72 by driving the robot arm 8. Note that the focusing processing may be omitted.

Then, the control apparatus 5 stores the image of the second marker 72 captured by the fixed camera 2 as "first image" in the memory unit 54, and stores the coordinates of the axis coordinate O6 in the robot coordinate system when the first image is captured in the memory unit 54. Here, in the processing of specifying the reference surface in the fixed camera 2, the second marker 72 when the first image is captured is referred to as "first reference marker".

Then, the control apparatus 5 drives the robot arm 8 to translationally move the member for calibration 70 along the xr-axis, the yr-axis, and the zr-axis in the robot coordinate system so that the second marker 72 may be located in a position different from the position to which the marker has been moved on the image of the fixed camera 2.

Then, the control apparatus 5 allows the fixed camera 2 to image the second marker 72.

Then, the shape and size of the second marker 72 in the image captured by the fixed camera 2 and the shape and size of the second marker 72 in the first image stored in the memory unit 54 are compared. Then, whether or not a difference between the shape and size of the second marker 72 and the shape and size of the second marker 72 in the first image is within a predetermined threshold value is determined.

If a determination that the difference is not within the predetermined threshold value is made, the member for calibration 70 is moved by driving of the robot arm 8 so that the difference may be within the predetermined threshold value.

Then, if determining that the difference is within the predetermined threshold value, the control apparatus 5 stores the image of the second marker 72 captured using the fixed camera 2 as "second image (nth image)" in the memory unit 54, and stores the coordinates of the axis coordinate O6 in the robot coordinate system when capturing the second image (nth image) in the memory unit 54. Here, in the processing of specifying the reference surface in the fixed camera 2, the second marker 72 when the second image is captured is referred to as "second reference marker". Note that, when the second image is captured, the second marker 72 attached to the member for calibration 70 grasped by the hand 102 is located in a position different from the position when the first image is captured.

Then, whether or not the number n of captured images is a predetermined number set in advance (n is an integer that satisfies 3≤n) is determined.

Here, in the embodiment, acquisition of images until the number of images becomes three, i.e., capture of three images (first image, second image, and third image) using the fixed camera 2 is preset. Here, in the processing of specifying the reference surface in the fixed camera 2, the second marker 72 when the third image is captured is referred to as "third reference marker". Note that, when the third image is captured, the second marker 72 attached to the member for calibration 70 grasped by the hand 102 is located in a position different from the position when the first image is captured or the position when the second image is captured and those are not in the same straight line. Further, in the processing of specifying the reference surface in the fixed camera 2, the second marker 72 may be regarded as serving as all of "first reference marker, second reference marker, and third reference marker".

Then, if a determination that the number n of images is the predetermined number is made, the processing unit 53 obtains the origin a reference surface 81 parallel to the imaging device 23 (the plane passing through the second marker 72 placed in three different locations) and respective directions of the x-axis, y-axis, z-axis based on the coordinates of the axis coordinate O6 in the n (in the embodiment, three) robot coordinate systems stored in the memory unit 54. Then, the control apparatus 5 defines the position and the attitude of the reference surface 81 in the robot coordinate system, i.e., components xr, yr, zr, ur, vr, wr of the reference surface 81.

Processing of Obtaining Relationship Between Image Coordinate System of Fixed Camera and Robot Coordinate System Then, processing of obtaining a relationship between the image coordinate system of the fixed camera and the robot coordinate system is performed.

The control apparatus 5 first drives the robot arm 8 to move the member for calibration 70 so that the axis coordinate O6 may be positioned at arbitrary nine reference points (virtual target points) arranged in a grid form within the reference surface 81. That is, the second markers 72 are moved to the nine locations arranged in the grid form. In this regard, the control apparatus 5 allows the fixed camera 2 to image the second marker 72 at each time when moving the member for calibration 70.

Here, all of the nine reference points are located within the range of the images of the fixed camera 2 (within the imaging area) and all distances between the adjacent reference points are equal.

Then, the control apparatus 5 obtains correction parameters (coordinate transform matrix) for transforming the image coordinates of the fixed camera 2 into the coordinates on the reference surface 81 in the robot coordinate system based on the coordinates (components xa, ya, ua) of the second marker 72 in the image coordinate system of the fixed camera 2 based on the nine images and the coordinates (components xr, yr, ur) on the reference surface 81 in the robot coordinate system.

Using thus obtained correction parameters, the position and the attitude of an object or the like captured by the fixed camera 2 (specifically, the components xa, ya, ua) may be transformed into values in the robot coordinate system (specifically, the components xr, yr, ur). Note that the correction parameters are values in consideration of internal parameters of the fixed camera 2 including distortion of the lens 22.

Calibration of Mobile Camera (Step S2)

Then, the control apparatus 5 starts the calibration of the mobile camera 3 shown in FIG. 39 (step S2).

As shown in FIG. 41, in the calibration of the mobile camera 3 (step S2), processing of specifying a reference surface (step S21), processing of obtaining offset components (step S22), processing of specifying a work surface (step S23), processing of teaching a position and an attitude of a marker to the robot 20 (step S24), and processing of obtaining a relationship between the image coordinate system of the mobile camera 3 and the robot coordinate system (step S25) are performed in this order.

Processing of Specifying Reference Surface (Step S21)

First, as shown in FIG. 42, prior to the processing of specifying the reference surface (step S21), the member for calibration 70 grasped by the hand 102 is mounted on the work surface 611 of the work board 61 in advance. Then, the processing of specifying the reference surface (step S21) is performed.

First, the control apparatus 5 drives the robot arm 8 to make the member for calibration 70 to face the mobile camera 3. Then, the control apparatus 5 drives the robot arm 8 to move the mobile camera 3 so that the first marker 71 attached to the member for calibration 70 may be located in the center part of the image of the mobile camera 3.

Then, the control apparatus 5 allows the mobile camera 3 to image the first marker 71. In this regard, the control apparatus 5 performs processing (focusing processing) of moving the mobile camera 3 so that the mobile camera 3 may be focused on the first marker 71 by driving the robot arm 8. Note that the focusing processing may be omitted.

Then, the control apparatus 5 stores the image of the first marker 71 captured by the mobile camera 3 as "first image" in the memory unit 54, and stores the coordinates of the axis coordinate O6 in the robot coordinate system when the first image is captured in the memory unit 54. Here, in the processing of specifying the reference surface in the mobile camera 3, the first marker 71 is referred to as "first reference marker".

Then, the control apparatus 5 drives the robot arm 8 to translationally move the mobile camera 3 so that the second marker 72 may be located in the center part of the image of the mobile camera 3.

Then, the control apparatus 5 allows the mobile camera 3 to capture the second marker 72 (nth marker).

Then, the shape and size of the second marker 72 in the image captured by the mobile camera 3 and the shape and size of the first marker 71 in the first image stored in the memory unit 54 are compared. Then, whether or not a difference between the shape and size of the second marker 72 and the shape and size of the first marker 71 is within a predetermined threshold value is determined.

If a determination that the difference is not within the predetermined threshold value is made, the mobile camera 3 is moved by driving of the robot arm 8 so that the difference may be within the predetermined threshold value.

Then, if determining that the difference is within the predetermined threshold value, the control apparatus 5 stores the image of the second marker 72 (nth marker) captured using the mobile camera 3 as "second image (nth image)" in the memory unit 54, and stores the coordinates of the axis coordinate O6 in the robot coordinate system when capturing the second image (nth image) in the memory unit 54. Here, in the processing of specifying the reference surface in the mobile camera 3 (step S21), the second marker 72 is referred to as "second reference marker".

Then, whether or not the number n of captured images is a predetermined number set in advance (n is an integer that satisfies 3≤n) is determined.

Here, in the embodiment, capture of three images (first image, second image, and third image) using the mobile camera 3 is preset. Accordingly, in the embodiment, after the second image is captured by the mobile camera 3, further, the image of the third marker 73 captured by the mobile camera 3 is stored as "third image" in the memory unit 54 again, and the coordinates of the axis coordinate O6 in the robot coordinate system when capturing the third image are stored in the memory unit 54. Here, in the processing of specifying the reference surface in the mobile camera 3, the third marker 73 is referred to as "third reference marker".

Then, if a determination that the number n of images is the predetermined number is made, the processing unit 53 obtains the origin of a reference surface 82 parallel to a surface 701 as shown in FIG. 42 (the plane passing through the first marker 71, the second marker 72, and the third marker 73) and respective directions of the x-axis, y-axis, z-axis based on the coordinates of the axis coordinate O6 in the n (in the embodiment, three) robot coordinate systems stored in the memory unit 54. Then, the control apparatus 5 defines the position and the attitude of the reference surface 82 in the robot coordinate system, i.e., components xr, yr, zr, ur, vr, wr of the reference surface 82.

Processing of Obtaining Offset Components (Step S22)

Then, the processing of obtaining the offset components (step S22) will be explained with reference to the flowchart shown in FIG. 43.

Here, as described above, the mobile camera 3 is attached to the sixth arm 16 with offset so that the optical axis OA3 may be nearly parallel to the center axis A6 of the sixth arm 16 in design. However, actually, a shift is produced from the offset components in design (the position and the attitude of the mobile camera 3 with respect to the sixth arm 16). The shift is produced due to e.g. an assembly error of the mobile camera 3, an assembly error of the imaging device 38 in the casing of the mobile camera 3, etc.

Accordingly, in the processing of obtaining the offset components (step S22), the actual offset components (the position and the attitude of the mobile camera 3 with respect to the sixth arm 16) are obtained.

In the following processing of obtaining the offset components (step S22), offset components ($\Delta x$, $\Delta y$, $\Delta z$, $\Delta u$, $\Delta v$, $\Delta w$) of the position of the imaging reference point O3 and the direction (attitude) of the optical axis OA3 of the mobile camera 3 with respect to the axis coordinate O6 of the rotation shaft member 161 are obtained.

Note that, in the embodiment, the offset components of the position of the imaging reference point O3 and the direction of the optical axis OA3 with respect to the axis coordinate O6 are obtained, however, the locations as reference for obtaining the offset components are not limited to the axis coordinate O6 and the imaging reference point O3, but arbitrary. For example, the locations as reference for obtaining the offset components may be predetermined portions of the tool including TCP of the hand 102 attached to the robot arm 8.

As shown in FIG. 43, when the processing of obtaining the offset components (step S22) is started, first, the control apparatus 5 drives the robot arm 8 to allow the mobile camera 3 to detect the member for calibration 70 (step S221).

Then, the control apparatus 5 drives the robot arm 8 so that the light receiving surface 311 of the mobile camera 3 may be opposed to the surface 701 of the member for calibration 70 (step S222).

Then, the control apparatus 5 verifies the degree of parallelization of the surface 701 of the member for calibration 70 with respect to the light receiving surface 311 of the mobile camera 3 (step S223). Then, the control apparatus 5 determines whether or not the degree of parallelization is within a predetermined threshold value (step S224).

As shown in FIG. 44, the degree of parallelization is verified using the differences of the pitches P between the adjacent markers 75 attached to the surface 701 in the image. For example, as shown by solid lines in FIG. 44, in the case where the differences of the pitches P1, P2, P3, P4 between the adjacent markers 75 are nearly the same and the differences are within the predetermined threshold value, the process moves to step S225. On the other hand, as shown by two dashed-dotted lines in FIG. 44, in the case where the differences of the pitches P1', P2', P3', P4' between the adjacent markers 75 are different and the differences exceed the predetermined threshold value, step S221 to step S224 are repeated until the differences fall within the predetermined threshold value. Here, the differences within the predetermined threshold value mean that the above described reference surface 82 and the optical axis OA3 are perpendicular within the threshold value.

Then, if determining that the differences are within the predetermined threshold value, the control apparatus 5 obtains the offset components $\Delta u$, $\Delta v$, $\Delta w$ from the differences between the components ur, vr, wr of the axis coordinate O6 in the robot coordinate system when determining that the differences are within the predetermined threshold value and the components ur, vr, wr of the reference surface 82 in the robot coordinate system when obtained in the above described processing of specifying the reference surface (step S21) (step S225). The offset components $\Delta u$, $\Delta v$, $\Delta w$ correspond to the offset components $\Delta u$, $\Delta v$, $\Delta w$ of the optical axis OA3 with respect to the axis coordinate O6.

Then, as shown in FIG. 43, the control apparatus 5 obtains the offset components $\Delta x$, $\Delta y$ of the imaging reference point O3 with respect to the axis coordinate O6 (step S226). As below, the method of obtaining the offset components $\Delta x$, $\Delta y$ will be explained with reference to FIGS. 45 to 51. note that FIG. 45 is the flowchart for explanation of the processing of obtaining the offset components $\Delta x$, $\Delta y$, and FIGS. 46 to 51 schematically show the mobile camera 3 and the sixth arm 16 when the robot 20 is seen from above in the vertical direction, for example.

Figure 46:
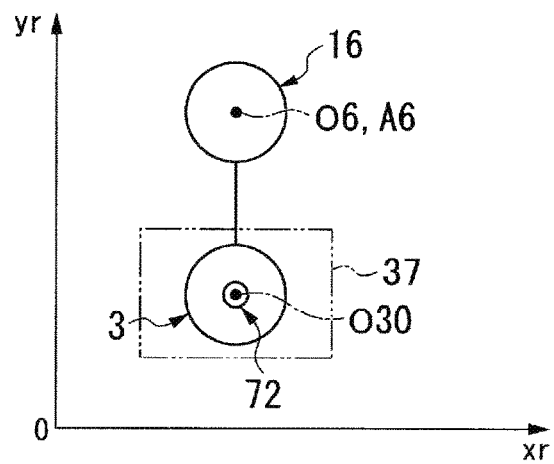
FIG. 46 is a diagram for explanation of the processing of obtaining the offset components $\Delta x$, $\Delta y$ shown in FIG. 43.

Specifically, first, the control apparatus 5 moves the marker to the center of the image (step S2261). As shown in FIG. 46, for example, the control apparatus 5 drives the robot arm 8 so that the second marker 72 may be located at a center O30 (center of gravity) of an image 37 of the mobile camera 3. The attitude of the mobile camera 3 and the sixth arm 16 shown in FIG. 46 is referred to as "first attitude" and the state is referred to as "first state". Here, the center O30 of the image 37 and the imaging reference point O3 coincide. Further, the position of the hand 102 attached to the sixth arm 16 shown in FIG. 46 is referred to as "first position".

Figure 47:
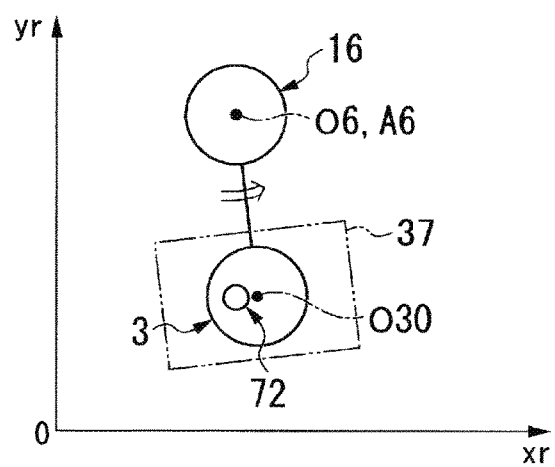
FIG. 47 is a diagram for explanation of the processing of obtaining the offset components $\Delta x$, $\Delta y$ shown in FIG. 43.

Then, the control apparatus 5 changes the attitude of the robot 20 (step S2262). The control apparatus 5 rotates the attitude by about 5° about TCP as a rotation axis. Specifically, as shown in FIG. 47, in the first attitude, the control apparatus 5 drives the robot arm 8 to rotate the sixth arm 16 about the center axis A6 by a predetermined angle. The predetermined angle in this regard is set to a predetermined angle (e.g. about 1 to 10°) within a range from which the second marker 72 comes out of the image 37 (within a range inside the imaging range of the mobile camera 3).

Figure 48:
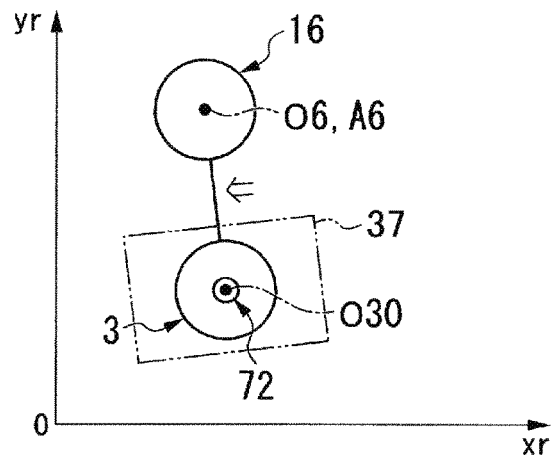
FIG. 48 is a diagram for explanation of the processing of obtaining the offset components $\Delta x$, $\Delta y$ shown in FIG. 43.

Then, the control apparatus 5 moves the marker to the center of the image (step S2263). Specifically, as shown in FIG. 48, the control apparatus 5 drives the robot arm 8 to translationally moves the mobile camera 3 and the sixth arm 16 within a plane parallel to the plane containing the xr-axis and the yr-axis in the robot coordinate system (x-y plane of the reference surface 82) so that the second marker 72 may coincide with the center O30. The attitude of the mobile camera 3 and the sixth arm 16 shown in FIG. 48 is referred to as "second attitude" and the state is referred to as "second state".

Then, the control apparatus 5 calculates tool offset and sets it for the tool 1 (step S2264). It is known that the movement of the the mobile camera 3 and the sixth arm 16 from the first state to the fourth state is equal to a rotation of the axis coordinate O6 (sixth arm 16) about a line segment passing through the center O30 (imaging reference point O3) as a rotation center axis from the first state shown in FIG. 46 and the second state shown in FIG. 48. Therefore, as shown in FIGS. 46 to 48, the movement from the first state to the second state is equal to a movement of the axis coordinate O6 about the line segment passing through the center O30 (imaging reference point O3) by a rotation angle θ10. Thus, the coordinates of the imaging reference point O3 in the robot coordinate system are obtained based on the rotation angle θ10, the coordinates of the axis coordinate O6 in the robot coordinate system in the first state, and the coordinates of the axis coordinate O6 in the robot coordinate system in the second state. Then, tentative offset components Δx', Δy' (tentative tool set) of the imaging reference point O3 with respect to the axis coordinate O6 are obtained from the obtained coordinates of the imaging reference point O3 in the robot coordinate system and the coordinates of the axis coordinate O6 in the robot coordinate system in one of the first state and the third state.

Then, the control apparatus 5 moves the hand 102 attached to the sixth arm 16 of the robot arm 8 (step S2265). The case where an interfering object (obstacle) such as another robot or apparatus is placed near the robot 20 is considered. In this case, when a certain robot 20 rotates the hand 102 attached to the sixth arm 16 of the robot arm 8 of the robot 20 about the center axis A6 by a predetermined angle, contact of the hand 102 with the interfering object is assumed.

Accordingly, in the embodiment, in the second state, in the case where, when the hand 102 is rotated about the center axis A6 by the predetermined angle, the hand 102 interferes with the interfering object, the control apparatus 5 moves the hand 102 attached to the sixth arm 16 of the robot arm 8 from the first position to a second position in which the hand 102 does not come into contact with the interfering object even when the hand 102 is rotated about the center axis A6 by the predetermined angle. Specifically, in the example, in this case, the control apparatus 5 moves the hand 102 from the first position upward by a predetermined distance while holding the current attitude of the mobile camera 3, and thereby, translationally moves (releases) the hand to the second position in which the hand 102 does not come into contact with the interfering object even when the hand 102 is rotated about the center axis A6 by the predetermined angle. Note that the control apparatus 5 may be adapted to translationally move the hand in another direction by a predetermined distance or move the hand to another predetermined position instead of moving the hand 102 from the first position upward by the predetermined distance. When the hand is moved to another predetermined position, the attitudes of the mobile camera 3 should be the same in the respective first position and second position. However, the attitude of the mobile camera 3 during movement from the first position to the second position may change.

Then, the control apparatus 5 changes the attitude of the robot (step S2266). Specifically, the control apparatus 5 rotates the attitude by 180° about the tool tip end as a rotation center with respect to the first attitude. FIG. 49 shows the mobile camera 3 and the sixth arm 16 in the state rotated by 180° about the tool tip end as the rotation center. In the example shown in FIG. 49, even after the control apparatus 5 moves the hand 102 from the first position to the second position, the image 37 of the mobile camera 3 contains the second marker 72. Note that, in the state, the image 37 of the mobile camera 3 does not necessarily contain the second marker 72.

Then, the control apparatus 5 moves the position of the hand 102 attached to the sixth arm 16 to the first position (step S2267). In this case, the attitude of the robot is different from the first position by 180°.

Then, the control apparatus 5 moves the marker to the center of the image (step S2268). Specifically, the control apparatus 5 drives the robot arm 8 based on the tentative offset components Δx', Δy' so that the second marker 72 may not come out of the image 37, and rotates the axis coordinate O6 about the line segment passing through the imaging reference point O3 (center O30) as a rotation center axis. As shown in FIG. 50, the control apparatus 5 drives the robot arm 8 to translationally move the mobile camera 3 and the sixth arm 16 within a plane parallel to the plane containing the xr-axis and the yr-axis in the robot coordinate system (x-y plane of the reference surface 82), and positions the second marker 72 at the center O30 of the image 37. The attitude of the mobile camera 3 and the sixth arm 16 shown in FIG. 50 is referred to as "third attitude" and the state is referred to as "third state".

Then, the control apparatus 5 calculates tool offset and sets it for the tool 1 (step S2269). It is known that the movement of the the mobile camera 3 and the sixth arm 16 from the first state shown in FIG. 46 to the third state shown in FIG. 50 is equal to a rotation of the axis coordinate O6 about the line segment passing through the center O30 (imaging reference point O3) as a rotation center axis from the first state shown in FIG. 46 and the third state shown in FIG. 50. Therefore, as shown in FIG. 51, the movement from the first state shown in FIG. 46 to the third state in FIG. 50 is equal to a movement of the axis coordinate O6 about the line segment passing through the center O30 (imaging reference point O3) by a rotation angle θ1. Thus, the coordinates of the imaging reference point O3 in the robot coordinate system are obtained based on the rotation angle θ1, the coordinates of the axis coordinate O6 in the robot coordinate system in the first state, and the coordinates of the axis coordinate O6 in the robot coordinate system in the third state. Then, the offset components Δx, Δy (tool set) of the imaging reference point O3 with respect to the axis coordinate O6 are obtained from the obtained coordinates of the imaging reference point O3 in the robot coordinate system and the coordinates of the axis coordinate O6 in the robot coordinate system in one of the first state and the third state.

Then, the control apparatus 5 moves the hand 102 attached to the sixth arm 16 of the robot arm 8 to a location without an interfering object (step S2270).

Then, the control apparatus 5 returns the attitude of the robot to the original (step S2271). Specifically, the control apparatus 5 rotates the attitude by −180° about the tool tip end as a rotation center.

Then, the control apparatus 5 moves the position of the hand 102 attached to the sixth arm 16 to the first position (step S2272).

According to the processing, the offset components Δx, Δy of the imaging reference point O3 with respect to the axis coordinate O6 may be easily obtained with high accuracy.

Further, as described above, in the embodiment, the processing of transitioning from the first state to the second state is performed, and thereby, the tentative offset components Δx', Δy' are calculated. That is, the processing of rotating the sixth arm 16 about the center axis A6 by a minute angle within the range in which the second marker 72 falls within the image 37 (imaging range) of the mobile camera 3, and thereby, the tentative offset components Δx', Δy' are calculated. The processing at step S2268 is performed using information of the tentative offset components Δx', Δy', and thereby, the second marker 72 may be reliably reflected within the image 37.

Then, as shown in FIG. 43, the control apparatus 5 obtains the offset component Δz of the imaging reference point O3 with respect to the axis coordinate O6 (step S227). As below, the method of obtaining the offset component Δz will be explained with reference to FIG. 52. Note that FIG. 52 shows a process of the mobile camera 3 and the sixth arm 16 when the offset component Δz is obtained. For convenience of explanation, the mobile cameras 3 shown by solid lines in FIG. 52 show the positions of "designed mobile cameras 3" and the mobile cameras 3' shown by two dashed-dotted lines in FIG. 52 show the positions of "real mobile cameras 3".

As shown in FIG. 52, first, the control apparatus 5 drives the robot arm 8 so that the second marker 72 may be reflected on the center of the image of the mobile camera 3' into a state AS shown in FIG. 51, for example. Then, the control apparatus 5 images the second marker 72 with the mobile camera 3' and obtains a distance H between the light receiving surface 311 of the mobile camera 3 and the second marker 72 shown in FIG. 52.

Here, in the embodiment, the focal distance of the mobile camera 3 has been obtained in advance and known. Accordingly, the distance H is calculated from the focal distance of the mobile camera 3, a length of the pitch between the markers 75 "pixel" in the image of the mobile camera 3, and the pitch "mm" between the real markers 75.

Note that, for example, the the focal distance of the mobile camera 3 can be obtained from the length of the pitch "pixel" between the markers 75 on the image and the pitch "mm" between the real markers 75 before and after the case where the mobile camera 3 is moved in the optical axis OA3 direction (zr-direction) by a minute amount while the marker 75 of the member for calibration 70 is reflected.

Then, as shown by a state BS in FIG. 52, the control apparatus 5 drives the robot arm 8 to incline the mobile camera 3' by an angle θ2 based on the designed offset component Δz.

Then, as shown by a state CS in FIG. 52, the control apparatus 5 drives the robot arm 8 to translationally move the mobile camera 3' within the plane parallel to the plane containing the xr-axis and the yr-axis in the robot coordinate system (x-y plane of the reference surface 82) so that the second marker 72 may be reflected on the center of the image of the mobile camera 3' while holding the attitude of the mobile camera 3' in the state BS. Then, the control apparatus 5 obtains a movement distance X' of the axis coordinate O6 in the robot coordinate system (specifically, the movement distance of the imaging reference point O3 within the x-y plane of the reference surface 82 based on the designed offset component Δz).

Then, the control apparatus 5 obtains an amount of correction ΔH for obtaining the real offset component Δz of the mobile camera 3' from the following expression (2).

$$\Delta H = (X'/\tan \theta 2) - H \qquad (2)$$

Then, the control apparatus 5 obtains the real offset component Δz based on the amount of correction ΔH and the designed offset component Δz.

In the above described manner, the offset component Δz may be obtained. According to the processing, the offset component Δz may be easily calculated.

Then, as shown in FIG. 43, the control apparatus 5 updates data from the designed offset components to the obtained real offset components Δx, Δy, Δz, Δu, Δv, Δw (step S228).

As above, the processing of obtaining the offset shown in FIG. 41 (step S22) ends.

Processing of Specifying Work Surface (Step S23)

Then, as shown in FIG. 41, the processing of specifying the work surface (step S23) is performed. The processing of specifying the work surface (step S23) is processing of obtaining the position and the attitude of the work surface 611, i.e., the components xr, yr, zr, ur, vr, wr of the work surface 611 in the robot coordinate system.

Here, the work surface 611 is parallel to the reference surface 82 and located in a position with offset in the normal direction (zr-direction) of the reference surface 82. Accordingly, in the processing of specifying the work surface (step S23), an amount of offset in the normal direction (zr-direction) of the work surface 611 with respect to the reference surface 82 is determined, and thereby, the components xr, yr, zr, ur, vr, wr of the work surface 611 may be obtained.

The amount of offset in the normal direction (zr-direction) of the work surface 611 with respect to the reference surface 82 may be obtained based on the focal distance of the mobile camera 3 obtained in advance, the number of pixels of the mobile camera 3 with respect to the value (actual dimension) of the pitch between the adjacent markers 75 of the member for calibration 70, and the above described real offset components.

The position and the attitude of the work surface 611 in the robot coordinate system are obtained in the above described manner, and thereby, the robot 20 may perform a job on the object mounted on the work surface 611 with high accuracy.

Processing of Teaching Position and Attitude of Marker to Robot (Step S24)

Then, as shown in FIG. 41, the processing of teaching the position and the attitude of the marker to the robot 20 (step S24) is performed.

Here, for example, the robot coordinates of the second marker 72 on the x-y plane of the reference surface 82 (or work surface 611) are taught to the robot 20.

Specifically, first, the control apparatus 5 obtains the optical axis OA2 of the mobile camera 3 on the z-axis of the reference surface 82 based on the offset components of the position of the imaging reference point O3 with respect to the axis coordinate O6 and the direction of the optical axis OA3 calculated in the above described processing of obtaining the offset components (step S22). Then, the control apparatus 5 translationally moves the mobile camera 3 within the plane parallel to the x-y plane of the reference surface 82 by driving of the robot arm 8, and allows the second marker 72 to coincide with the image center of the mobile camera 3. Then, the control apparatus 5 teaches the position of the imaging reference point O3 of the mobile camera 3 when allowing the second marker 72 to coincide with the image center of the mobile camera 3 as the robot coordinates of the second marker 72.

Note that, for example, the position and the attitude of the marker 75 may be taught to the robot 20 by bringing a teaching-specific tool (hand for touchup) having known offset in the axis coordinate O6 into contact with the second marker 72. Note that it is preferable to teach the position and the attitude of the marker 72 to the robot 20 by imaging of the image of the second marker 72 using the mobile camera 3 because the second marker 72 may be taught with high accuracy regardless of the material of the member for calibration 70 or the like, for example.

Processing of Obtaining Relationship between Image Coordinate System of Mobile Camera and Robot Coordinate System (Step S25)

Then, as shown in FIG. 41, the processing of obtaining the relationship between the image coordinate system of the mobile camera 3 and the robot coordinate system (step S25) is performed.

When the processing of obtaining the relationship between the image coordinate system of the mobile camera 3 and the robot coordinate system (step S25) ends, correction parameters (coordinate transform matrix) for transforming the image coordinates of the fixed camera 2 into the coordinates on the reference surface 82 in the robot coordinate system based on the coordinates (components xb, yb, ub) of the second marker 72 in the image coordinate system of the mobile camera 3 based on the nine images and the above described coordinates (components xr, yr, ur) on the reference surface 82 in the robot coordinate system obtained at the step S21.

Using thus obtained correction parameters, the position and the attitude of an object or the like captured by the mobile camera 3 (specifically, the components xb, yb, ub) may be transformed into values in the robot coordinate system (specifically, the components xr, yr, ur).

As described above, the calibrations of the imaging units shown in FIG. 39 end.

According to the calibration method of the imaging units, the attitudes of the reference surfaces 81, 82 may be obtained based on the images respectively captured by the fixed camera 2 and the mobile camera 3, and thereby, determinations by the operator in related art may be omitted. Accordingly, human errors and variations by the operator may be reduced and high-accuracy calibrations may be performed.

As above, the robot, the robot control apparatus, and the robot system according to the invention are described based on the illustrated embodiments, however, the invention is not limited to those. The configurations of the respective parts may be replaced by arbitrary configurations having the same functions. Alternatively, another arbitrary configuration may be added thereto. Alternatively, the invention may include a combination of arbitrary two or more configurations (features) of the above described embodiments.

In the above described embodiments, the case using the six-axis vertical articulated robot is explained as an example, however, the robot in the invention may be another robot e.g. a horizontal articulated robot than the vertical articulated robot. Note that the horizontal articulated robot has a configuration having e.g. a base, a first arm connected to the base and extending in the horizontal directions, and a second arm having a part connected to the first arm and extending in the horizontal directions. In the case where the robot in the invention is the horizontal articulated robot, the above described calibrations are performed, and thereby, for example, whether or not the robot is placed in parallel to the work surface, whether or not the fixed camera is placed so that the optical axis of the fixed camera may be vertical to the plane containing the xr-axis and the yr-axis in the robot coordinate system, or the like may be grasped.

In the above described embodiments, the number of rotation shafts of the robot arms of the robot is six, however, in the invention, the number of rotation shafts of the robot arms includes, but is not limited to, e.g. two, three, four, five, seven, or more. Further, in the above described embodiments, the number of arms of the robot is six, however, in the invention, the number of arms of the robot includes, but is not limited to, e.g. two, three, four, five, seven, or more.

In the above described embodiments, the number of robot arms of the robot is one, however, in the invention, the number of robot arms of the robot includes, but is not limited to, e.g. two or more. That is, the robot may be a multi-arm robot such as a dual-arm robot, for example.

In the above described embodiments, the fixed camera and the mobile camera as imaging units each has the imaging device and the lens, however, the imaging unit in the invention may have any configuration as long as the unit may image the first marker, the second marker, and the third marker.

In the above described embodiments, the calibration of the fixed camera is performed using the member for calibration, however, the member for calibration is not necessarily used in the calibration of the fixed camera. In the case without using the member for calibration, for example, one marker is attached to the distal end portion of the robot arm (axis coordinate) and the single marker may be used as a reference marker. In this case, the single marker is regarded as "first reference marker, second reference marker, and third reference marker".

In the above described embodiments, the hand is applied as the tool attached to the robot arm 8, however, a dispenser may be applied as the tool attached to the robot arm 8.

As described above, the robot in the embodiment (in the example, the robot 20) may set offset for the arm (in the example, the robot arm 8) of the predetermined part (in the example, the TPC of the hand 102) based on the images captured by the imaging unit (in the example, the mobile camera 3) in the first state (in the example, the first state) and the third state (in the example, the third state). Thereby, the robot may further reduce human errors and variations by the operator than those in setting of the offset of the tool while teaching the position of the reference point by operation of the arm by the operator.

The robot may rotate the tool about a rotation axis passing through the predetermined part in parallel to the optical axis of the imaging unit in a position without an obstacle. Thereby, the robot may rotate the tool about the rotation axis passing through the predetermined part in parallel to the optical axis of the imaging unit while avoiding a collision with an obstacle, and therefore, even when the obstacle exists around the predetermined part of the tool, may accurately calculate offset.

The control apparatus may set the offset of the predetermined part with respect to the arm in the robot based on the images captured by the imaging unit in the first state and the third state. Thereby, the control apparatus may set the offset more accurately than in the case where the operator operates the arm to set the offset of the tool in the robot while teaching the position of the reference point.

In the robot system, the control apparatus may set the offset for the arm of the predetermined part in the robot based on the images captured by the imaging unit in the first state and the third state. Thereby, in the robot system, the control apparatus may set the offset more accurately than in the case where the operator operates the arm to set the offset of the tool in the robot while teaching the position of the reference point.

As above, the respective embodiments of the invention are described in detail with reference to the drawings, however, the specific configurations are not limited to the embodiments and changes, replacements, deletions, or the like may be made without departing from the scope of the invention.

A program for realizing a function of an arbitrary configuration part in the above described apparatus (e.g. the control apparatus) may be recorded in a computer-readable recording medium and the program may be read into a computer system and executed. Note that "computer system" here includes an OS (Operating System) and hardware such as a peripheral. Further, "computer-readable recording medium" refers to a portable medium such as a flexible disk, magnetooptical disk, ROM, CD (Compact Disk)-ROM and a storage device such as a hard disk built in the computer system. Furthermore, "computer-readable recording medium" includes a medium that holds a program in a fixed period such as a volatile memory (RAM) within the computer system serving as a server or client when the program is transmitted via a network such as the Internet or a communication line such as a phone line.

The program may be transmitted from the computer system in which the program is stored in a memory device or the like via a transmission medium or transmission wave within the transmission medium to another computer system. Here, "transmission medium" for transmission of the program refers to a medium having a function of transmitting information including a network (communication network) such as the Internet and a communication line such as a phone line.

Further, the program may be for realization of part of the above described function. Furthermore, the program may be for realization of the above described function in combination with a program that has been already recorded in the computer system, the so-called differential file (differential program).

The entire disclosure of Japanese Patent Application No. 2016-130233, filed Jun. 30, 2016; 2016-130876, filed Jun. 30, 2016 and 2016-130883, filed Jun. 30, 2016 are expressly incorporated by reference herein.

What is claimed is:

1. A robot comprising:
a movable member;
a camera that is disposed on the movable member, the camera being configured to capture first and second images, each of the first and second images including a first marker on an object;
a memory configured to store programs; and
a CPU configured to execute the programs so as to:
  control a position and an attitude of the movable member to be set as first position and attitude;
  cause the camera to capture the first image when the movable member is set at the first position and attitude;
  determine a first location of the first marker in the first image;
  control the position and the attitude of the movable member to be set as second position and attitude that are different from the first position and attitude;
  cause the camera to capture the second image when the movable member is set at the second position and attitude;
  determine a second location of the first marker in the second image; and
  cause the movable member to perform an action based on the first and second locations of the first marker in the first and second images;
wherein when the movable member is set at the first position and attitude and the second position and attitude, distances between the camera and the first marker are the same.

2. The robot according to claim 1,
wherein the position and the attitude of the movable member change to the second position and attitude obtained using a third image captured by the camera when the movable member moves from the first position and attitude to third position and attitude.

3. The robot according to claim 1,
wherein an optical axis on which the first image is captured by the camera at the first position and attitude and an optical axis on which the second image is captured by the camera at the second position and attitude are parallel to each other.

4. The robot according to claim 1,
wherein an optical axis on which the first image is captured by the camera at the first position and attitude and an optical axis on which the second image is captured by the camera at in the second position and attitude are non-parallel to each other.

5. The robot according to claim 1,
wherein the CPU is further configured to:
  control the position and the attitude of the movable member to be set as third position and attitude;
  cause the camera to capture a third image when the movable member is set at the third position and attitude, the third image including a second marker;
  determine a third location of the second marker in third image; and
  cause the movable member to perform the action based on the first and second locations of the first marker in the first and second images and the third location of the second marker in the third image.

6. The robot according to claim 5,
wherein a control point is set on the movable member, and when the movable member is set at the first position and attitude and the third position and attitude, distances between a plane containing the first marker and the second marker and the control point of the movable member are the same.

7. A root comprising:
a movable member on which a control point is set;
a camera that is disposed on the movable member, the camera being configured to capture first and second images, each of the first and second images including a first marker on an object;
a memory configured to store programs; and
a CPU configured to execute the programs so as to:
  control a position and an attitude of the movable member to be set as first position and attitude;
  cause the camera to capture the first ma e when the movable member is set at the first position and attitude;
  determine a first location of the first marker in the first image;
  control the position and the attitude of the movable member to be set as second position and attitude that are different from the first position and attitude;
  cause the camera to capture the second image when the movable member is set at the second position and attitude;
  determine a second location of the first marker in the second image; and
  cause the movable member to perform an action based on the first and second locations of the first marker in the first and second images,
wherein when the movable member is set at the first position and attitude and the second position and attitude, distances between the camera and the control point of the movable member are the same.

8. A robot comprising:
a movable member;
a camera that is disposed on the movable member, the camera being configured to capture first and second images, each of the First and second images including a first marker on an object;

a memory configured to store programs; and
a CPU configured to execute the programs so as to:
- control a position and an attitude of the movable member to be set as first position and attitude;
- cause the camera to capture the first image when the movable member is set at the first position and attitude;
- determine a first location of the first marker in the first image;
- control the position and the attitude of the movable member to be set as second position and attitude that are different from the first position and attitude;
- cause the camera to capture the second image when the movable member is set at the second position and attitude;
- determine a second location of the first marker in the second image; and
- cause the movable member to perform an action based on the first and second locations of the first marker in the first and second images, wherein a position of the first marker in the second image corresponds to a position of the first marker in the first image.

9. The robot according to claim 8,
wherein the position of the first marker in the first image is a center position in the first image, and
the position of the first marker in the second image is a center position in the second image corresponding to the center position in the first image.

* * * * *